(12) United States Patent
Kudo et al.

(10) Patent No.: US 10,303,117 B2
(45) Date of Patent: May 28, 2019

(54) IMAGE FORMING APPARATUS HAVING A SWINGABLY SUPPORTED DEVELOPING CARTRIDGE

(71) Applicant: CANON KABUSHIKI KAISHA, Tokyo (JP)

(72) Inventors: Masanori Kudo, Sagamihara (JP); Takashi Kimura, Tokyo (JP); Hiroyuki Munetsugu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/901,173

(22) Filed: Feb. 21, 2018

(65) Prior Publication Data

US 2018/0239301 A1    Aug. 23, 2018

(30) Foreign Application Priority Data

Feb. 22, 2017 (JP) ................................. 2017-031028

(51) Int. Cl.
*G03G 21/18* (2006.01)
*F16C 17/04* (2006.01)
*G03G 21/16* (2006.01)
*F16H 21/44* (2006.01)

(52) U.S. Cl.
CPC ......... *G03G 21/1857* (2013.01); *F16C 17/04* (2013.01); *G03G 21/1825* (2013.01); *G03G 21/1853* (2013.01); *F16H 21/44* (2013.01); *G03G 21/1647* (2013.01); *G03G 21/1842* (2013.01); *G03G 2221/1861* (2013.01)

(58) Field of Classification Search
CPC ........... G03G 21/1817; G03G 21/1821; G03G 21/1825; G03G 21/1842; G03G 21/1853; G03G 2221/1861
See application file for complete search history.

(56) References Cited

U.S. PATENT DOCUMENTS

| | | | |
|---|---|---|---|
| 5,956,546 A | 9/1999 | Tsuchiya | |
| 6,075,956 A * | 6/2000 | Watanabe | G03G 21/1832 399/114 |
| 9,910,401 B2 * | 3/2018 | Nagae | G03G 21/1647 |
| 2005/0047823 A1 * | 3/2005 | Nakashima | G03G 21/1839 399/111 |

(Continued)

FOREIGN PATENT DOCUMENTS

JP    H09-230694 A    9/1997

*Primary Examiner* — David M. Gray
*Assistant Examiner* — Laura Roth
(74) *Attorney, Agent, or Firm* — Venable LLP

(57) ABSTRACT

An image forming apparatus includes a main assembly, a rotatable image bearing member, and a cartridge detachably mountable to the main assembly, the cartridge including a rotatable developer carrying member. A first swingable member is provided in the main assembly, engages with one end of the cartridge in an axial direction of the developer carrying member when the cartridge is mounted in the main assembly, and swings integrally with the cartridge, and a second swingable member is provided in the main assembly, engages with the other end of the cartridge in the axial direction of the developer carrying member when the cartridge is mounted in the main assembly, and swings integrally with the cartridge.

8 Claims, 29 Drawing Sheets

(56) References Cited

U.S. PATENT DOCUMENTS

| | | | |
|---|---|---|---|
| 2009/0317133 A1* | 12/2009 | Nishimura | G03G 21/1623 399/119 |
| 2010/0247140 A1* | 9/2010 | Kikuchi | G03G 21/12 399/111 |
| 2014/0193179 A1* | 7/2014 | Tomoda | G03G 21/1821 399/267 |
| 2016/0179051 A1* | 6/2016 | Kim | G03G 21/1676 399/113 |

* cited by examiner (a)

(b)

(a)

(b)

(c)

(a)

(b)　　　　　　　　　　(c)

(a)

(b)

(a)

(b)

IMAGE FORMING APPARATUS HAVING A SWINGABLY SUPPORTED DEVELOPING CARTRIDGE

FIELD OF THE INVENTION AND RELATED ART

The present invention relates to an image forming apparatus, and is applicable to a laser beam printer, a facsimile apparatus, a word processor, and the like, for example, using an electrophotographic process.

Conventionally, as a type of electrophotographic developing method, a contact developing method is known in which an image is formed with an elastic layer of a developing roller contacted with a surface of a photosensitive drum. In this case, it is necessary for the developing roller to contact the photosensitive drum uniformly in the axial direction of the photosensitive drum. To this end, there is a method in which a developer cartridge including a developing roller is rotatably supported relative to a photosensitive drum with a swing shaft thereof, and a biasing member for exerting a moment in a direction in which the developing roller contacts the photosensitive drum, so that the developing cartridge is swingable relative to the photosensitive drum.

Here, when the developing cartridge is swingably supported relative to the photosensitive drum by the swing shaft, the alignment between a swing axis of the developing cartridge and a rotational axis of the developing roller may be deviated due to part tolerance or the like, with the result that the contact pressure between the developing roller and the developing roller may be uneven. In view of this, in order to allow this misalignment, a structure is known in which the developing roller is swingably supported on one end side in the axial direction relative to the photosensitive drum, and the other end side is swingably and slidably supported (Japanese Laid-open Patent Application No. Hei 9-230694).

However, in Japanese Patent Application Laid-open No. Hei 9-230694, there is a degree of freedom on the other end side of the developing roller, that is, it is not positively positioned there, and therefore, the position of the developing roller abutting on the surface of the photosensitive drum varies, with the result that the contact pressure of the developing roller with the photosensitive drum may be unstable in some cases.

Therefore, conventionally, optimization of the disposition direction of the swinging center (swinging center) of the developing cartridge with respect to the disposition of the image bearing member and the developer carrying member was attempted. That is, a straight line M connecting the swing center X of the developing cartridge Z9 in FIG. 29 and a contact point P50 between the developing roller Z6 and the photosensitive drum Z4 and a straight line K connecting the center of the developing roller Z6 and the center of the photosensitive drum Z4 are made substantially perpendicular to each other.

However, from the standpoint of miniaturizing the process cartridge, it is necessary to increase the degree of freedom in the disposition direction of the swinging center of the developing cartridge with respect to the disposition of the image bearing member and the developer carrier, and therefore, the angle θZ2 at which the position of the developing roller Z6 is stabilized cannot be made substantially right angle in some cases.

SUMMARY OF THE INVENTION

An object of the present invention is to provide an image forming apparatus capable of positioning a developer carrying member with high accuracy with a stable contact pressure relative to an image bearing member.

According to an aspect of the present invention, there is provided an image forming apparatus comprising a main assembly; a rotatable image bearing member; a cartridge detachably mountable to said main assembly, said cartridge including a rotatable developer carrying member; a first bearing provided in said cartridge and supporting said developer carrying member at one axial end of said developer carrying member, said first bearing being provided with a first regulated portion; a second bearing provided in said cartridge and supporting said developer carrying member at the other axial end of said developer carrying member, said second bearing being provided with a second regulated portion; a third bearing supporting said image bearing member at one axial end of said image bearing member, said third bearing being provided with a first regulating portion; a fourth bearing supporting said image bearing member at the other axial end of said image bearing member, said fourth bearing being provided with a second regulating portion; a first swingable member provided in said main assembly and fixed with one end of said cartridge mounted in said main assembly, said first swingable member being swingable integrally with said cartridge; and a second swingable member provided in said main assembly and fixed with the other end of said cartridge mounted in said main assembly, said second swingable member being swingable integrally with said cartridge; wherein said cartridge is swingable integrally with said first swingable member and said second swingable member to move between a first position in which said developer carrying member is contacted with or close to said image bearing member and a second position in which said developer carrying member is spaced from said image bearing member, and wherein when said cartridge is in the first position, said first regulated portion contacts said first regulating portion, and said second regulated portion contacts said second regulating portion.

Further features of the present invention will become apparent from the following description of exemplary embodiments with reference to the attached drawings.

Figure 2:
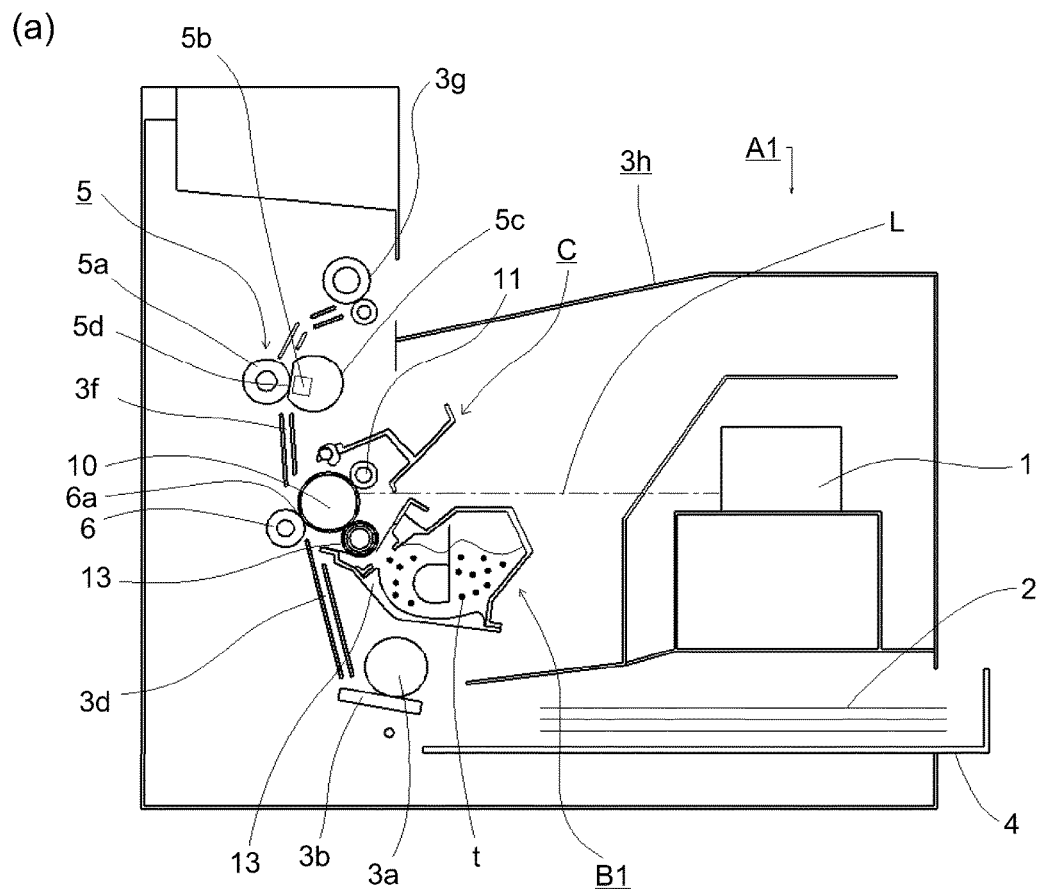
Figure 2:
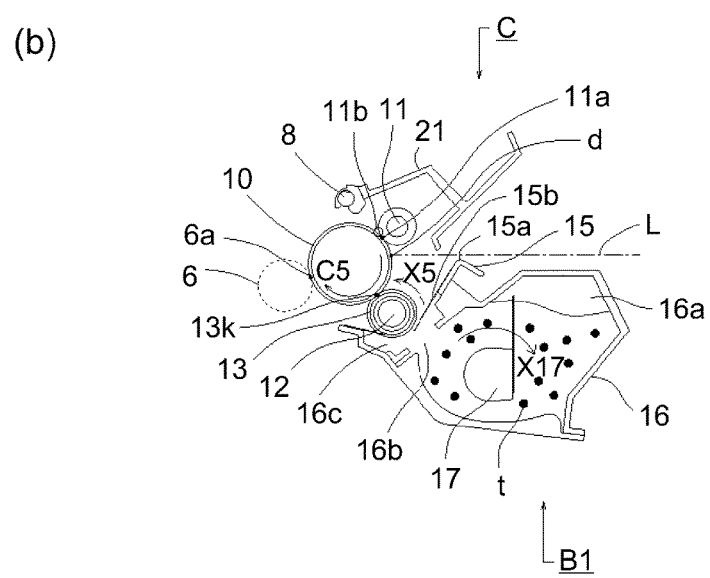

Part (a) of FIG. 2 is a side sectional view of the image forming apparatus according to the embodiment of the present invention, and part (b) of FIG. 2 is a sectional view of the developing cartridge and the drum cartridge according to the embodiment of the present invention.

Figure 3:
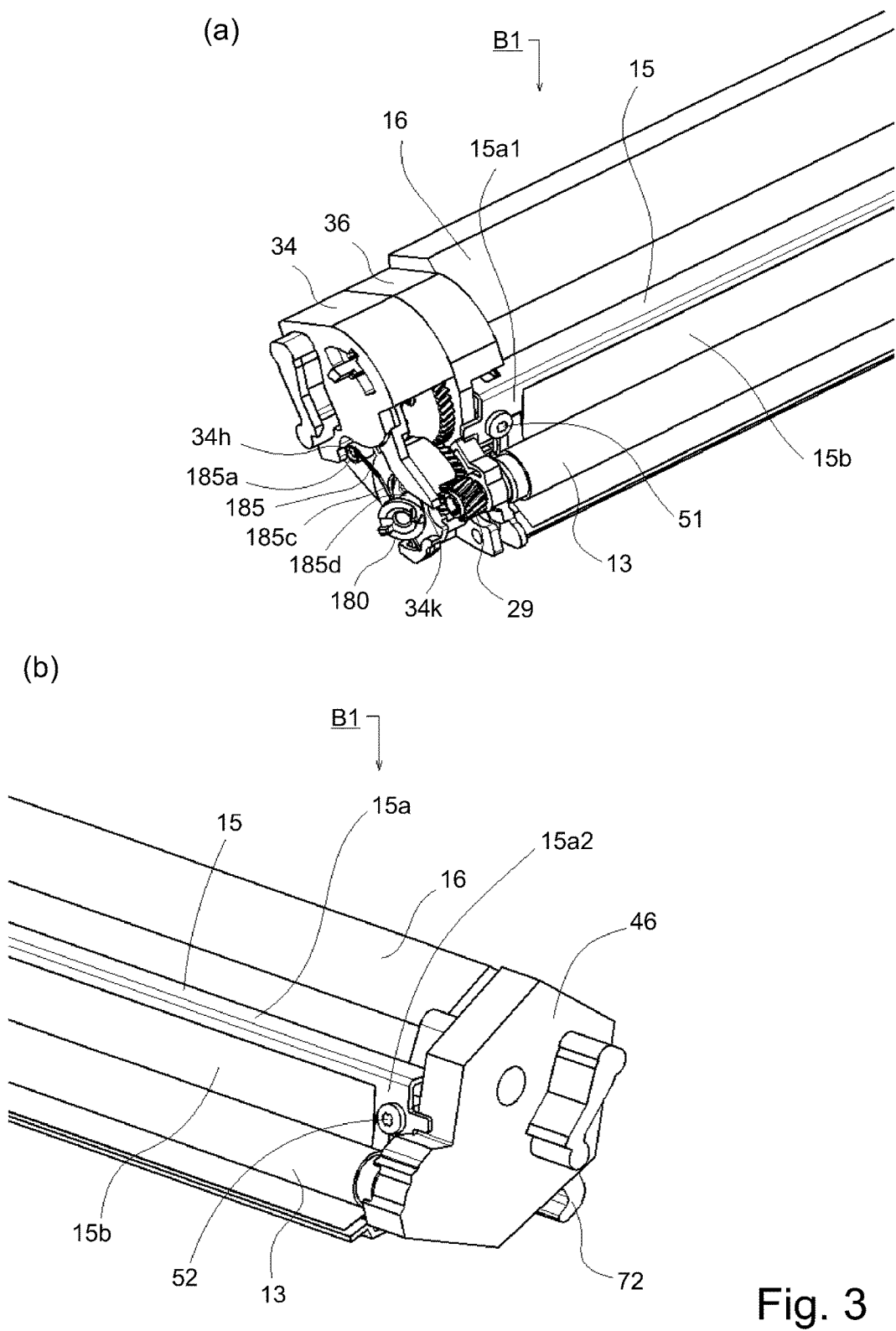

Part (a) of FIG. 3 is a driving side perspective view of the developing cartridge according to the embodiment of the present invention, and part (b) of FIG. 3 is a non-driving side perspective view of the developing cartridge.

Figure 4:
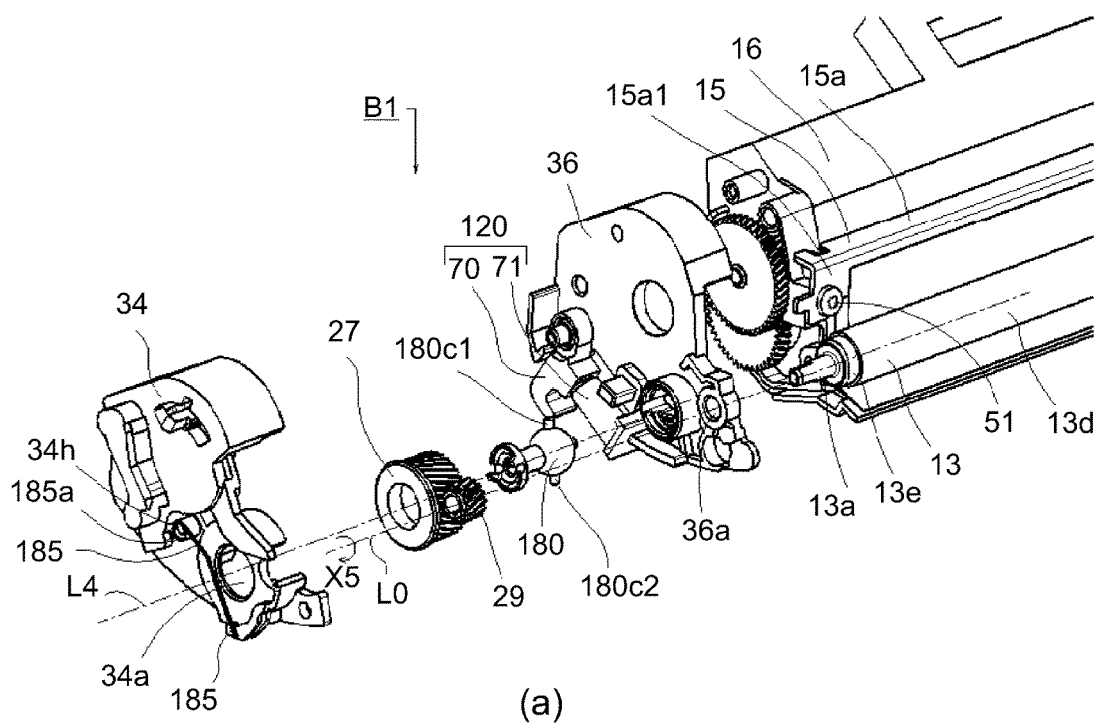
Figure 4:
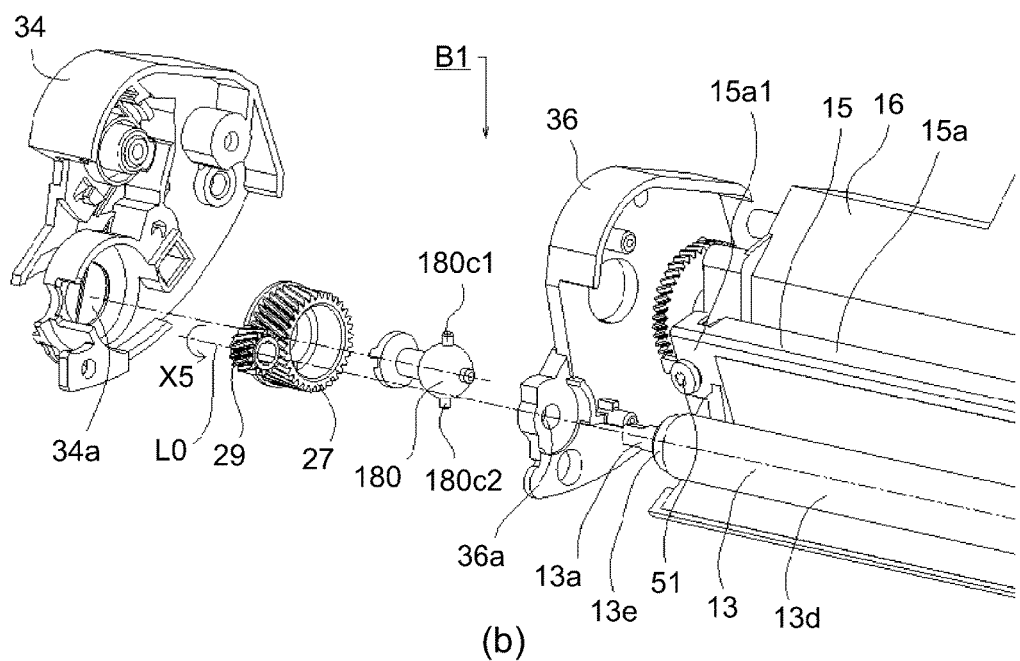

FIG. 4 is an exploded perspective view of a driving side of a developing cartridge according to the embodiment of the present invention.

Figure 5:
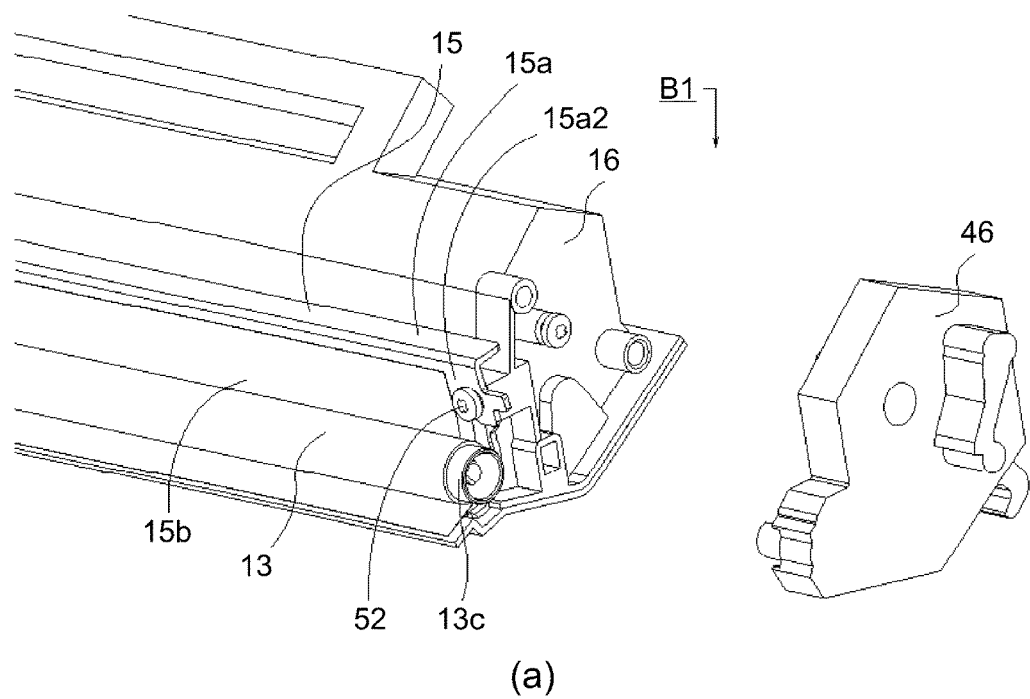
Figure 5:
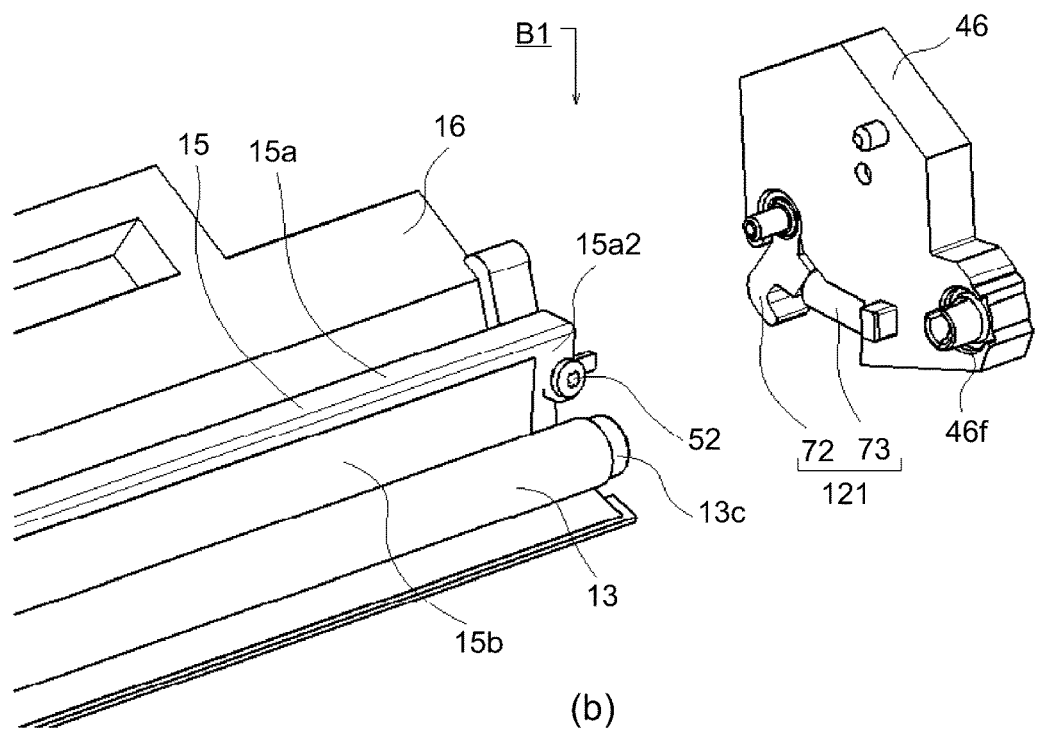

FIG. 5 is an exploded perspective view of the non-driving side of the developing cartridge according to the embodiment of the present invention.

Figure 6:
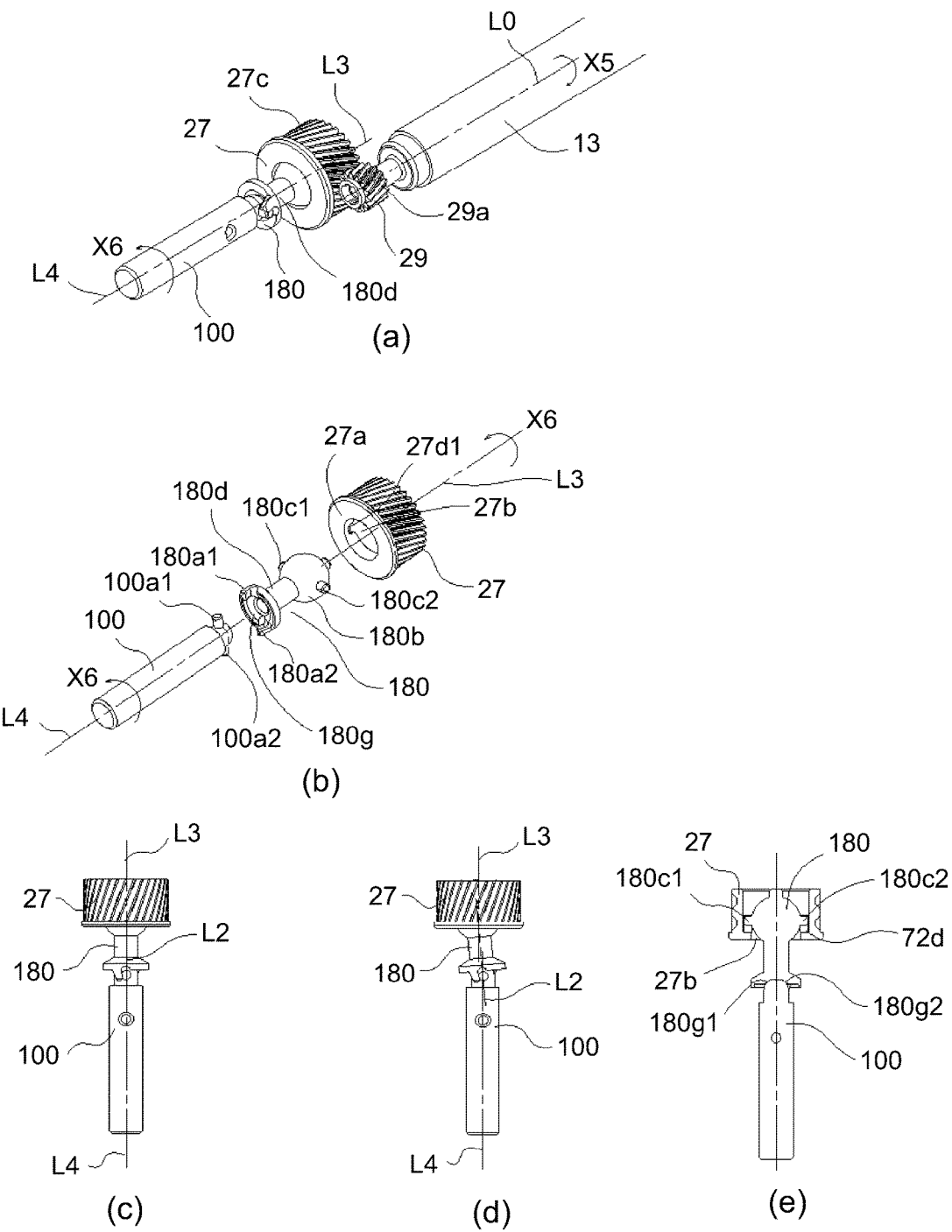

FIG. 6 is a perspective view of a drive input portion of the developing cartridge according to the embodiment of the present invention.

Figure 7:
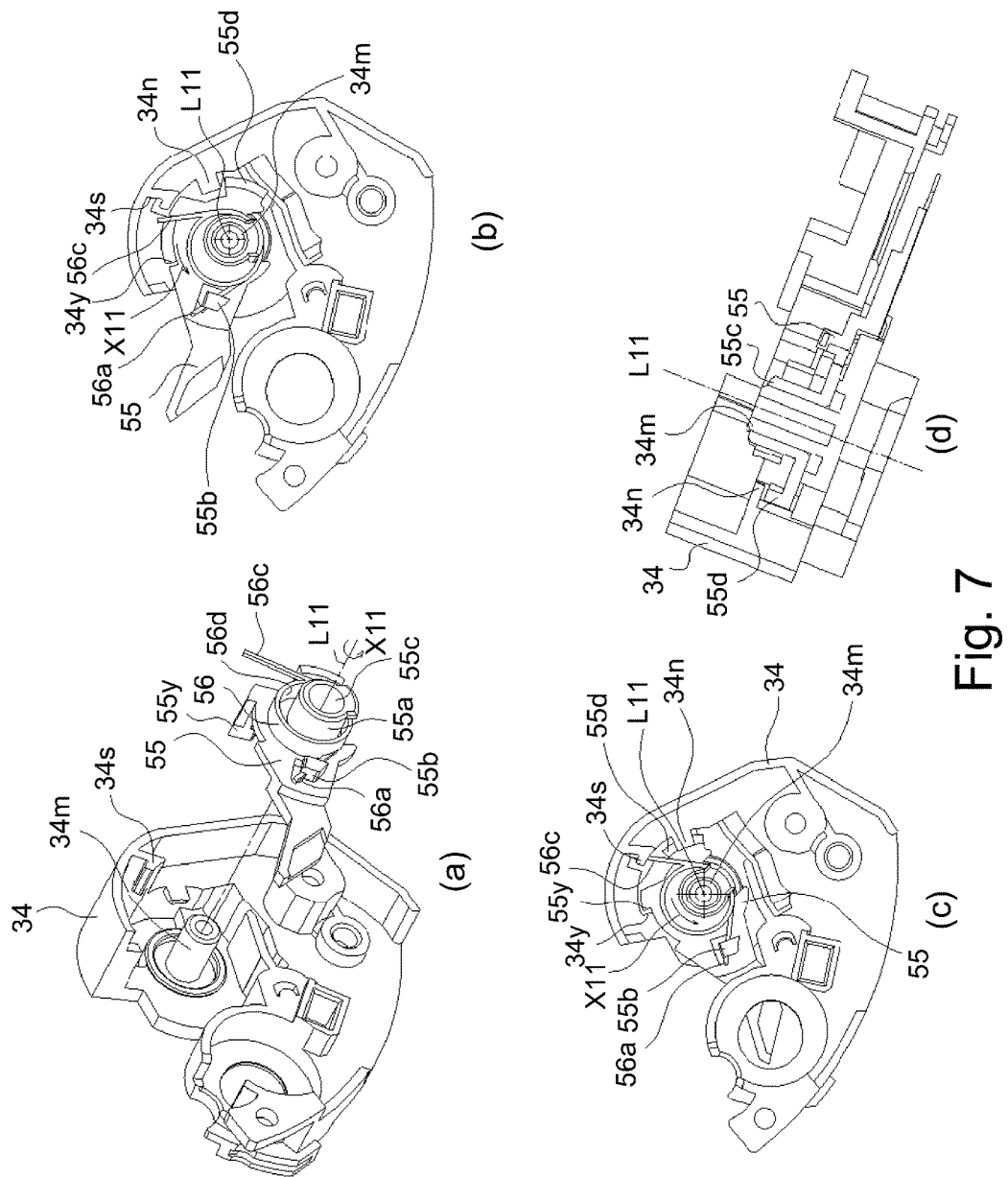

FIG. 7 is an illustration of the periphery of a driving side cover according to the embodiment of the present invention.

Figure 8:
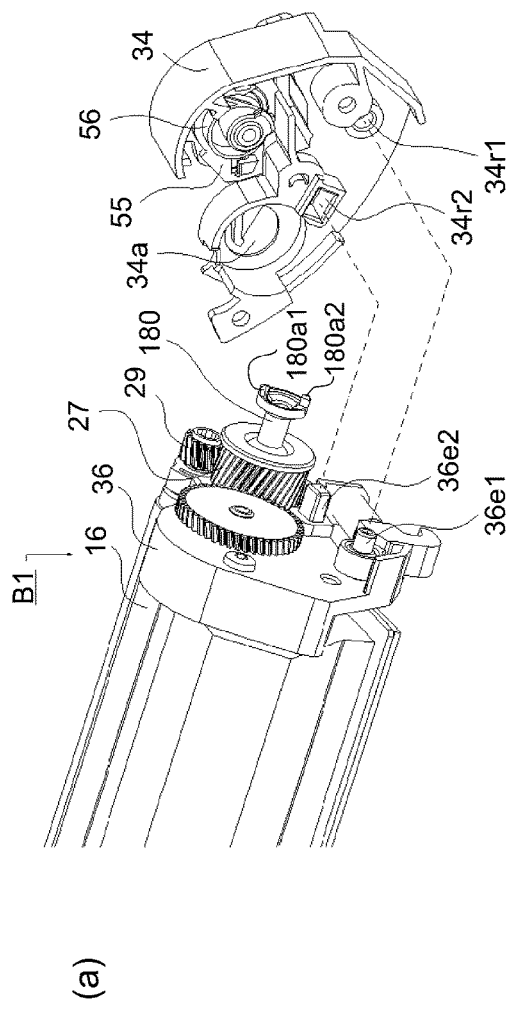
Figure 8:
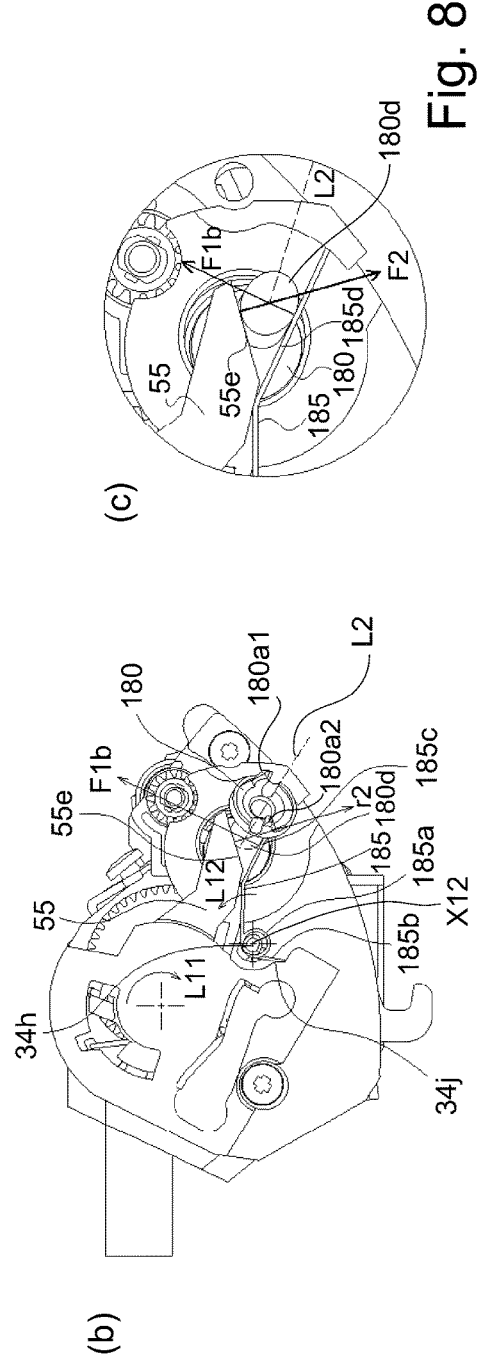

FIG. 8 is an illustration of the periphery of the driving side cover according to the embodiment of the present invention.

Figure 9:
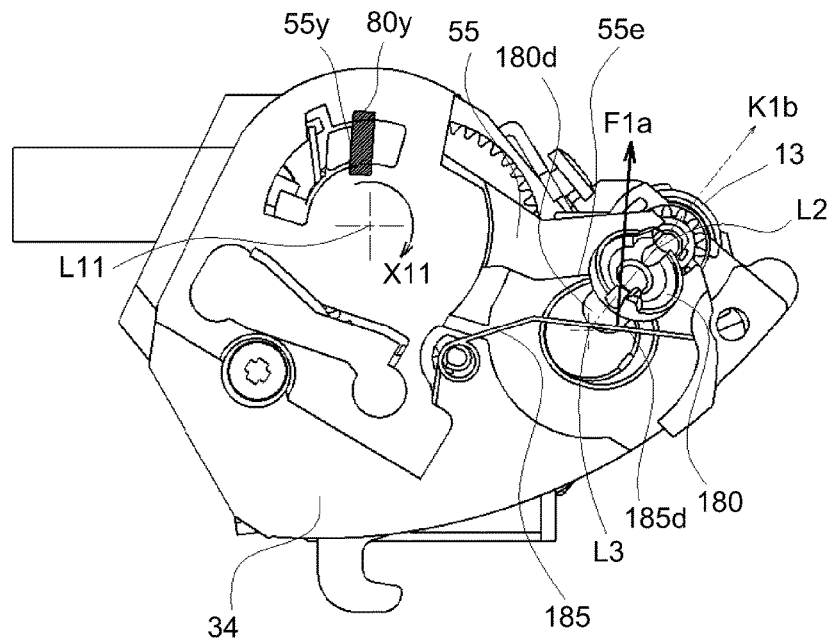
Figure 9:
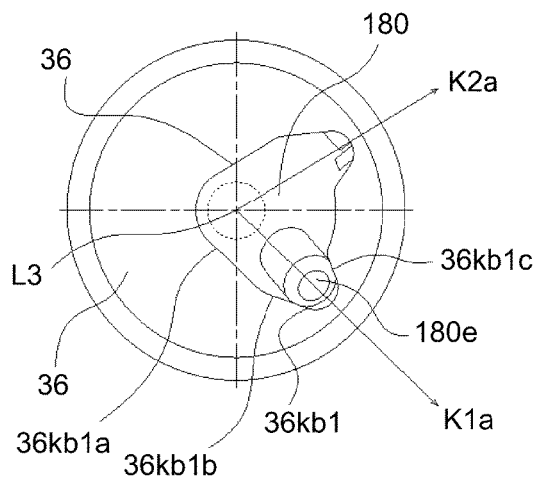
Figure 9:
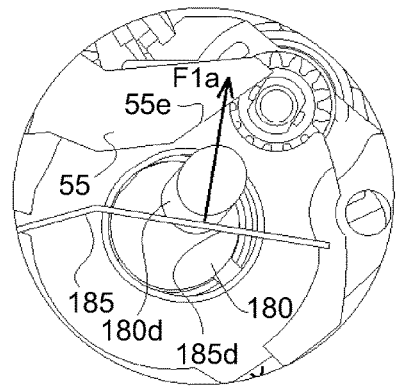

FIG. 9 is an illustration of an attitude of a coupling member according to the embodiment of the present invention.

Figure 10:
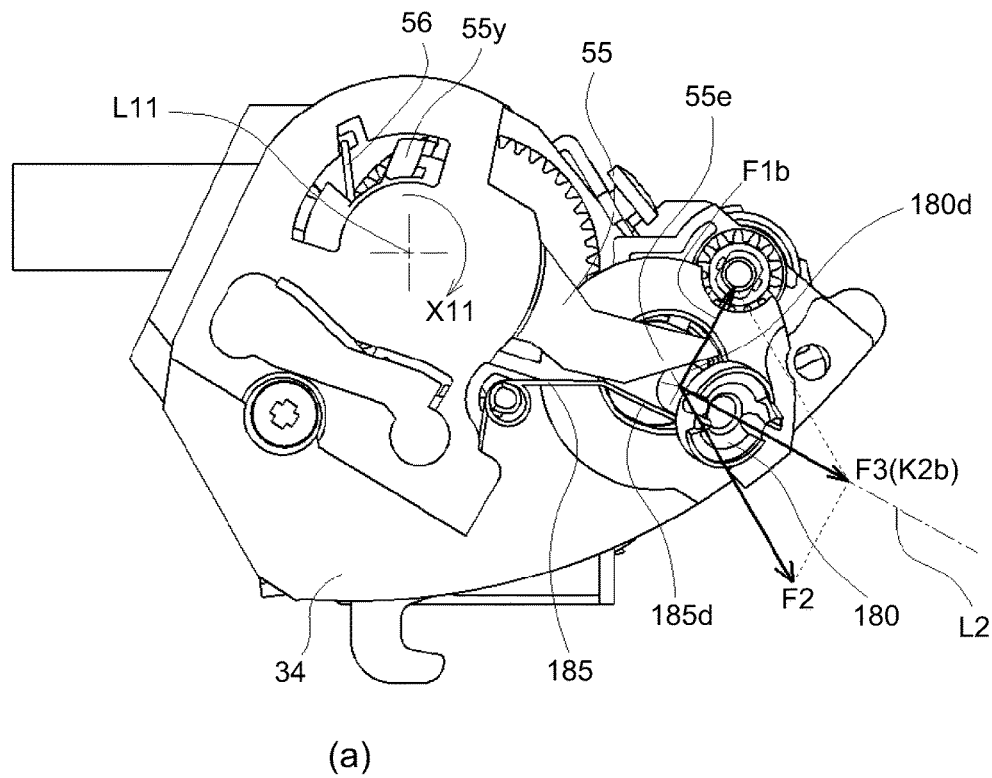
Figure 10:
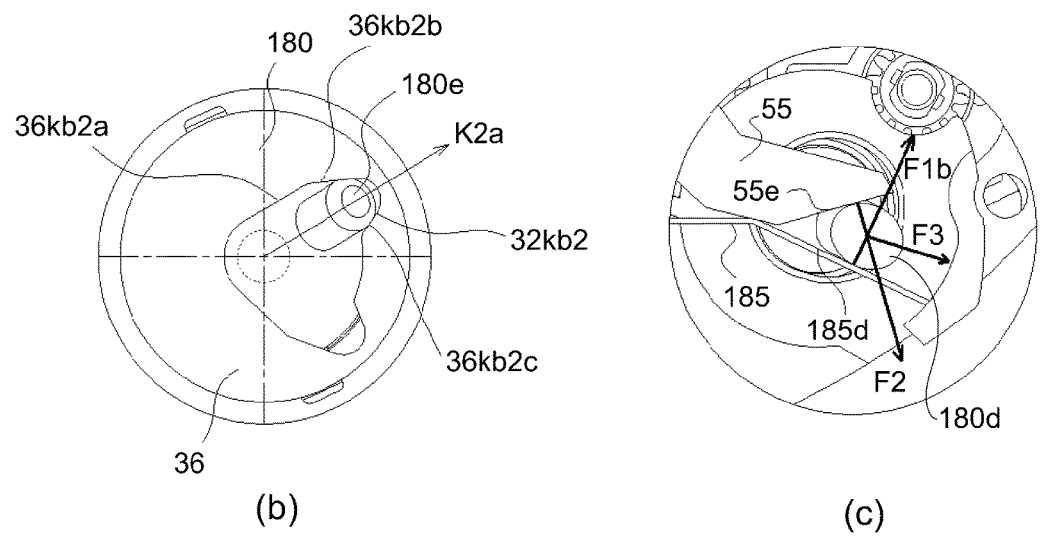

FIG. 10 is an illustration of an attitude of the coupling member according to the embodiment of the present invention.

Figure 11:
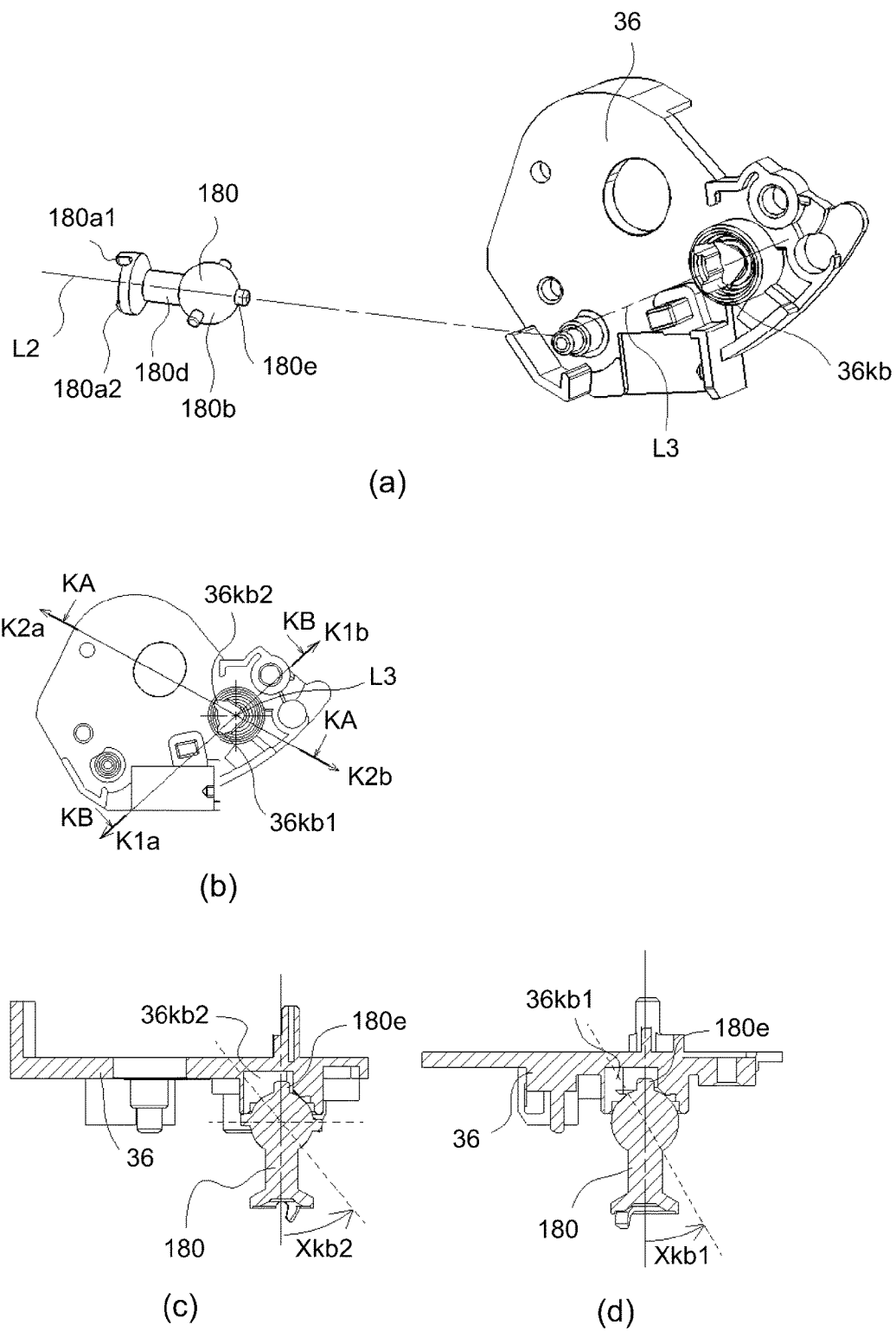

FIG. 11 is an exploded perspective view of a bearing member and the coupling member according to the embodiment of the present invention.

Figure 12:
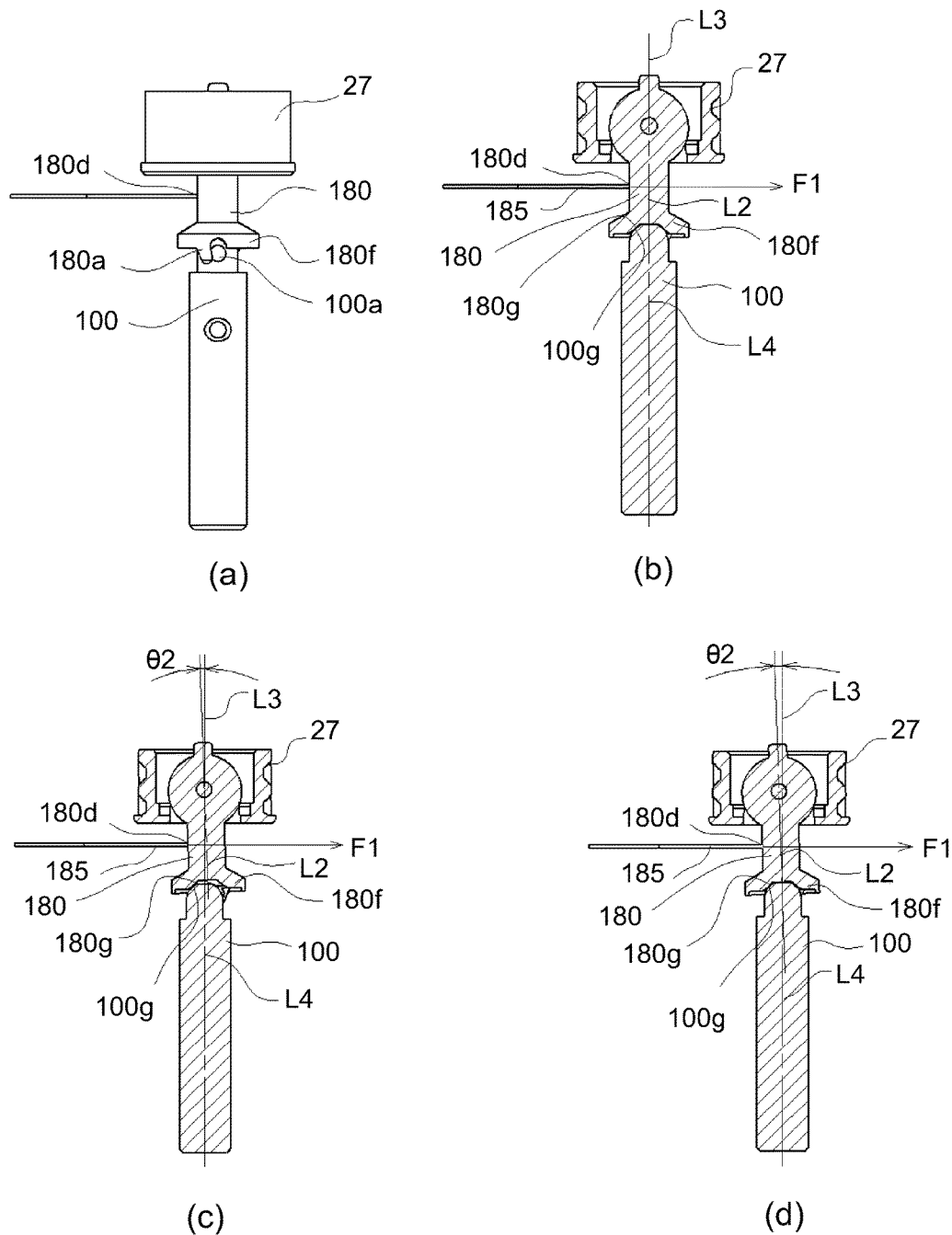

FIG. 12 is a perspective view of a drive input portion of the developing cartridge according to the embodiment of the present invention.

Figure 13:
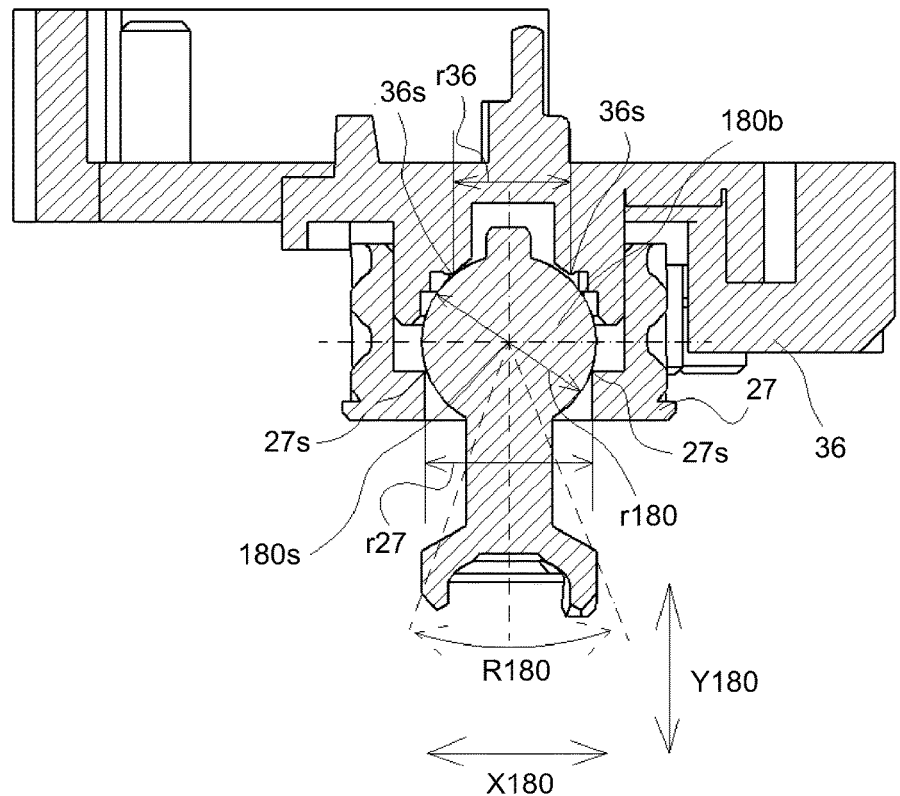
Figure 13:
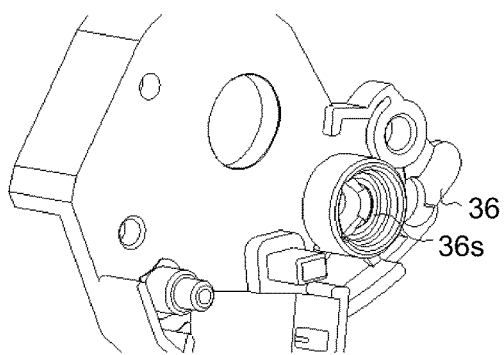
Figure 13:
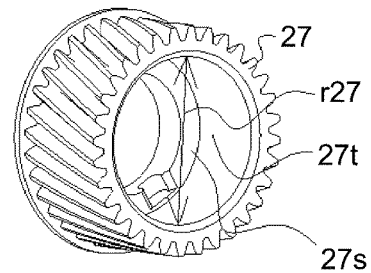

FIG. 13 is a cross-sectional view and a perspective view of the periphery of a coupling member according to the embodiment of the present invention.

Figure 14:
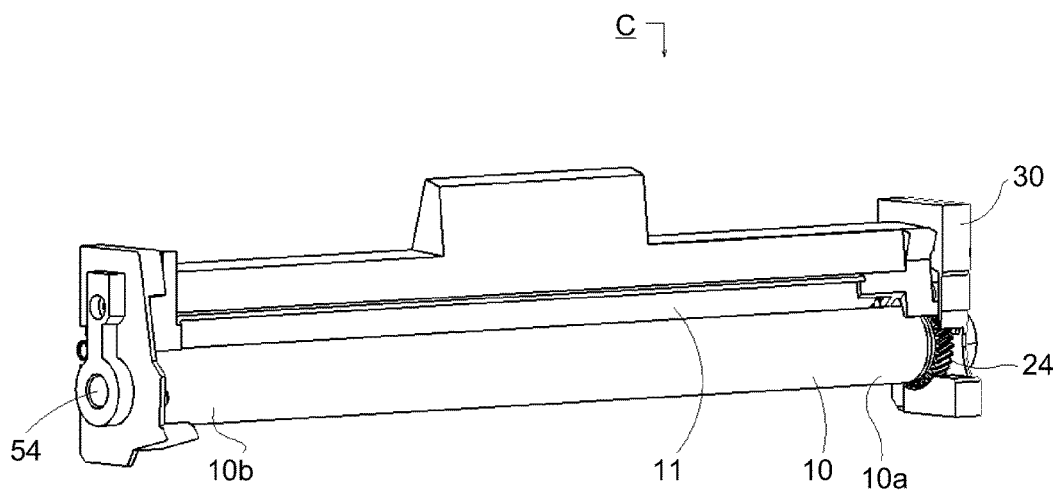
Figure 14:
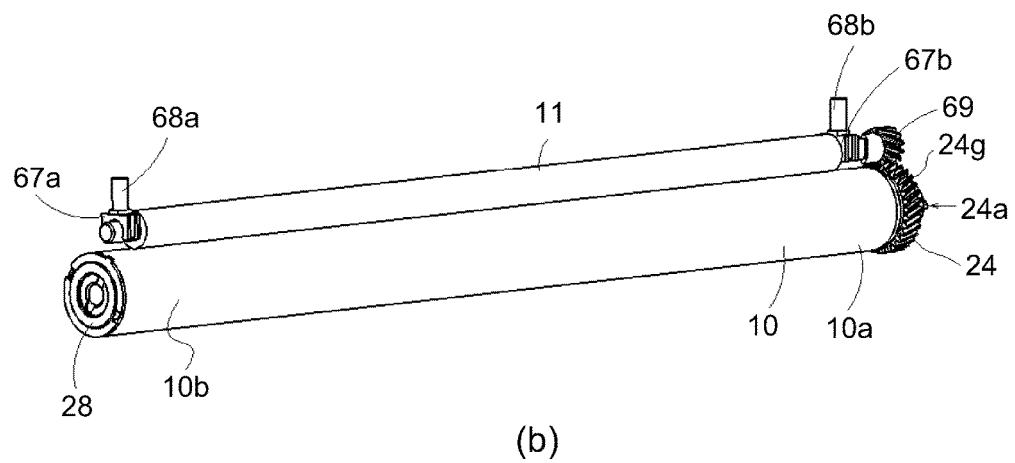

FIG. 14 is a perspective view of a drum cartridge according to the embodiment of the present invention.

Figure 15:
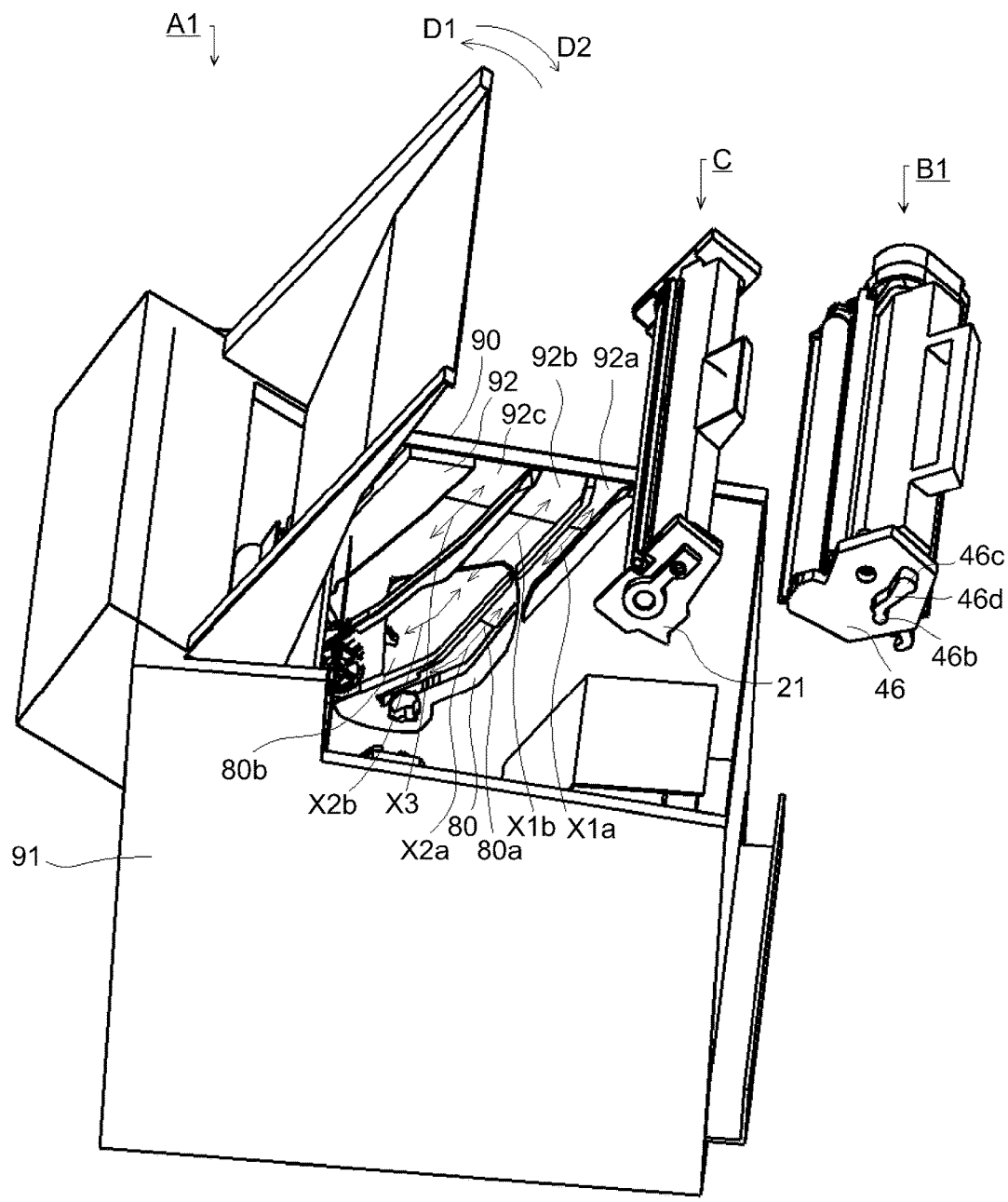

FIG. 15 is a non-driving side perspective view of an apparatus main assembly and each cartridge according to the embodiment of the present invention.

Figure 16:
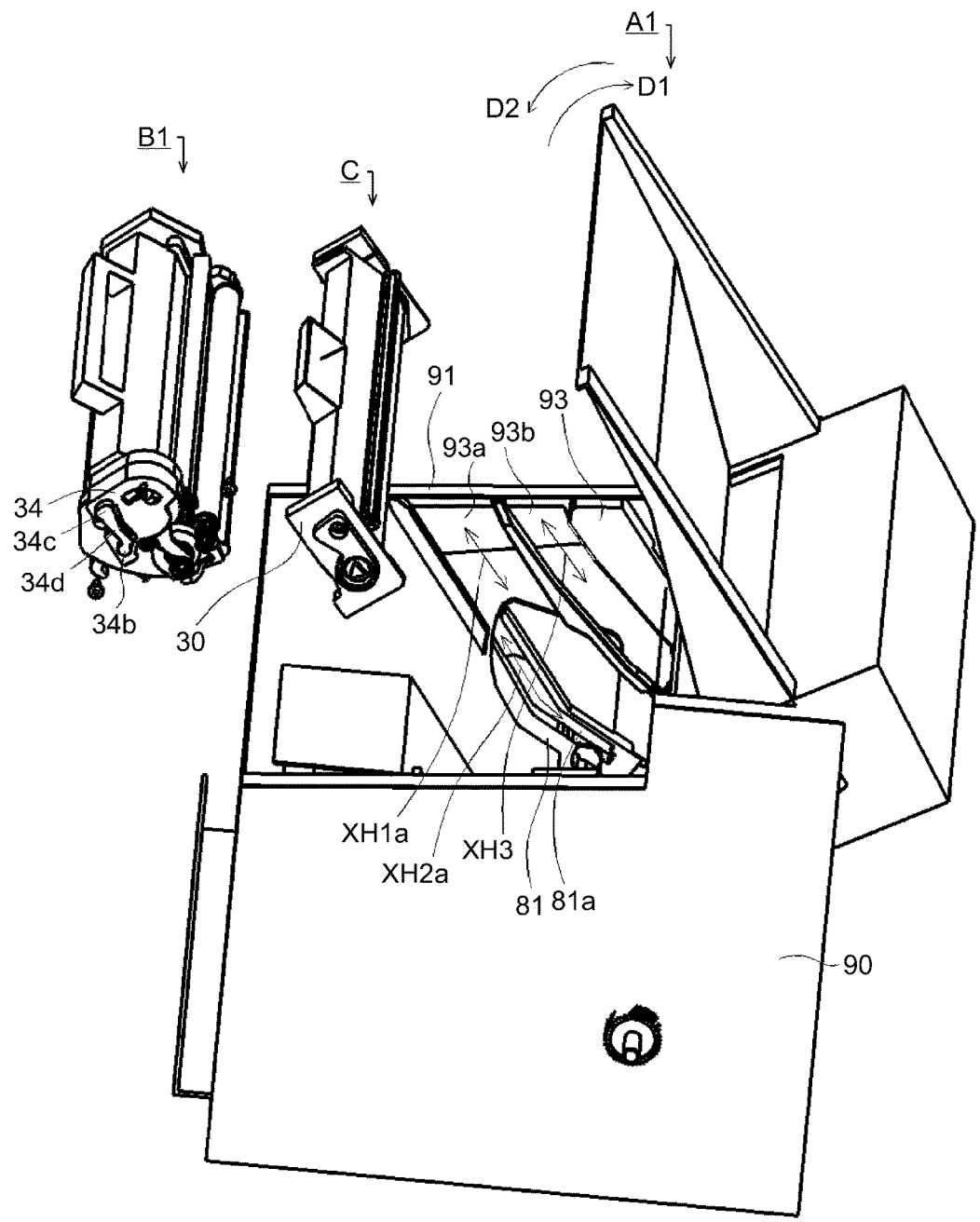

FIG. 16 is a driving side perspective view of the apparatus main assembly and each cartridge according to the embodiment of the present invention.

Figure 17:
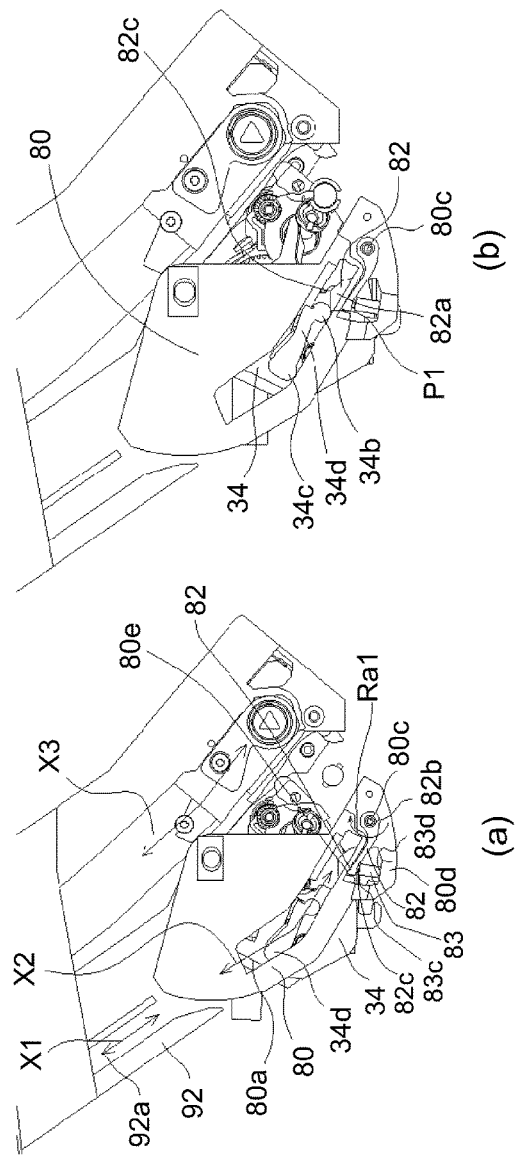
Figure 17:
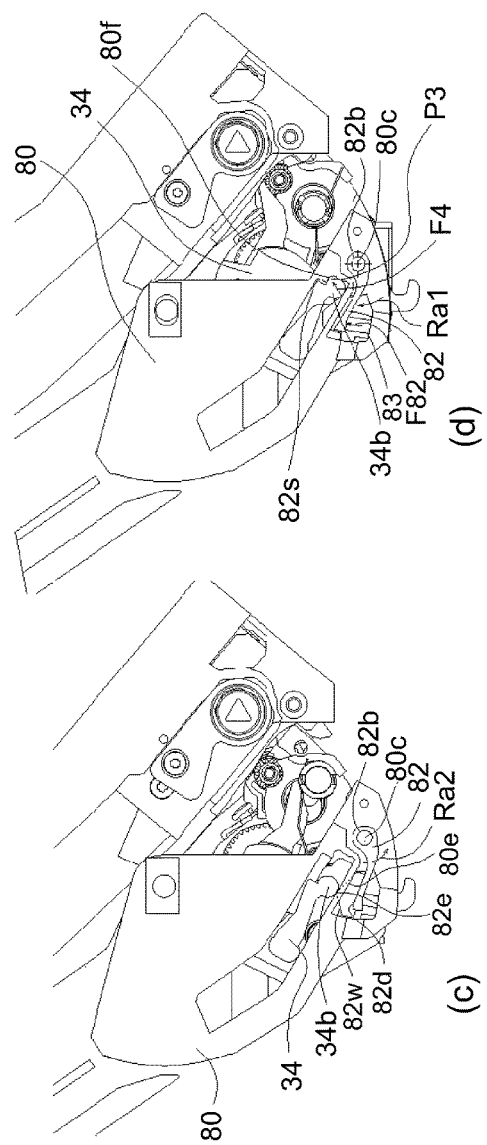

FIG. 17 is a side view of a driving side of the developing cartridge according to the embodiment of the present invention.

Figure 18:
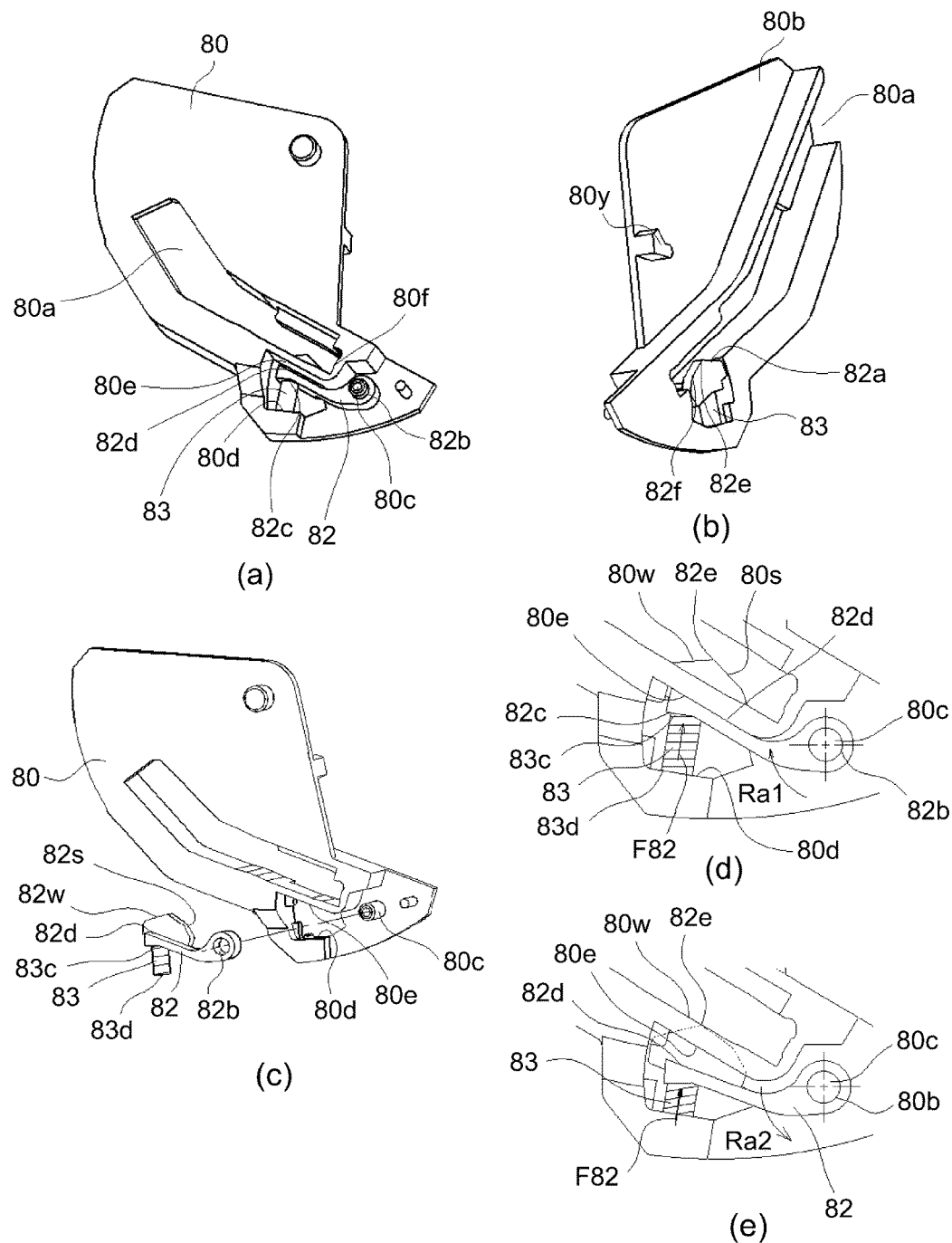

FIG. 18 is a perspective view of a driving side swing guide according to the embodiment of the present invention.

Figure 19:
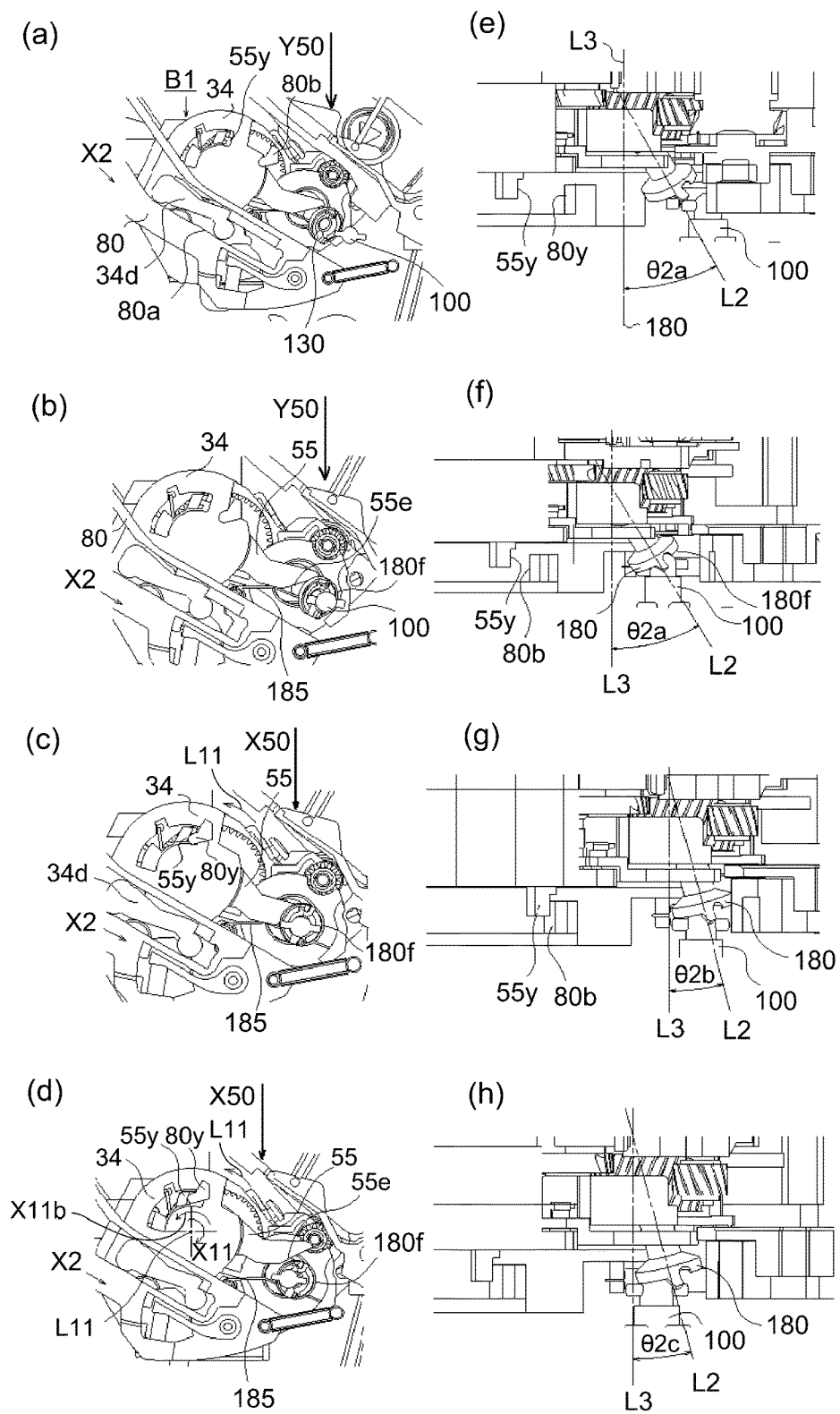

FIG. 19 is a side view of the driving side in the process of mounting the developing cartridge to the apparatus main assembly according to the embodiment of the present invention.

Figure 20:
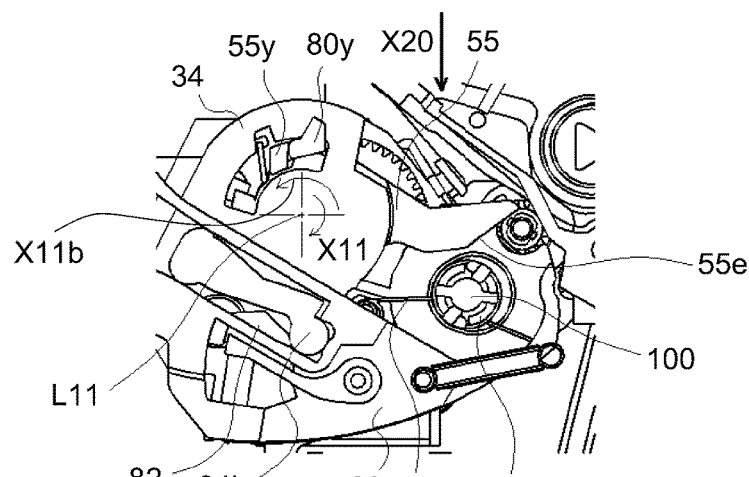
Figure 20:
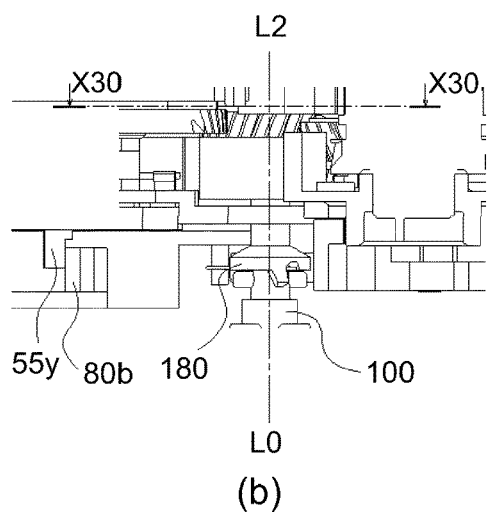
Figure 20:
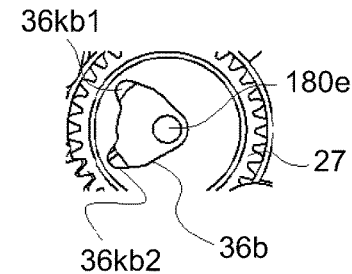
Figure 20:
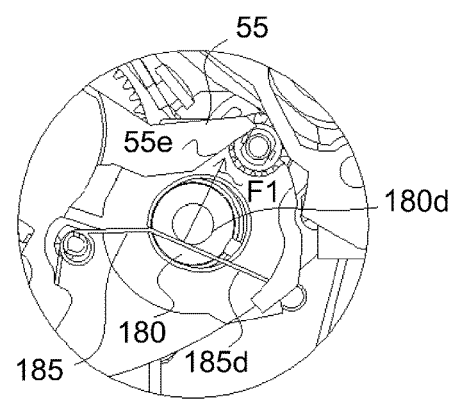

FIG. 20 is a side view of the developing cartridge mounted in the main assembly of the image forming apparatus according to the embodiment of the present invention.

Figure 21:
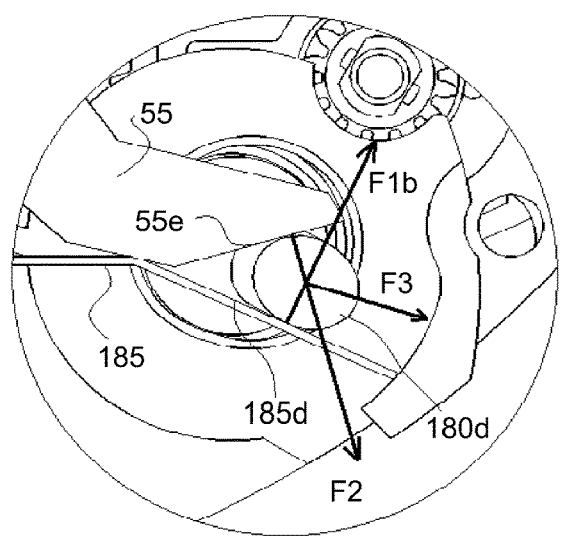
Figure 21:
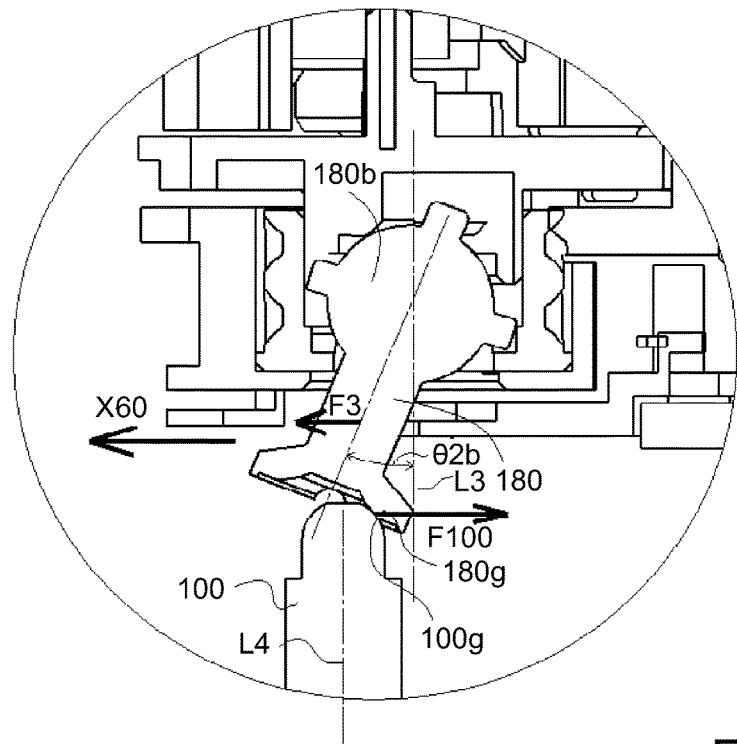

FIG. 21 is a cross-sectional view of the drive input portion of the developing cartridge according the embodiment of the present invention.

Figure 22:
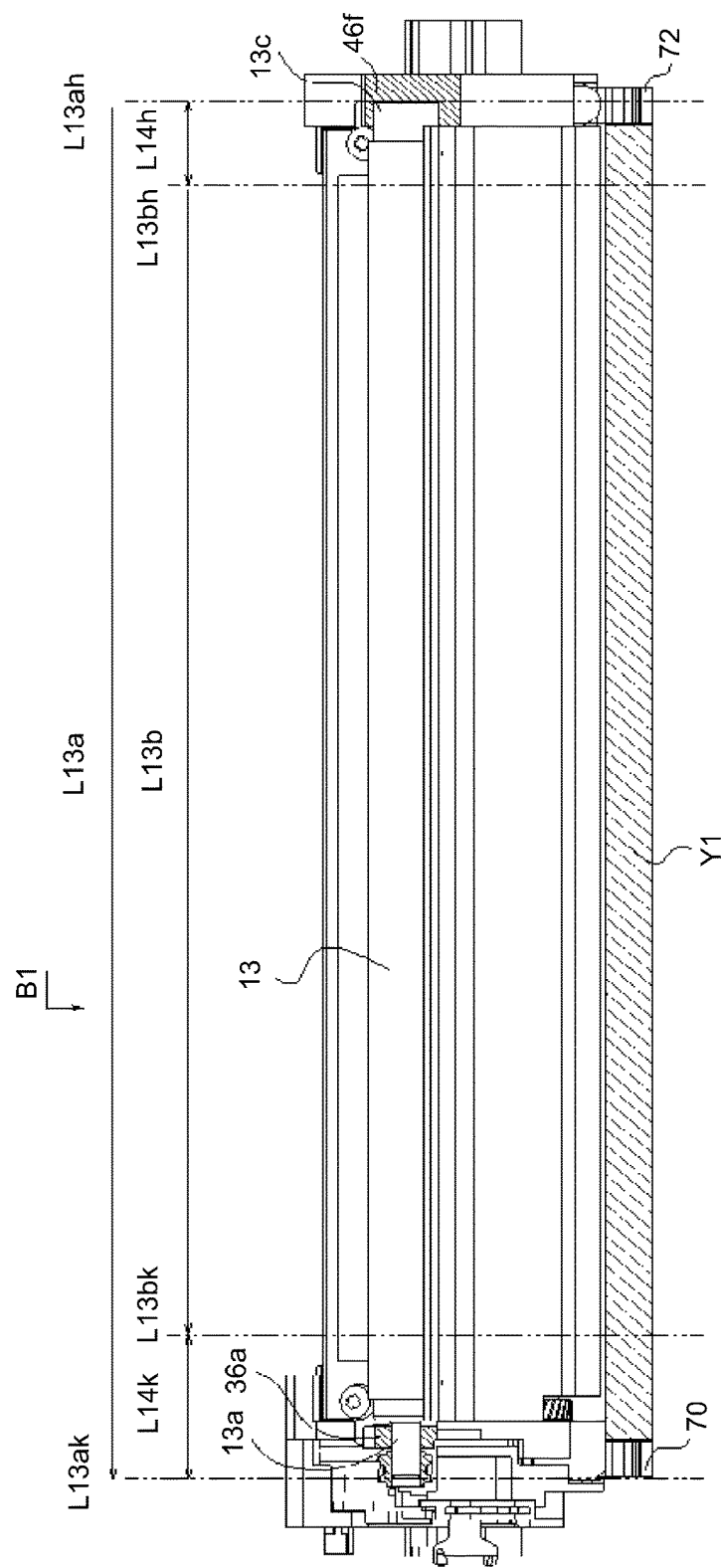

FIG. 22 is a front view of the developing cartridge according to the embodiment of the present invention.

Figure 23:
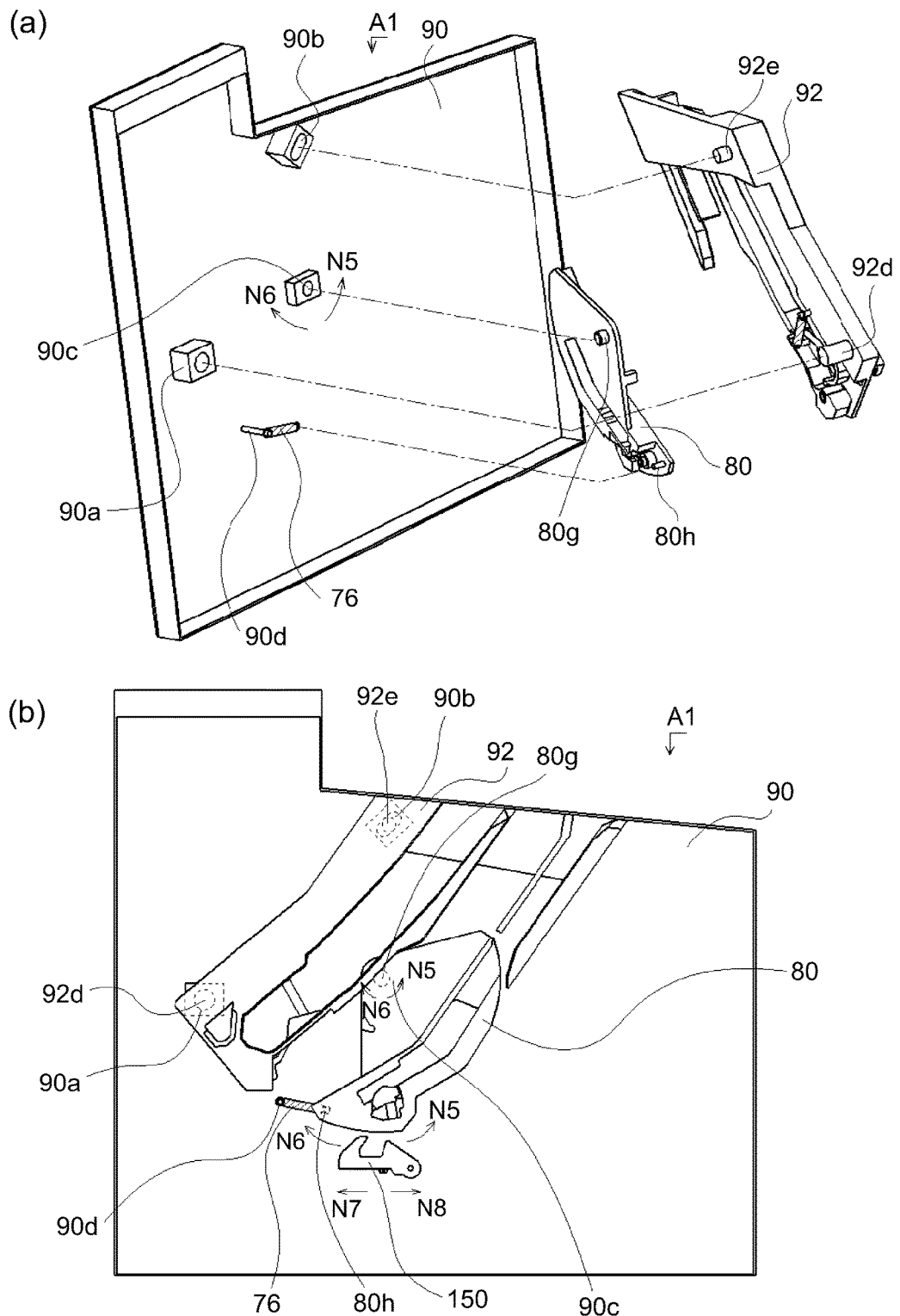

FIG. 23 is a perspective view of a drive side plate according to the embodiment of the present invention.

Figure 24:
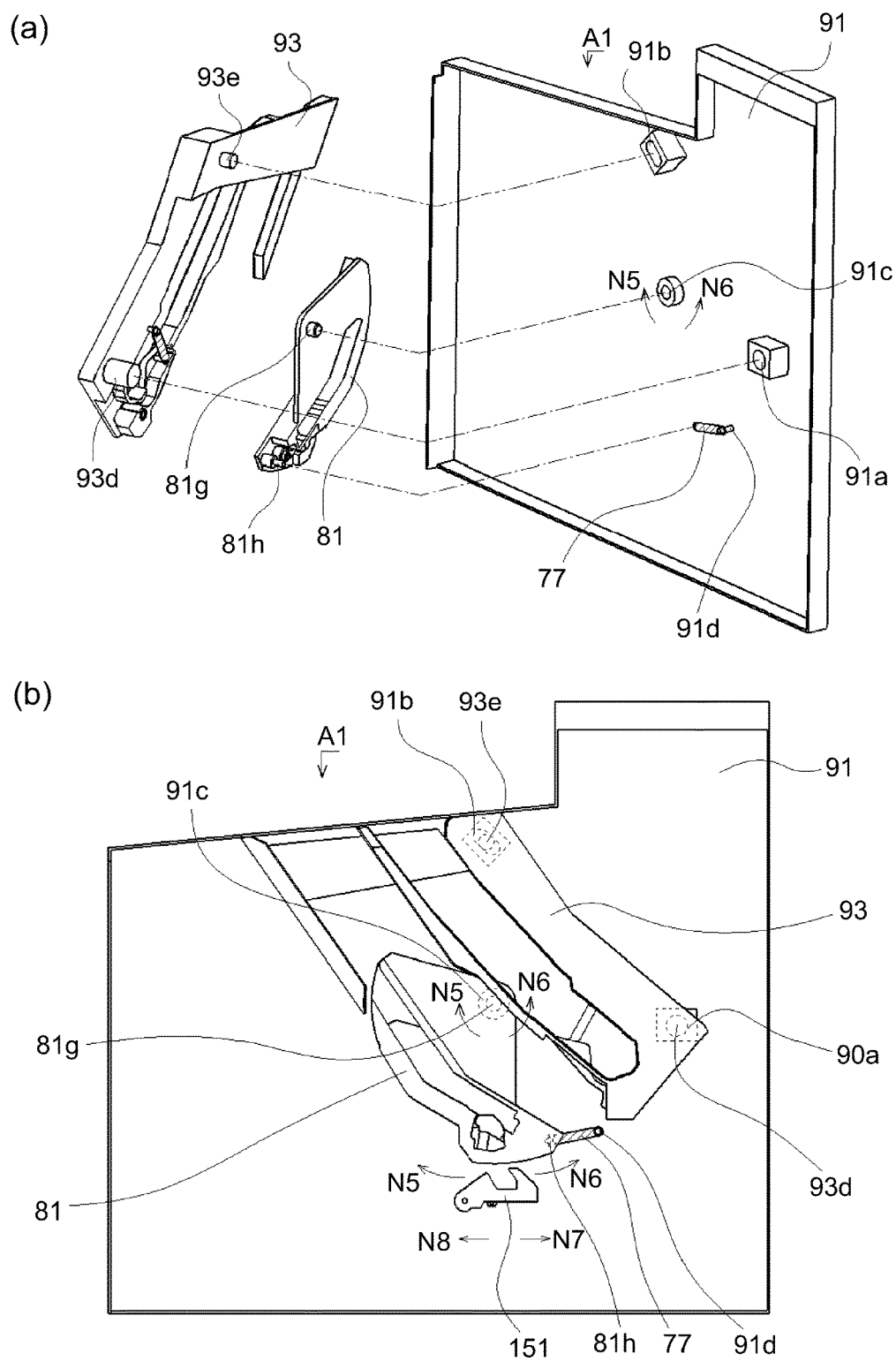

FIG. 24 is a perspective view of a non-driving side plate according to the embodiment of the present invention.

Figure 25:
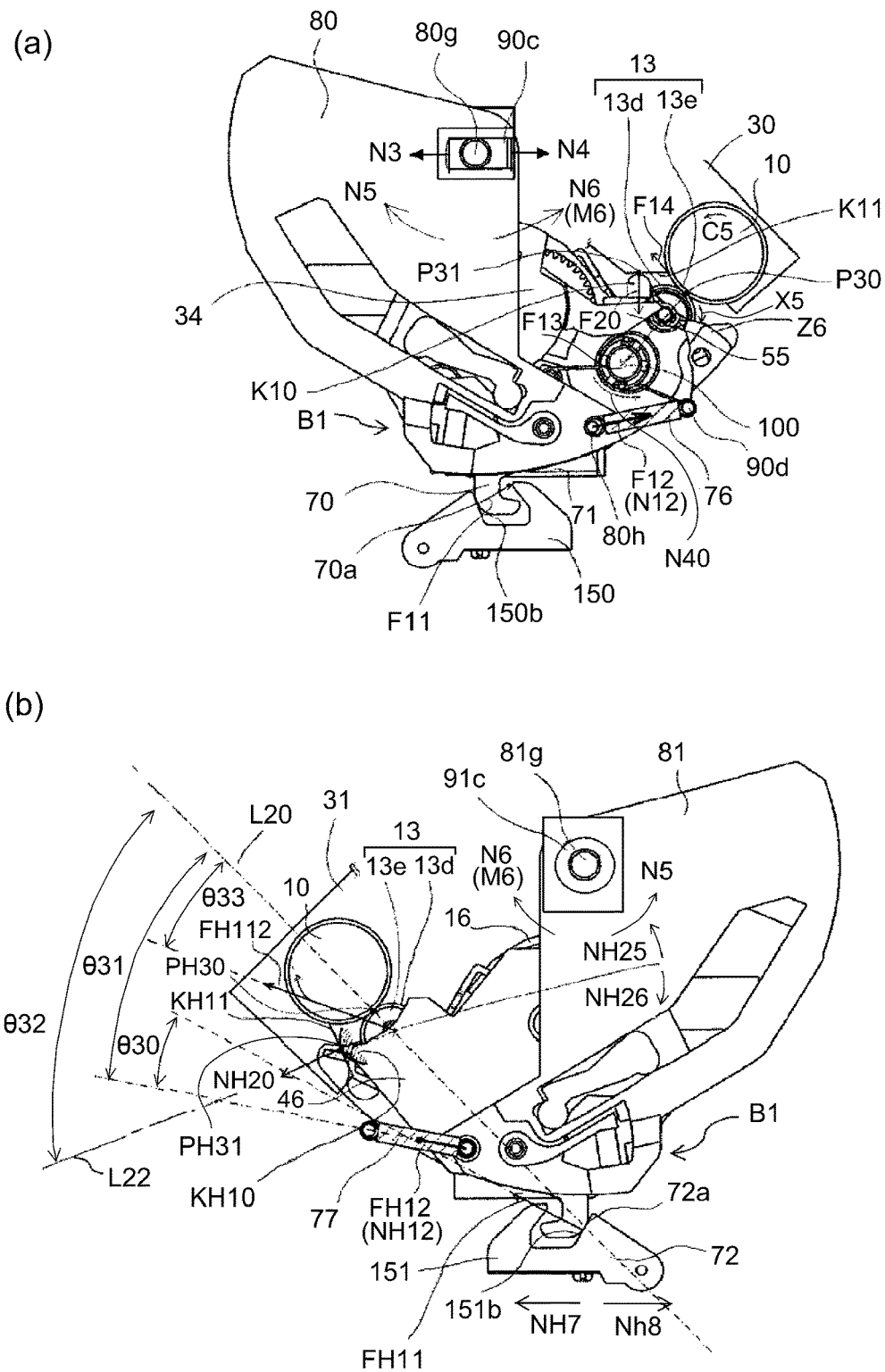

Part (a) of FIG. 25 is a side view of the developing cartridge and a driving side swing guide according to the embodiment of the present invention, and part (b) of FIG. 25 is a side view of the developing cartridge and a non-driving side swing guide according to the embodiment of the present invention.

Figure 26:
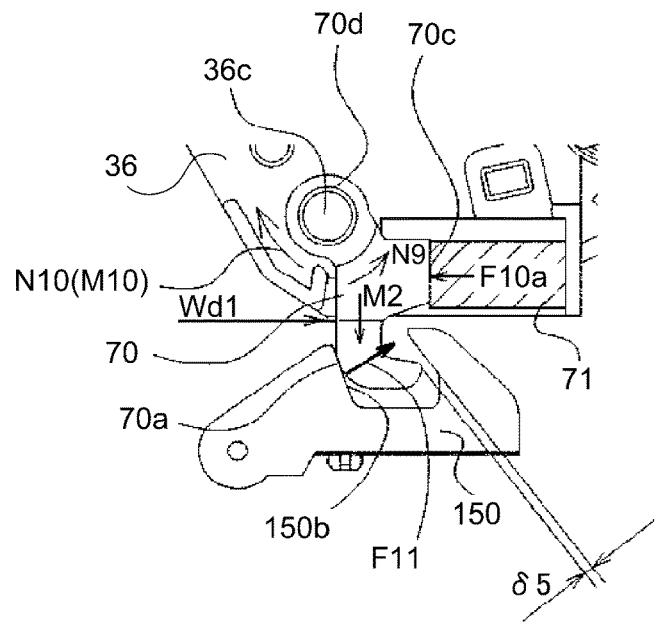
Figure 26:
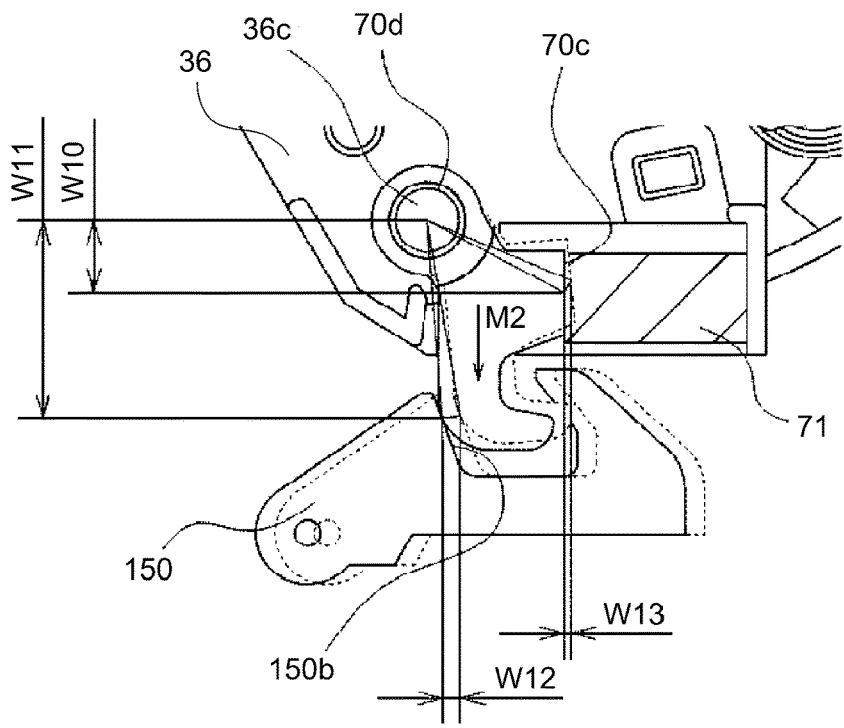

FIG. 26 is a side view of the driving side of the developing cartridge and the driving side swing guide according to the embodiment of the present invention.

Figure 27:
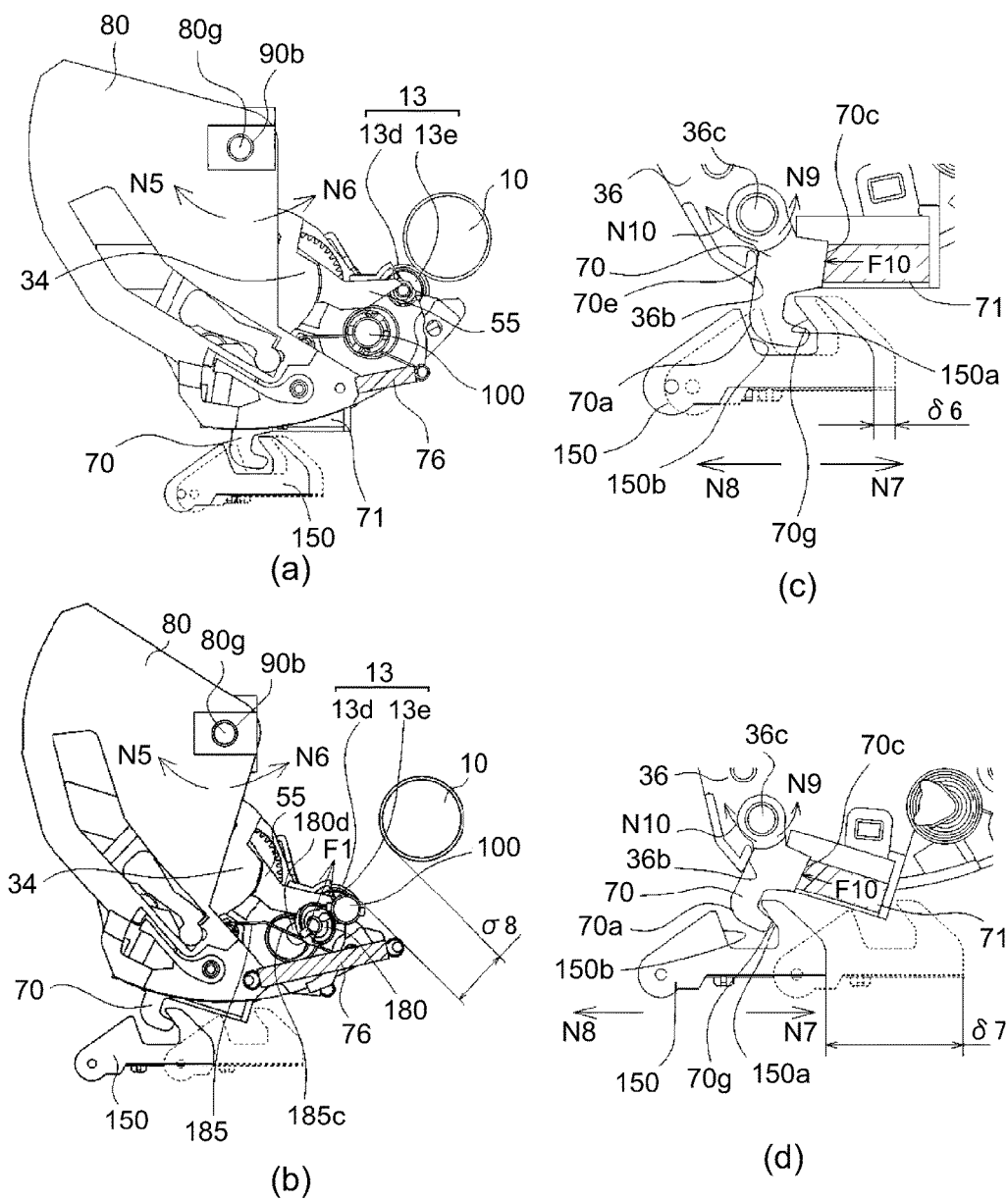

FIG. 27 is a side view of a driving side of the developing cartridge and the driving side swing guide according to the embodiment of the present invention.

Figure 28:
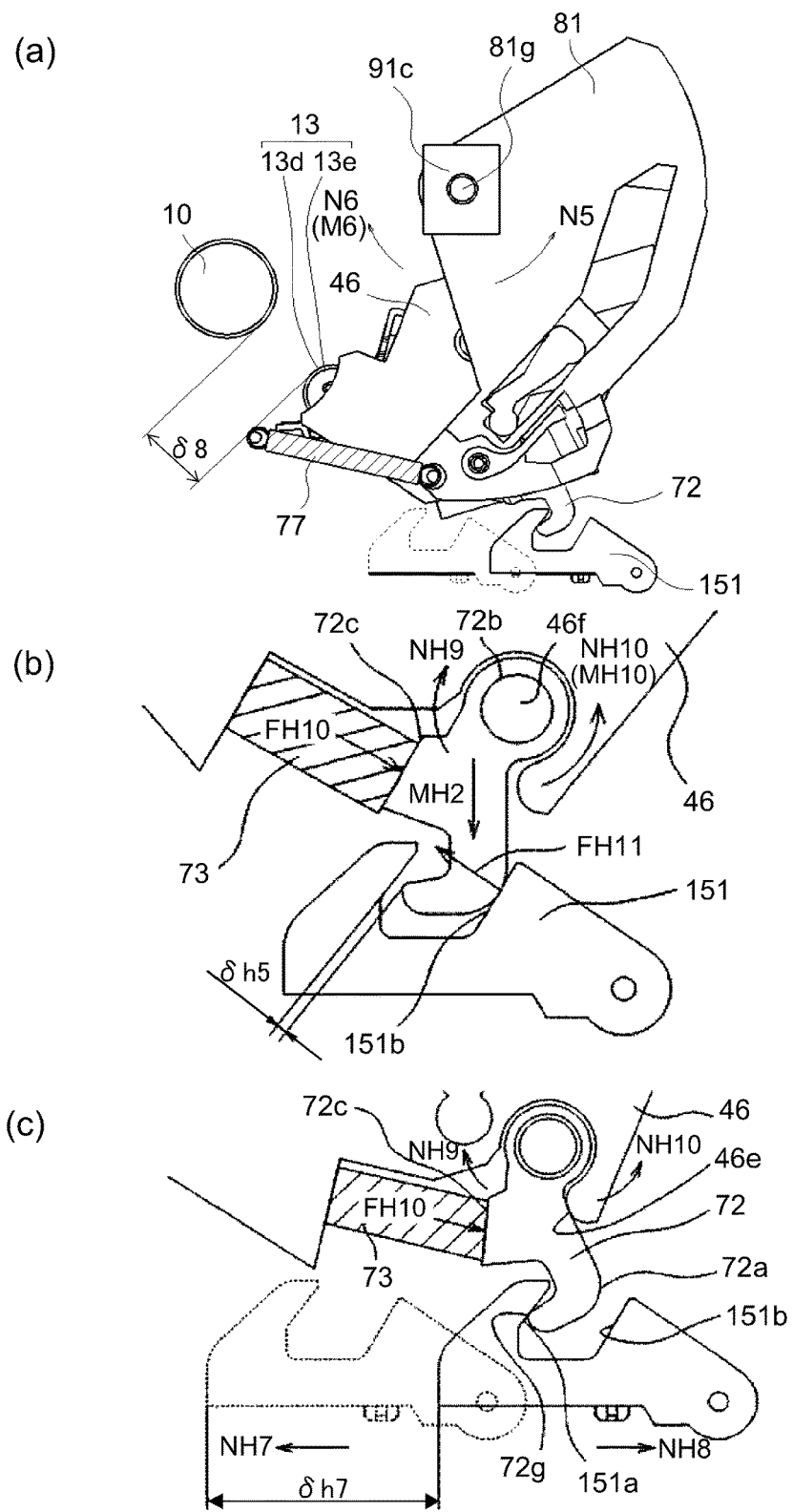

FIG. 28 is a side view of the non-driving side of the developing cartridge and the non-driving side swing guide according to the embodiment of the present invention.

Figure 29:
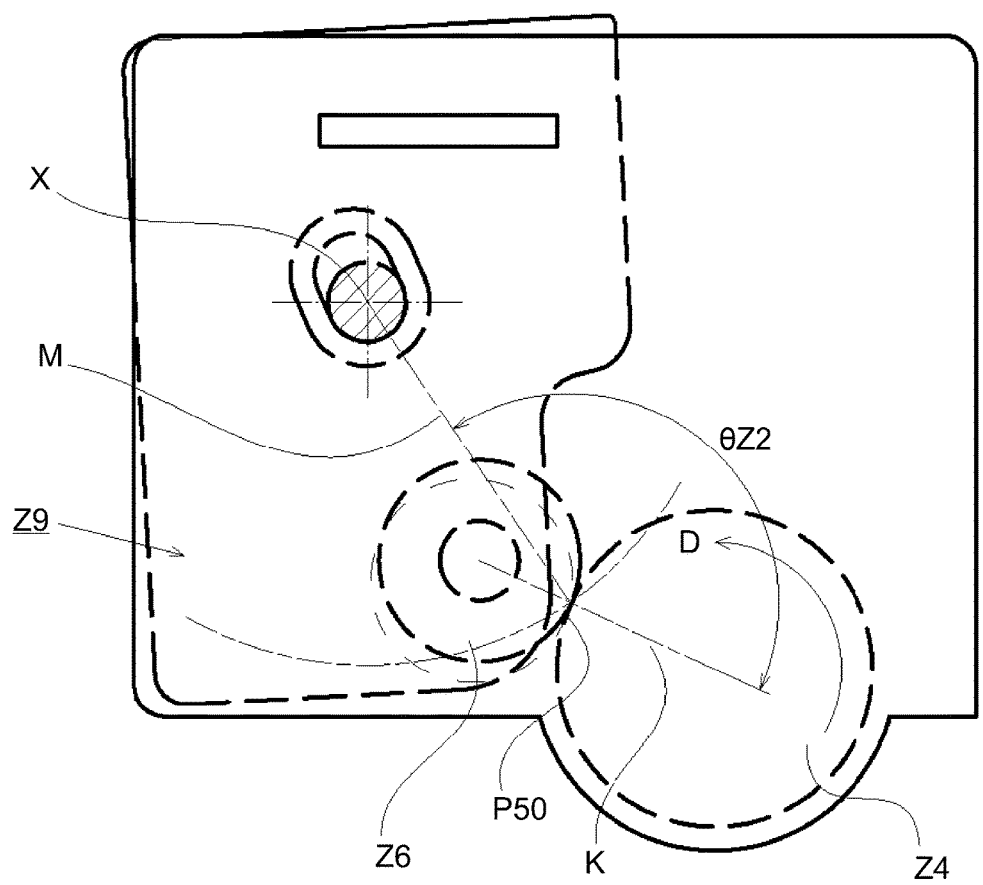

FIG. 29 is an illustration relating to a conventional example.

DETAILED DESCRIPTION OF THE INVENTION

Preferred embodiments of the present invention will be described in detail below with reference to the accompanying drawings.

First Embodiment (Image Forming Apparatus)
(1) Overall Structure

Part (a) of FIG. 2 shows a laser beam printer using an electrophotographic process as an image forming apparatus according to an embodiment of the present invention. Tins laser beam printer comprises a laser beam printer main assembly as an image forming apparatus main assembly, a drum cartridge dismountably mounted to the laser beam printer main assembly, and a developing cartridge. The main assembly of the image forming apparatus thereinafter referred to as the apparatus main assembly) is the remaining part of the image forming apparatus excluding the cartridge.

In the following description, the longitudinal direction of the drum cartridge and the developing cartridge is a direction substantially parallel to the rotation axis $L1$ of the photosensitive drum and the rotation axis $L0$ of the developing roller. Further, the rotation axis $L1$ of the photosensitive drum and the rotation axis $L0$ of the developing roller intersect (substantially perpendicular to) the feeding direction of the recording medium (recording material). The short side direction of the drum cartridge and the developing cartridge is a direction substantially perpendicular to the rotation axis $L1$ of the photosensitive drum and the rotation axis $L0$ of the developing roller.

In this embodiment, the direction in which a drum cartridge or the developing cartridge is mounted to and dismounted from the laser beam printer main assembly is the short side direction of the cartridge. In addition, reference numerals in the description are for reference to the drawings, and do not limit the structure of the present invention.

The image forming apparatus shown in FIG. 2 forms an image with a developer t on a recording medium 2 by an electrophotographic image forming process according to image information supplied from an external device such as a personal computer. Further, in the image forming apparatus, the developing cartridge B1 and the drum cartridge C are mountable to and dismountable from (dismountable from) the apparatus main assembly A1 by the user. Examples of the recording medium 2 include recording sheet, label paper, OHP sheet, cloth, and the like. The developing cartridge B1 includes a developing roller 13 as a developer carrying member, and the drum cartridge C Includes a photosensitive drum 10 as an image bearing member and a charging roller 11, and the like.

The photosensitive drum 10 uniformly charges the surface of the photosensitive drum 10 with the charging roller 11 by a voltage applied from the apparatus main assembly A1. Then, laser light L corresponding to image information is irradiated from the optical means 1 onto the charged photosensitive drum 10, so that an electrostatic latent image corresponding to the image information is formed on the photosensitive drum 10. This electrostatic latent image is developed with a developer t by developing means as will be described hereinafter, and a developer image is formed on the surface of the photosensitive drum 10.

On the other hand, the recording medium 2 accommodated in the sheet feed tray 4 is regulated and is separated and fed one by one by the sheet feed roller 3a and the separation pad 3b pressed against the sheet feed roller 3a in synchronism with the formation of the developer image. Then, the recording medium 2 is fed to the transfer roller 6 as the transfer means along the feeding guide 3d. The transfer roller 6 is urged so as to contact the surface of the photosensitive drum 10.

Next, the recording medium 2 is passed through a transfer nip portion 6a formed between the photosensitive drum 10 and the transfer roller 6. At this time, by applying a voltage comprising a component having a polarity opposite to that of the developer image to the transfer roller 6, the developer image formed on the surface of the photosensitive drum 10 is transferred onto the recording medium 2.

The recording medium 2 onto which the developer image has been transferred is regulated by the feeding guide 3f and fed to the fixing unit 5. The fixing unit 5 includes a driving roller 5a and a fixing roller 5c containing a heater 5b. Then, when the recording medium 2 passes through the fixing nip portion 5d formed between the driving roller 5a and the fixing roller 5c, heat and pressure are applied, and the developer image transferred onto the recording medium 2 is fixed on the medium 2. By this, an image is formed on the recording medium 2. Thereafter, the recording medium 2 is fed by the discharge roller pair 3g and discharged to the discharge unit 3h.

(2) Electrophotographic Image Forming Process

Referring to part (b) of FIG. 2, an electrophotographic image forming process according to the image forming apparatus of this embodiment will be described. The developing cartridge B1 is provided with the developing roller 13 as developing means, a developing blade 15, and so on in a developing container 16. Further, the drum cartridge C is provided with the photosensitive drum 10, the charging roller 11, and the like in a cleaning frame 21.

The developer t stored in a developer accommodating portion 16a of the developing container 16 is fed into the developing chamber 16c through the opening 16b of the developing container 16 by the rotation of the developer feeding member 17 rotatably supported by the developer container 16 in the direction indicated by the arrow X17. The developing container 16 is provided with the developing roller 13 enclosing a magnet roller 12. More specifically, the developing roller 13 comprises a shaft portion 13e and a rubber portion 13d.

The shaft portion 13e is made of electroconductive material such as aluminum and has an elongated cylindrical shape, and the central portion thereof in the longitudinal direction is covered with a rubber portion 13d (see FIG. 4). Here, the rubber portion 13d coats the shaft portion 13e so that the outer shape thereof is concentric with the shaft portion 13e.

The developing roller 13 attracts the developer t in a developing chamber 16c onto the surface of the developing roller 13 by a magnetic force of the magnet roller 12. Further, a developing blade 15 comprises a supporting member 15a made of sheet metal and an elastic member 15b made of urethane rubber, SUS plate or the like, so that the elastic member 15b elastically contacts the developing roller 13 with a constant contact pressure. Then, as the developing roller 13 rotates in a rotational direction X5, the amount of the developer t adhering on the surface of the developing roller 13 is regulated, and triboelectric charge is imparted to the developer t. By this, a developer layer is formed on the surface of the developing roller 13.

The developer t is supplied to a developing area of the photosensitive drum 10 by rotating the developing roller 13 to which the voltage is applied from the apparatus main assembly A1 in contact with the photosensitive drum 10, in the rotational direction X5.

Here, in the case of the contact developing method as in this embodiment, the developing roller 13 is kept in contact with the photosensitive drum 10 at all times, and therefore, there is a possibility that the rubber portion 13b of the developing roller 13 is deformed. For this reason, it is preferable that the developing roller 13 is separated from the photosensitive drum 10 during non-development (non-image formation) period.

On the outer peripheral surface of the photosensitive drum 10, a charging roller 11 rotatably supported by the cleaning frame 21 and urged toward the photosensitive drum 10 is provided in contact with the photosensitive drum 10. The charging roller 11 uniformly charges the surface of the photosensitive drum 10 by applying a voltage thereto from the apparatus main assembly A1.

Specifically, a DC voltage of −1300V is applied as a charging bias voltage. At this time, the surface of the photosensitive drum 10 is contact-charged uniformly to a charged potential (dark potential) of −700V. An electrostatic latent image is formed on the surface of the photosensitive drum 10 by the laser light L of the optical means 1. Thereafter, the developer t is transferred in accordance with the electrostatic latent image on the photosensitive drum 10 to visualize the electrostatic latent image, thereby forming a developer image on the photosensitive drum 10.

(3) Configuration of Developing Cartridge B1

Next, referring to FIG. 3, the structure of the developing cartridge B1 according to the embodiment of the present invention will be described. In the following description, one end side, to which the rotational force is transmitted from the apparatus main assembly A1 to the developing cartridge B1 with respect to the longitudinal direction (rotation axis direction), will be referred to as "driving side". Also, the opposite side (other end side) is referred to as "non-driving side".

Part (a) of FIG. 3 is a perspective view of the developing cartridge B1 as viewed front the driving side. Part (b) of FIG. 3 is a perspective view of the developing cartridge B1 as viewed from the non-driving side. Part (a) of FIG. 4 is an exploded perspective view illustrating the drive side of the developing cartridge B1 is viewed from the drive side, and part (b) of FIG. 4 is a perspective illustration as viewed from the non-drive side. Part (a) of FIG. 5 is an exploded perspective view of the non-driving side of the developing cartridge B1 as viewed from the non-driving side, and part (b) of FIG. 5 is a perspective illustration as seen from the driving side.

As shown in FIGS. 4 and 5, the developing cartridge B1 includes a developing roller 13, a developing blade 15, a driving side development bearing (bearing) 36, a non-driving side development bearing (second bearing) 46, and the like. Here, as will be described in detail hereinafter, on the further end side beyond the driving side development bearing 36 provided in the developing cartridge B1, a driving side swing guide 80 integrally moving (swinging) as an apparatus main assembly with the developing cartridge, a fixed driving side plates 90 are provided in this order. Further, on the further end side of the non-driving side development bearing 46 of the developing cartridge B1, a non-driving side swing guide 81 which integrally moves (swings) with the developing cartridge as an apparatus main assembly, and a fixed non-driving-side side plate 91 are provided in the order named.

As shown in FIGS. 4 and 5, for the developing blade 15, the driving side end portion 15a1 and the non-driving side end portion 15a2 in the longitudinal direction of the supporting member 15an are fixed to the developing container 16 by screws 51 and screws 52.

The drive side development bearing 36 and the non-drive side development bearing 46 are disposed at respective ends with respect to the longitudinal direction of the development container 16. In the developing roller 13, the drive side end portion 13a is fitted to the hole 36a of the drive side development bearing 36, and the non-drive side end portion 13c is fitted with the support portion 46f of the non-drive side bearing 46, so that the developing roller 13 is rotatably supported. At the driving side end portion 13a of the developing roller 13, a developing roller gear 29 is provided coaxially with the developing roller 13 and on the outer side, in the longitudinal direction, of the driving side development bearing 36. The developing roller 13 and the developing roller gear 29 are engaged with each other so as to be integrally rotatable (part (a) of FIG. 3).

The drive side development bearing 36 rotatably supports the drive input gear 27 on the outside in the longitudinal direction. The driving input gear 27 is engaged with the developing roller gear 29. Further, a coupling member 180 (part (b) of FIG. 4) is provided coaxially with the drive input gear 27.

A development side cover 34 is provided at a driving endmost end portion of the developing cartridge B1 so as to cover the drive input gear 27 and the like from the longitudinal outside thereof. The coupling member 180 protrudes longitudinally outward through a hole 34a of the development side cover 34. The coupling member 180 is engaged with the main assembly side driving member 100 provided in the apparatus main assembly A1, so that the rotational force is transmitted. The rotational force inputted to the coupling member 180 is transmitted to the developing roller 13 as a rotating member by way of the drive input gear 27 and the developing roller gear 29.

Further, a first movable member 120 is provided on the driving side development bearing 36. The first movable member 120 includes a driving side contacting/spacing lever 70 as a first main assembly portion and a driving side development pressing spring 71 as a first elastic portion. Further, a second movable member 121 is provided on the non-driving side development bearing 46. The second movable member 121 comprises a non-drive side contact/spacing lever 72 as a second main assembly portion and a non-drive side development pressure spring 73 as a second elastic portion.

The coupling member 180 and peripheral structure thereof will be further described. As shown in FIG. 4, a coupling member 180, a drive input gear 27, and a coupling spring 185 are provided on the drive side of the developing cartridge B1. The coupling member 180 is engaged with the main assembly side driving member 100 provided in the apparatus main assembly A1, and the rotational force is transmitted thereto. Specifically, as shown in part (b) of FIG. 6, the coupling member 180 mainly includes a rotational force receiving portion 180a1, a rotational force receiving portion 180a2, a supported portion 180b, a rotational force transmitting portion 180c1, a guide portion 180d, and a rotational force transmitting portion 180c2.

The rotational force receiving portion 180a1 and the rotational force receiving portion 180a2 of the coupling member 180 are disposed on the outer side in the longitudinal direction from the driving side end portion 27a of the drive input gear 27. Then, when the main assembly side driving member 100 rotates in the direction of the arrow X6 about the rotation axis L4 (hereinafter referred to as the forward rotation X direction), the rotational force imparting unit 100a1 of the main assembly side driving member 100 is brought into contact to the rotational force receiving unit 180a1. Then, the rotational force imparting portion 100a2 of the main assembly side driving member 100 abuts against the rotational force receiving portion 180a2.

By this, the rotational force is transmitted from the main assembly side driving member 100 to the coupling member 180. As shown in part (b) of FIG. 6 and part (e) of FIG. 6, the supported portion 180b of the coupling member 180 has a substantially spherical shape, and the supported portion 180b is supported by the support portion 27b on the inner peripheral surface of the drive input gear 27. In addition, the supported portion 180b of the coupling member 180 is provided with the rotational force transmitting portion 180c1 and the rotational force transmitting portion 180c2. The rotational force transmitting portion 180c1 contacts a rotational force receiving portion 27d1 of the drive input gear 27.

Similarly, the rotational force transmitting portion 180c2 abuts against the rotational force receiving portion 27d2 of the drive input gear 27. By this, the drive input gear 27 is driven by the coupling member 180 driven by the main assembly side drive member 100, and the drive input gear 27 rotates in the forward rotational direction X6 about the rotation axis L3.

Here, as shown in part (c) of FIG. 6, the rotation axis L4 of the main assembly side drive member 100 and the rotation axis L3 of the drive input gear 27 are set so as to be coaxial with each other. However, as shown in part (d) of FIG. 6, there are cases where the rotation axis L4 of the main assembly side drive member 100 and the rotation axis L3 of the drive input gear 27 deviate slightly in parallel from the coaxiality due to variations in component sizes or the like. In such a case, the rotation axis L2 of the coupling member 180 rotates in a state inclined relative to the rotation axis L3 of the drive input gear 27, and the rotational force is transmitted from the main assembly side drive member 100 to the coupling member 180.

Furthermore, the rotational axis L3 of the drive input gear 27 may deviate somewhat from the coaxial axis with respect to the rotational axis L4 of the main assembly side driving member 100 with an angle. In this case, the rotational force is transmitted from the main assembly side drive member 100 to the coupling member 180 in a state in which the rotation axis L2 of the coupling member 180 is inclined relative to the rotation axis L4 of the main assembly side drive member 100.

As shown in part (a) of FIG. 6, a gear portion 27c which is a helical gear or spur gear, is integrally formed with the drive input gear 27 coaxially with the rotation axis L3 of the drive input gear 27. Then, the gear portion 27c is in meshing engagement with the gear portion 29a of the developing roller gear 29. Since the developing roller gear 29 rotates integrally with the developing roller 13, the rotational force of the driving input gear 27 is transmitted to the developing roller 13 by way of the developing roller gear 29. Then, the developing roller 13 rotates about the rotation axis L9 in the rotational direction X5.

(Assembling Drive Side Cover and Peripheral Parts)

Next, the structure of the development side cover 34 and the coupling lever 55 provided at the driving side end portion of the developing cartridge B1 will be described in detail. FIG. 7 is a perspective view and a side view illustrating how the coupling lever 55 and the coupling lever spring 56 are assembled to the development side cover 34.

On the inner side of the development side cover 34 in the longitudinal direction, the coupling lever 55 and the coupling lever spring 56 are assembled. Specifically, the lever positioning boss 34m, which has a cylindrical shape of the development side cover 34, is fitted into the hole 55c of the coupling lever 55, and the coupling lever 55 is mounted at the rotational axis L11 so as to be swingable relative to the development side cover 34.

The coupling lever spring 56 is a coil spring, and one end thereof is engaged with the coupling lever 55, and the other end thereof is engaged with the development side cover 36. Specifically, a working arm 56a of the coupling lever spring 56 is engaged with a spring engaging portion 55b of the coupling lever 55, and a fixed arm 56c of the coupling lever spring 56 is engaged with the spring engaging portion 34s of the development side cover 34 (part (c) of FIG. 7). A coupling spring 185 is assembled on the outer side of the development side cover 34 with respect to the longitudinal direction.

Here, a method of assembling the coupling lever 55 and the coupling lever spring 56 to the development side cover 34 will be explained step by step. First, a cylindrical boss 55a of the coupling lever 55 and a cylindrical portion 56d of the coupling lever spring 56 are installed (part (a) of FIG. 7). At this time, the working arm 56a of the coupling lever spring 56 is engaged with the spring engaging portion 55b of the coupling lever 55. In addition, the fixed arm 56c of the coupling lever spring 56 is deformed in the direction of the arrow X11 about the rotation axis L11.

Next, the hole 55c of the coupling lever 55 is engage with the lever positioning boss 34m of the development side cover 34 (part (a) of FIG. 7—part (b) of FIG. 7). The retaining portion 55d of the coupling lever 55 and a retained portion 34n of the development side cover 34 do not interfere with each other during insertion. Specifically, as shown in part (b) of FIG. 7, the retaining portion 55d of the coupling lever 55 and the retained portion 34n of the development side cover 34 are disposed so as not to overlap as viewed in the longitudinal direction.

In the state shown in part (b) of FIG. 7, as described above, the fixed arm 56c of the coupling lever spring 56 is deformed in the direction of the arrow X11. When the deformation force of the fixed arm 56c of the coupling lever spring 56 is released from the state shown in part (b) of FIG. 7, the state becomes as shown in part (c) of FIG. 7. That is, the fixed arm 56c is engaged with the spring engaging portion 34s of the development side cover 34, and the urging force of the fixed arm 56c of the coupling lever spring 56 is received by the spring engaging portion 34s of the development side cover 34.

By this, the fixed arm 56c of the coupling lever spring 56 receives a reaction force in the direction of the arrow X11 from the spring engaging portion 34s of the development side cover 34. Further, the coupling lever 55 receives an urging force from the coupling lever spring 56 at the spring engaging portion 55b thereof. By this, the coupling lever 55 swings in the direction of the arrow X11 about the rotation axis L11, and the rotation is restricted at a position where a rotation restricting portion 55y of the coupling lever 55 abuts against a regulating surface 34y of the development side cover 34 (part (a) of FIG. 7 to part (c) of FIG. 7). Thus, the assembling of the coupling lever 55 and the coupling lever spring 56 to the development side cover 34 is completed.

At this time, the retaining portion 55d of the coupling lever 55 is in a state of overlapping the retained portion 34n of the development side cover 34 as viewed in the longitudinal direction. That is, the coupling lever 55 is restricted from moving in the longitudinal direction, and is structured so as to be rotatable only about the rotation axis X11. Part (d) of FIG. 7 is a sectional view of the retaining portion 55d of the coupling lever 55.

(Assembling of Developing Side Cover 34)

As shown in FIG. 8, the development side cover 34 in which the coupling lever 55 and the coupling lever spring 56 are integrated is fixed to the outside, in the longitudinal direction, of the driving side development bearing 36. Specifically, a positioning portion 34r1 of the development side cover 34 and a portion-to-be-positioned 36e1 of the driving side bearing 36 are engaged, and a positioning portion 34r2 and a portion-to-be-positioned 36e2 are engaged with each other. By this, the position of the development side cover 34 is determined relative to the driving side development bearing 36. A method of fixing the development side cover 34 to the driving side development bearing 36 may use a screw, an adhesive, or the like, and the method is not limited to that of this embodiment.

When the development side cover 34 is assembled, the rotational force receiving portion 180a1, the rotational force receiving portion 180a2, a guided portion 180d, and the like of the coupling member 180 are exposed outward in the longitudinal direction of the developing cartridge B1 through the hole 34an 34a of the development side cover 34 (part (a) of FIG. 3, FIG. 4). Further, the guided portion 180d of the coupling member 180 is in contact with the guide portion 55e of the coupling lever 55.

As described above, the coupling lever 55 is structured so that an urging force is produced in the direction of the arrow X11 about the rotation axis L11. By this, the coupling member 180 receives the urging force F2 (part (c) of FIG. 8) from the coupling lever 55.

In addition, a coupling spring 185 is mounted on the development side cover 34. The coupling spring 185 is a coil spring, and one end of the coupling spring 185 is in contact with the development side cover 36, and the other end is in contact with the coupling member 180. Specifically, the positioning portion 185a of the coupling spring 185 is supported by the spring supporting portion 34h of the development side cover 34. The fixed arm 185b of the coupling spring 185 is fixed to the spring engaging portion 34j of the development side cover 34.

In addition, the working arm 185c of the coupling spring 185 abuts against the guided portion 180d of the coupling member 180. The working arm 185c of the coupling spring 185 is structured so that an urging force acts in the direction of the arrow L12 about the rotation axis X12 at the positioning portion 185a. By this, the coupling member 180 receives the urging force F1b from the coupling spring 185 (part (b) of FIG. 8).

The coupling member 180 which receives the urging force F2 from the coupling lever 55 and the urging force F1b from the coupling spring 185 is held in the attitude inclined relative to the rotation axis L3 of the drive input gear 27 (rotation axis L2) (part (b) of FIG. 8).

(Basic Operation of Coupling Member 180)

Referring to FIG. 13, the basic operation of the coupling member 180 in the state of the developing cartridge B1 will be described. Part (a) of FIG. 13 is an enlarged view showing the relationship between the coupling member 180, the drive input gear 27, and the drive side development bearing 36 as seen in a longitudinal cross section. Part (b) of FIG. 13 is a perspective view of the driving side development bearing 36. Part (c) of FIG. 13 is a perspective view of the drive input gear 27.

The supported portion 180b of the coupling member 180 is provided in an interior 27t of the drive input gear 27 and is further sandwiched between the restriction portion 27s of the drive input gear 27 and the coupling restriction portion 36s of the drive side development bearing 36. The diameter r180 of the supported portion 180b of the coupling member 180 is in the following relationship relative to the width r27 of the regulating portion 27s of the drive input gear 27 in the X180 direction and the width r36 of the coupling regulating portion 36s of the driving side development bearing 36 in the X180 direction First, the diameter r180 of the supported portion 180b is larger than the width r27, in the X180 direction, of the regulating portion 27s of the drive input gear 27. The diameter r180 of the supported portion 180b is larger than the width r36 of the coupling regulating portion 36s of the driving side development bearing 36 in the X180 direction.

With this structure, the longitudinal direction arrow Y180 of the coupling member 180 is regulated by the supported portion 180b contacting the regulating portion 27s of the driving input gear 27 or the coupling regulating portion 36s of the driving side development bearing 36. Further, for the cross-direction arrow X180 of the coupling member 180, the supported portion 180b is restricted within the range of the interior 27t of the drive input gear 27. Therefore, although the movement of the coupling member 180 in the longitudinal direction Y180 and the cross-sectional direction X180 is restricted, the coupling member 180 is structured to be inclinable in the direction R180 about the center 180s of the supported portion 180.

(Inclined Attitude of the Coupling Member 180)

A tilting operation of the coupling member 180 will be described. As described above, the coupling member 180 is structured so as to receive the driving force from the main assembly side driving member 100 of the apparatus main assembly A1 to be rotated about a swing axis L2. The rotation axis L2 of the coupling member 180 at the time of drive transmission is basically set so as to be coaxial with the rotation axis L3 of the drive input gear 27. Depending on variations in component dimensions or the like, the rotational axis L2 of the coupling member 180 and the rotational axis L3 of the drive input gear 27 may not be coaxial but somewhat displaced in some cases, as has been described hereinbefore.

In this structure, the rotation axis L2 of the coupling member 180 can be inclined in the following direction. They can be roughly divided into the following three attitudes.

(A) Reference Attitude D0

The rotation axis L2 of the coupling member 180 is coaxial with or parallel to the rotation axis L3 of the drive input gear 27.

(B) First Inclined Attitude D1

This is an attitude taken when the developing cartridge B1 moves from a space state in which the photosensitive drum 10 and the developing roller 13 are spaced from each other to a contact state in which they are in contact with each other, after the developing cartridge B1 is mounted to the apparatus main assembly A1. That is, it is the attitude in which the rotational force receiving portion 180a1 and the rotational force receiving portion 180a2 (hereinafter referred to as a rotational force receiving portion 180a1) and the supported portion 180b of the coupling member 180 are faced toward the main assembly side driving member 100 of the apparatus main assembly A1.

(C) Second Inclined Attitude D2

This attitude is taken when the developing cartridge B1 is mounted on the apparatus main assembly A1, and in this attitude, the rotational force receiving portion 180a and the supported portion 180b of the coupling member 180 are faced toward the main assembly side driving member 100 of the apparatus main assembly A1.

Here, the engagement relationship between the coupling member 180 and the driving side development bearing 36 will be described. FIG. 11 is a view illustrating the relationship between the drive side development bearing 36 and the coupling member 180. Part (a) of FIG. 11 is a perspective view illustrating the positions of the drive side development bearing 36 and the coupling member 180. Part (b) of FIG. 11 is an illustration of the drive side development bearing 36 as viewed from the drive side. Part (c) of FIG. 11 is an illustration as seen in the KA cross section in part (b) of FIG. 11, and part (d) of FIG. 11 is an illustration as seen in the KB cross section in part (b) of FIG. 11.

As shown in part (a) of FIG. 11, the coupling member 180 is provided with a phase regulating boss 180e coaxial with the notation axis L2, on the inner side in the longitudinal direction. On the other hand, the driving side development bearing 36 is provided with a recess phase regulating portion 36kb. In particular, the phase regulating portion 36kb is provided with a first inclination regulating portion 36kb1 recessed in the direction of the arrow K1a from the center of the rotational axis L3 of the drive input gear 27, and a second inclination regulating portion 36kb2 recessed in the direction of the arrow K2a. The phase regulating boss 180e of the coupling member 180 is disposed in the phase regulating portion 36kb of the driving side development bearing 36.

That is, the phase regulating boss 180e of the coupling member 180 is regulated in position by the phase regulating portion 36kb of the driving side development bearing 36. In other words, the phase regulating boss 180e of the coupling member 180 can move within the phase regulating portion 36kb of the driving side development bearing 36, more particularly, moves to the first inclination regulating portion 36kb1 and the second inclination regulating portion 36kb2.

When the mounting of the developing cartridge B1 on the apparatus main assembly A1 is completed, the coupling member 180 is engaged with the main assembly side driving member 100. The rotation axis L2 of the coupling member 180, the rotation axis L4 of the main assembly side drive member 100, and the rotation axis L3 of the development input gear 27 are disposed coaxially. In other words, the rotational force receiving portion 180a of the coupling member 180 and the rotational force imparting portion 100a (the rotational force imparting portion 100a1 and the rotational force imparting portion 100a2) of the main assembly side driving member 100 can be engaged with each other (FIG. 6).

The attitude in which the coupling member 180 is coaxial with the rotation axis L3 of the development input gear 27 is the reference attitude D0 (the inclination angle θ2 of the coupling member 180=0°) of the coupling member 180. In addition, the phase regulating boss 180e of the coupling member 180 is disengaged from the second inclination regulating portion 36kb2 of the driving side development bearing 36 and is not yet in contact with any part of the phase regulating portion 36b of the driving side development bearing (part (c) of FIG. 20). Further, the guide portion 55e of the coupling lever 55 is held in a state of sufficiently retracted from the guided portion 180d of the coupling member 180 (part (a) of FIG. 20).

That is, the coupling member 180 contacts the two components, i.e. the coupling spring 185 and the main assembly side driving member 100, by which the inclination angle (θ2) thereof is determined. In such a case, the inclination angle (θ2) of the coupling member 180 may not become θ2=0° even when the mounting of the developing cartridge B1 to the apparatus main assembly A1 is completed.

Hereinafter, referring to FIG. 12, the inclined attitude (reference attitude D0) of the development coupling 180 when the developing cartridge B1 is completely mounted on the apparatus main assembly A1 will be described in detail. FIG. 12 is a view illustrating a state when the coupling member 180 and the main assembly side driving member 100 are in engagement with each other. In the state shown in part (a) of FIG. 12 (side view) and part (b) of FIG. 12 (sectional view), the rotation axis L3 of the drive input gear 27 and the rotation axis L4 of the main assembly side drive member 100 are disposed coaxially, and the rotation axis L3 of the coupling member 180 is also coaxial therewith.

The guided portion 180d of the coupling member 180 receives the urging force (part (d) of FIG. 20) in the direction of the arrow F1 from the coupling spring 185, but the conical portion 180g is in contact with the projection 100g at the points 180g1, 180g2 (part (e) of FIG. 6). By this, the attitude of the coupling member 180 relative to the main assembly side driving member 100 is regulated at two points, that is, points 180g1 and 180g2 of the conical portion 180g. In other words, the rotation axis L2 of the coupling member 180 is coaxial with the rotation axis L4 of the main assembly side drive member 100.

When the main assembly side driving member 100 of the apparatus main assembly A1 is rotationally driven from this state, the rotational force imparting part 100a of the apparatus main assembly A1 and the rotational force receiving part 180a of the coupling member 180 are engaged with each other and the driving force is transmitted to the coupling member 180 (FIG. 6).

In the state shown in pan (c) of FIG. 12, the rotation axis L3 of the drive input gear 27 and the rotation axis L4 of the main assembly side drive member 100 are coaxial, but the rotation axis L2 of the coupling member 180 is inclined. Impending on variations in component dimensions, the conical portion 180g of the coupling member 180 abuts against the projection 100g of the main assembly side driving member 100 at the point 180g1 of the conical portion 180g, but does not abut it at the point 180g2 of the conical portion 180g. At this time, the guided portion 180d of the coupling member 180 receives an urging force in the direction of arrow F1 from the coupling spring 185, so that the rotation axis L2 of the coupling member 180 is inclined.

Therefore, in part (c) of FIG. 12, the point 180g1 of the conical portion 180g of the coupling member 180 abuts against the projection 100g of the main assembly side driving member 100, so that the attitude of the coupling member 180 is regulated. That is, the rotation axis L2 of the coupling member 180 is inclined relative to the rotation axis L4 of the main assembly side drive member 100. In other words, the inclination angle (θ2) of the coupling member 180 is not θ2=0°.

Part (d) of FIG. 12 shows a state in which the rotation axis L2 of the coupling member 180 is inclined in the case that the rotation axis L3 of the drive input gear 27 and the rotation axis L4 of the main assembly side drive member 100 are not coaxial due to variations in component dimensions (see part (d) of FIG. 6). Also in this case, the guide portion 180d of the coupling member 180 receives an urging force from the coupling spring 185 as in the state shown in part (c) of FIG. 12, so that the rotation axis L2 of the coupling member 180 is inclined. That is, the inclination angle (θ2) of the coupling member 180 is not θ2=0°.

However, similarly to part (c) of FIG. 12, the point 180g1 of the conical portion 180g of the coupling member 180 abuts against the projection 100g of the main assembly side driving member 100, so that the attitude of the coupling member 180 is regulated.

However, in either state shown in part (c) of FIG. 12 and part (d) of FIG. 12, when the main assembly side driving member 100 of the apparatus main assembly A1 is rotationally driven, the rotational force imparting section 100a of the apparatus main assembly A and the rotational force receiving portion 180a of the ring member 180 are engaged with each other. Then, the drive is transmitted from the apparatus main assembly A1 to the coupling member 180.

As described above, in a state in which the developing cartridge B1 is completely mounted on the apparatus main assembly A1, the rotation axis L2 of the coupling member 180 may be coaxial with the rotation axis L3 of the drive input gear 27, and may not be coaxial therewith. However, in any of the these cases, when the main assembly side driving member 100 of the apparatus main assembly A1 is rotationally driven, the rotational force imparting section 100a of the apparatus main assembly A1 and the rotational force receiving section 180an of the coupling member 180 are engaged with each other. As a result, the drive is properly transmitted from the apparatus main assembly A1 to the coupling member 180.

The attitude of the coupling member 180 in a state in which the developing cartridge B1 is completely mounted on the apparatus main assembly A1 and the coupling member 180 can receive the driving force from the rotational force imparting section 100a of the apparatus main assembly A1 is the reference attitude D0 of the coupling member 180. The inclination angle is structured so as to fall within a range in which the rotational force imparting portion 100a of the main assembly side driving member 100 and the rotational force receiving portion 180a of the coupling member 180 are not disengaged from each other. Then, details of the first inclined attitude D1 and the second inclined attitude D2 of the coupling member 180 will be described in order.

Referring to FIG. 9 first, a force relationship on the coupling member 180 in the first inclined attitude D1 will be described. FIG. 9 shows a state in which the developing cartridge B1 is mounted in the apparatus main assembly A1 and the photosensitive dram 10 and the developing roller 13 are separated from each other in a spaced state. Part (a) of FIG. 9 is a side view of the developing cartridge B1, and part (b) of FIG. 9 shows the position of the phase regulating boss 180c of the coupling member 180 within the phase regulating portion 36kb of the driving side development bearing 36.

Part (c) of FIG. 9 is a cross-sectional view of the guided portion 180d of the coupling member 180 taken at the position of the guided portion 180d of the coupling member 180 as viewed from the driving side.

The coupling lever 55 receives an urging force for swinging motion in the direction of the arrow X11 (FIG. 7) about the rotation axis L11 from the coupling lever spring 56. When the developing cartridge B1 is mounted in the apparatus main assembly A1, the movement in the direction of the arrow X11 is restricted by the abutment portion 80y (part (b) of FIG. 18) provided in the apparatus main assembly A1. Specifically, the abutment portion 80y and the rotation restricting portion 55y (part (a) of FIG. 7) of the coupling lever 55 are in contact to each other, so that the position of the coupling fever 55 is restricted against the urging force of the coupling lever 55.

Here, the abutment portion 80y is formed integrally with the driving side swing guide 80 (part (a) of FIG. 18) as the first moving member. At this time, the guide portion 55e of the coupling lever 55 is retracted from the guided portion 180d of the coupling member 180.

On the other hand, the guide portion 185d of the coupling spring 185 abuts against the guided portion 180d of the coupling member 180, and the force F1a acts. That is, the guided portion 180d of the coupling member 180 receives a force inclining in the direction of the arrow F1a (part (c) of FIG. 9). At this time, the phase regulating boss 180e of the coupling member 180 is restricted by the guide portion 36kb1a, the guide portion 36kb1b, and the guide portion 36kb1c of the driving side development bearing 36, and finally moves to the first inclination regulating portion 36kb1.

That is, the phase regulating boss 180e of the coupling member 180 is inclined in the direction of the arrow K1a (part (b) of FIG. 9), whereas the rotational force receiving portion 180a of the coupling member 180 and the guided portion 180d are inclined in the direction of the arrow K1b (part (a) of FIG. 9). The attitude of the coupling member 180 is referred to as a first inclined attitude D1 of the coupling member 180.

Here, the direction of the guide portion 185d (the direction of the arrow F1a) of the coupling spring 185 can be set to be perpendicular to the direction of the arrow K1b (part (a) of FIG. 9) with respect to the guided portion 180d of the coupling member 180. This direction is a direction in which the phase regulating boss 180c of the coupling member 180 is brought into abutment against the first inclination restricting portion 36kb1, by which it is possible to reduce the urging force of the coupling spring 185 for retaining the coupling spring 180 in the first inclined attitude D1.

However, this is not restrictive as long as the coupling member 180 can be held in the first inclined attitude D1 by adjusting the urging force of the coupling spring 185 or the like.

(Force Relationship on the Coupling Member 180 in the Second Inclined Attitude D2)

Referring to FIG. 10, a force relationship on the coupling member 180 in the second inclined attitude D2 will be described. FIG. 10 shows a state before the developing cartridge B1 is mounted on the apparatus main assembly A1. Part (a) of FIG. 10 is a side view of the developing cartridge B1 when the developing cartridge B1 is in a free state (natural state). Part (b) of FIG. 10 is a cross-sectional view of the position of the phase regulating boss 180e of the coupling member 180 in the phase regulating portion 36kb of the dynamic-side development bearing 36 as viewed from the non-driving side of the developing cartridge B1.

Part (c) of FIG. 10 is a sectional view of the guided portion 180d of the coupling member 180 taken at the position of the guided portion 180d of the coupling member 180, as viewed in the longitudinal driving side. Both the guide portion 55e of the coupling lever 55 and the guide portion 185d of the coupling spring 185 are in contact with the guided portion 180d of the coupling member 180.

The coupling lever 55 is rotated in the direction of the arrow X11 about the rotation axis L11 by the urging force received from the coupling lever spring 56 not by the abutment portion 80y (part (a) of FIG. 10) of the main assembly A shown in FIG. 9. That is, the guide portion 55e rotates to a position contacting to the guided portion 180d of the coupling member 180.

Here, the guide portion 180d of the coupling member 180 receives a force inclining in the direction of the arrow F3 (part (c) of FIG. 10), as described above. At this time, the phase regulating boss 180e of the coupling member 180 is restricted by the guide portion 36kb2a, guide portion 36kb2b and the guide portion 36Kb2c of the drive side development bearing 36, and finally moves to the second inclination restricting portion 36kb2.

That is, the phase regulating boss 180e of the coupling member 180 is inclined in the arrow K2a direction (part (b) of FIG. 10), whereas the rotational force receiving portion 180a of the coupling member 180 and the guided portion 180d inclines in the arrow K2b direction (part (a) of FIG. 10). The above-described attitude of the coupling member 180 is referred to as a second inclined attitude D2 of the coupling member.

(4) Drum Cartridge C

Referring to FIG. 14, the structure of the drum cartridge C will be described. Part (a) of FIG. 14 is a perspective view, as seen from the non-driving side, of the drum cartridge C, and part (b) of FIG. 14 is a perspective view of the photosensitive drum 10 and the peripheral portion of the charging roller 11, in which the cleaning frame 21 and drum bearing (third bearing) 30, the drum shaft 54 and so on are not shown for better illustration. As shown in FIG. 14, the drum cartridge C includes the photosensitive drum 10, a charging roller 11, and the like. The charging roller 11 is rotatably supported by a charging roller bearing 67a and a charging roller bearing 67b and is urged to the photosensitive drum 10 by a charging roller urging member 68a and a charging roller urging member 68b.

A drive side flange 24 is integrally fixed to a drive side end 10a of the photosensitive drum 10, and a non-drive side flange 28 is integrally fixed to a non-drive side end 10b of the photosensitive drum 10. The driving side flange 24 and the non-driving side flange 28 are fixed coaxially with the photosensitive drum 10 by clamping, adhesion, or the like. For opposite longitudinal ends of the cleaning frame 21, a drive side drum bearing 30 as a first drum bearing, and a non-drive side drum bearing (fourth bearing) 31 as a second drum bearing including a drum shaft 54 are fixed to The drive side end portion and the non-drive side end portion, respectively by means such as screws, adhesion, press fitting or the like.

The driving side flange 24 integrally fixed to the photosensitive drum 10 is rotatably supported by the drum bearing 30, and the non-driving side flange 28 is rotatably supported by the drum shaft 54.

A charging roller gear 69 is provided at one longitudinal end of the charging roller 11, and the charging roller gear 69 is engaged with a gear portion 24g of the driving side flange 24. The drive side end portion 24a of the drum flange 24 is structured to receive the rotational force from the apparatus main assembly A1 side (not shown). By this, as the photosensitive drum 10 rotates and drives, the charging roller 11 also rotates. As described above, the peripheral speed of the surface of the charging roller 11 is set to be about 105 to 120% of the peripheral speed of the surface of the photosensitive drum 10.

(5) The Mounting/Dismounting Structure of the Developing Cartridge B1 to the Apparatus Main Assembly A1

A method of mounting the developing cartridge B1 to the apparatus main assembly A1 will be described. FIG. 15 is a perspective illustration of the apparatus main assembly A1 as viewed from the non-driving side, and FIG. 16 is a perspective illustration of the apparatus main assembly A1 as viewed from the driving side. FIG. 17 is an illustration of a process of mounting the developing cartridge B1 to the apparatus main assembly A1 as viewed from the drive side.

As shown in FIG. 15, the developing cartridge B1 is provided with a guided portion 46d including a positioning portion 46b and a rotation stopping portion 46c on the non-driving side development bearing 46, in addition, as shown in FIG. 16, the driven side cover 34 is provided with a guided portion 34d including a positioning portion 34b and a rotation stopping portion 34c.

On the other hand, as shown in FIG. 15, a driving side guide member 92 fixed to the driving side plate 90 constituting the casing of the apparatus main assembly A1 is provided on the driving side of the apparatus main assembly A1. The driving side guide member 92 is provided with a first guide portion 92a, a second guide portion 92b, and a third guide portion 92c. A drive side swing guide 80 as a first moving (moving) member moving (swinging) together with the developing cartridge B1 in the apparatus main assembly A1 is provided on the driving side of the apparatus main assembly A1.

In FIG. 15, the first guide portion 92an of the driving side guide member 92 is provided with a groove of a mounting/dismounting path X1a along the mounting/dismounting path of the developing cartridge B1, and a second guide portion 92b of the driving side guide member 92 is provided with a groove of the mounting/dismounting path X1b Along the mounting/dismounting path of the developing cartridge B1, the third guide portion 92c of the drive side guide member 92 is provided with a groove of a dismountable path X3 along the mounting/dismounting path of the drum cartridge C.

The driving side swing guide 80 is provided with a first guide portion 80an and a second guide portion 80b. A groove along the mounting/dismounting path X2a of the developing cartridge B1 is formed on an extension of the first guide portion 92a of the driving side guide member 92 at the first guide portion 80a of the driving side swing guide 80. A groove shape along the mounting/dismounting path X2b of the developing cartridge B1 is formed on an extension of the second guide portion 92b of the driving side guide member 92 at the second guide portion 80b of the driving side swing guide 80.

Similarly, as shown in FIG. 16, a non-driving side guide member 93 fixed to the non-driving side plate 91 constituting the casing of the apparatus main assembly A1 is provided in the non-driving side of the apparatus main assembly A1. The non-driving side guide member 93 is provided with a first guide portion 93a and a second guide portion 93b. In addition, the non-driving side swing guide 81 as a second moving (swinging) member capable of moving (swinging) like the driving side swing guide 80 is provided on the non-driving-side side plate 91.

A groove of a mounting/dismounting path XH1a extending along the mounting/dismounting path of the developing cartridge B1 is formed in the first guide portion 93a of the drive side guide member 93, and a groove of the mounting/dismounting path XH3 extending along the mounting/dismounting path of the drum cartridge C is formed. In addition, in FIG. 16, a guide portion 81a is provided on the non-driving side swing guide 81. The guide portion 81a of the non-driving side swing guide 81 is provided with a groove of the mounting/dismounting path XH2a extending along the mounting/dismounting path of the developing cartridge B1 on the extension of the first guide portion 93a of the non-driving side guide member 93.

Detailed structures of the drive side swing guide 80 and the non-drive side swing guide 81 will be described hereinafter.

(Mounting of Developing Cartridge B1 to Apparatus Main Assembly A1)

A method of mounting the developing cartridge B1 to the apparatus main assembly A1 will be described below. As shown in FIGS. 15 and 16, the inside of the apparatus main assembly A1 is exposed by swinging the openable/closable main assembly cover 94 disposed in the upper part of the apparatus main assembly A1 in the opening direction D1. Thereafter, the guided portion 46d (FIG. 15) of the non-driving side bearing 46 of the developing cartridge B1 and the first guide portion 93a (FIG. 16) of the non-driving side guide member 93 of the apparatus main assembly A1 are engaged. And, the guided portion 34d (FIG. 16) of the development side cover 34 of the developing cartridge B1 and the first guide portion 92a (FIG. 15) of the driving side guide member 92 of the apparatus main assembly A1 are engaged with each other.

By this, the developing cartridge B1 is inserted into the apparatus main assembly A1. along the mounting/dismounting path X1a formed by the first guide portion 92a of the driving side guide member 92 and the first guide portion 93a of the non-driving side guide member 93.

In addition, when mounting the developing cartridge B1 in the apparatus main assembly A1, as described above, the coupling member 180 is in the above-described second inclined attitude D2. The coupling member 180 is inserted into the second guide portion 92b of the driving side guide member 92 while maintaining the second inclined attitude D2. More specifically, there is a gap between the coupling member 180 and the second guide portion 92b of the driving side guide member 92. Therefore, when the developing cartridge B1 is inserted into the apparatus main assembly A1 along the mounting/dismounting paths X1b, XH1b, the coupling member 180 remains in the second inclined attitude D2.

Next, the developing cartridge B1 inserted into the apparatus main assembly A1 along the mounting/dismounting paths X1a, XH1a shown in FIGS. 15 and 16 is inserted into the apparatus main assembly A1 as described below. That is, it is inserted into the main assembly A1 along the mounting/dismounting paths X2a, XH2a (shown in FIGS. 15 and 16) formed by the first guide portion 80an of the drive side swing guide 80 and the guide portion 81a of the non-drive side swing guide 81.

More specifically, the guided portion 34d (FIG. 16) provided on the development side cover 34, which is guided by the first guide portion 92a of the driving side guide member 92 of the apparatus main assembly A1, is delivered as follows. That is, the guided portion 34d is relayed to the first guide portion 80a (FIG. 15) of the drive side swing guide 80 of the apparatus main assembly A1.

Similarly, on the non-driving side, the guided portion 46d (FIG. 15) provided on the non-driving side development bearing 46, which was guided by the first guide portion 93a of the non-driving side guide member 93 of the apparatus main assembly A1. In accordance with the process, it is delivered as follows. That is, the guided portion 46d is relayed to the guide portion 81a (FIG. 16) of the non-driving side swing guide 81 of the apparatus main assembly A1.

The coupling member 180 provided at the end portion on the driving side of the developing cartridge 111 is relayed from the second guide portion 92b of the driving side guide member 92 of the apparatus main assembly A1 to the second guide portion 80b of the driving side swing guide 80. As in the case described above, there is a gap between the coupling member 180 and the second guide portion 80b of the driving side swing guide 80.

(Positioning of Developing Cartridge B1)

A structure with which the developing cartridge B1 is positioned on the driving side swing guide 80 and the non-driving side swing guide 81 of the apparatus main assembly A1 will be described. The basic structure is the same between the driving side and the non-driving side, and therefore, the driving side of the developing cartridge B1 will be described below as an example. FIG. 17 shows the state of the developing cartridge B1 and the driving side swing guide 80 in a process in which the developing cartridge B1 is mounted on the apparatus main assembly A1.

Part (a) of FIG. 17 shows the state in which the guided portion 34d provided on the development side cover 34 of the developing cartridge B1 is guided by the first guide portion 80a of the driving side swing guide 80, and the developing cartridge B1 is on the mounting/dismounting path X2a. Part (b) of FIG. 17 shows a state in which the developing cartridge B1 is further advanced from the state of part (a) of FIG. 17, and the positioning portion 34b of the guided portion 34d of the development side cover 34 contacts the positioning portion 82a of the driving side pressing member 82 provided on the driving side swing guide 80 at the point P1.

Further, FIG. 18 is a perspective view illustrating the peripheral shapes of the driving side swing guide 80 and the driving side pressing member 82. Part (a) of FIG. 18 is a perspective illustration as viewed from the driving side in the longitudinal direction, and pan (b) of FIG. 18 is a perspective illustration as viewed from the direction non-driving side in the longitudinal direction. 18(c) is an exploded perspective view of the driving side swing guide 80, the driving side pressing member 82, and the driving side pressing spring 83. Part (d) of FIGS. 18 and 18(e) are enlarged detailed views of the periphery of the driving side pressing member 82.

Here, as shown in part (a) of FIG. 18 and part (b) of FIG. 18, the driving side pressing member 82 is provided with a hole portion 82b, a seating surface 82c, and a regulating portion 82d in addition to the positioning portion 82a. As shown in part (c) of FIG. 18, the hole portion 82b is engaged with the boss portion 80c of the driving side swing guide 80 and is supported so as to be rotatable around the boss portion 80. Further, one end portion 83c of the driving side pressing spring 83, which is a compression spring is in contact with the seat surface 82c, in addition, as shown in part (d) of FIG. 18, the other end portion 83d of the driving side pressing spring 83 is in contact with the seat surface 80d of the driving side swing guide 80.

By this, the driving side pressing member 82 is structured to receive the urging force F82 in the direction of rotating in the direction of the arrow Ra1 about the boss portion 80c of the driving side swing guide 80. The restricting portion 82d is restricted by the driving side pressing member 82 abutting against the rotation restricting portion 80e provided in the driving side swing guide 80, so that the position of the driving side pressing member 82 is determined in the direction of the arrow Ra1 (part (d) of FIG. 18).

Here, as shown in part (e) of FIG. 18, the driving side pressing member 82 rotatably supported by the driving side swing guide 80 is rotatable in the direction of the arrow Ra2 against the urging force F82 of the driving side pressing spring 83. Further, the upper end portion 82e of the driving side pressing member 82 can swing in the direction of the arrow Ra2 to a position where it does not protrude beyond the guide surface 80w of the driving side swing guide 80.

Part (c) of FIG. 17 shows a state in which the mounting of the developing cartridge B1 is further advanced from the state of part (a) of FIG. 17. Then, the guided portion 34d integrally including the positioning portion 34b and the rotation stopping portion 34c of the development side cover 34 contacts the front-side inclined surface 82w of the driving-side pressing member 82, so that the driving-side pressing member 82 is depressed in the direction of the arrow Ra2.

In more detail, the guided portion 34d of the development side cover 34 contacts the front side slope 82w of the driving side pressing member 82 to press against the driving side pressing member 82. By this, the driving side pressing member 82 swings in the counterclockwise direction (the direction of the arrow Ra2) about the boss portion 80c of the driving side swing guide 80 against, the urging force F82 of the driving side pressing spring 83. Part (c) of FIG. 17 shows a state in which the positioning portion 34b of the driving side cover 34 and the upper end portion 82e of the driving side pressing member 82 are in contact with each other. At that time, the restricting portion 82d of the driving side pressing member 82 is spaced from the rotation restricting portion 80e of the driving side swing guide 80.

Part (d) of FIG. 17 shows a state in which the developing cartridge B1 is further advanced from the state of part (c) of FIG. 17, and the positioning portion 34b of the driving side cover 34 and the positioning portion 80f of the driving side swing guide 80 are in contact with each other. As described above, the driving side pressing member 82 is structured to receive the urging force F82 in the direction of rotating in the direction of the arrow Ra1 about the boss portion 80c of the driving side swing guide 80. Therefore, the rear side inclined surface 82s of the driving side pressing member 82 urges the positioning portion 34b of the driving side cover 34 by the urging force F4.

By this, the positioning portion 34b contacts the positioning portion 80f of the driving side swing guide 80 without a gap at the point P3. By this, the driving side of the developing cartridge B1 is positioned and fixed to the driving side swing guide 80.

The positioning between the positioning portion 46d of the non-driving side development bearing 46 and the non-driving side swing guide 81 is the same as that on the driving side (the description will be omitted). By this, the developing cartridge B1 is positioned and fixed to the driving side swing guide 80 and the non-driving side swing guide 81.

(Operation of Coupling Member 180 in the Mount Process of Developing Cartridge B1)

Referring to FIGS. 19, 20 and 21, the operation of the coupling member 180 in the mounting process of the developing cartridge B1 will be described. As described above, in a state before the developing cartridge B1 is mounted on the apparatus main assembly A1, the coupling member 180 is in the second inclined attitude D2. The coupling member 180 is mounted to the apparatus main assembly A1 while maintaining the second inclined attitude D2. Part (a) of FIG. 19 shows a state in which the developing cartridge B1 is mounted on the apparatus main assembly A1 and is on the mounting/dismounting path X2a formed in the driving side swing guide 80 and the non-driving side swing guide 81.

Part (e) of FIG. 19 is an illustration viewed in the direction of the arrow X50 in part (a) of FIG. 19 in the state of part (a) of FIG. 19. In the second inclined attitude D2 of the coupling member 180, when the developing cartridge B1 is on the mounting/dismounting path X2a, the rotational force receiving portion 180an of the coupling member 180 faces toward the main assembly side driving member 100 of the apparatus main assembly A1.

More specifically, in the neighborhood of the contact between the coupling member 180 and the main assembly side driving member 100 which will be as will be described hereinafter, the coupling member 180 inclines toward the main assembly side driving member 100 about the center 180s of the supported portion 180b. The second inclination regulating portion 36kb2 of the driving side development bearing 36 is structured so as to accomplish this (FIGS. 11, 13, and 10).

Part (b) of FIG. 19 shows a slate in which the developing cartridge B1 is further inserted into the mounting/dismounting path X2a from the state shown in part (a) of FIG. 19. Part (f) of FIG. 19 is an illustration as viewed in the direction of the arrow X50 in part (b) of FIG. 19 in the state of part (b) of FIG. 21. The annular portion 180f of the coupling member 180 and the main assembly side driving member 100 are brought into contact with each other. Since the coupling member 180 is inclined toward the main drive member 100 from the state shown in part (a) of FIG. 19 to the state shown in part (b) of FIG. 19, the coupling member 180 and the main driving shaft 100 can be easily engaged with each oilier.

As described above, the receiving member 180d of the coupling member 180 maintains the second inclined attitude D2 by receiving the resultant force F3 from the coupling lever 56 and the coupling spring 185 (FIG. 10). For the convenience of the following explanation, the angle (inclination angle) formed by the rotation axis L3 of the drive input gear 27 and the rotation axis L2 of the coupling member 180 when the coupling member 180 is in the second inclined attitude D2 is θ2a (part (f) of FIG. 19).

Part (c) of FIG. 19 shows a state in which the developing cartridge B1 is further inserted into the mounting/dismounting path X2a from the state shown in part (b) of FIG. 19. Part (g) of FIG. 19 is an illustration as viewed in the direction of the arrow X50 in part (c) of FIG. 19 in the state of part (c) of FIG. 19. FIG. 21 is a cross-sectional view illustrating a force relationship around the coupling member 180 when the annular portion 180f of the coupling member 180 is in contact with the main assembly side driving member 100.

In part (c) of FIG. 19 and part (g) of FIG. 19, the rotation restricting portion 55y of the coupling lever 55 and the abutment portion 80y installed on the driving side swing guide 80 are in contact with each other. From the state shown in part (b) of FIG. 19 to the state shown in part (c) of FIG. 19, the annular portion 180f of the coupling member 180 contacts the main assembly side driving member 100, θ2b (≤θ2a) as shown in part (g) of FIG. 19.

More specifically, the coupling member 180 receives the force F100 from the main assembly side driving member 100 at the abutment portion. In the case that the force F100 is in a direction against the force F3 initially received by the coupling member 180 and is larger than F3, the inclination angle of the coupling member 180 is small, and is relatively closer to the direction parallel to the axis L3 of the drive input gear 27. That is, the inclination angle of the coupling member 180 changes toward the arrow X180 about the center 180s (FIG. 13) of the supported portion 180b, and θ2b<θ2a becomes satisfied (part (f) of FIG. 19, part (g) of FIG. 19).

At this time, the coupling member 180 abuts against the four parts of the coupling lever 55, namely, the coupling spring 185, the main assembly side driving member 100, and the phase regulating portion 36kb of the driving side development bearing 36, by which the inclination angle (θ2b) thereof is determined.

Further, as shown in part (b) of FIG. 21, in the case that the force received by the coupling member 180 from the main assembly side driving member 100 at the contact portion 180g is smaller than F3 in the direction resisting the force F3, or in the case that the direction is not against the force F3, the inclination angle of the coupling member 180 docs not change. That is, since θ2b=θ2an is satisfied, the main assembly side driving member 100 moves within the range of the play existing due to the tolerance variation of parts in the direction of the rotation axis L4.

Part (d) of FIG. 19 shows a state in which the developing cartridge B1 is further inserted in the direction of the mounting/dismounting path X2a from the state shown in part (c) of FIG. 19. Part (h) of FIG. 19 is an illustration as viewed in the direction of the arrow X50 in part (d) of FIG. 19 in the state of part (d) of FIG. 19. In part (d) of FIG. 19, the rotation restricting portion 55y of the coupling lever 55 is in contact with the abutment portion 80y of the driving side swing guide 80. Therefore, as the developing cartridge B1 is inserted into the mounting/dismounting path X2a direction (FIG. 15), the coupling lever 55 relatively rotates in the direction of the arrow X11b about the rotation axis L11 within the developing cartridge B1.

At this time, the guide portion 55e of the coupling fever 55 also rotates in the direction of the arrow X11b about the rotation axis L11. By this, the inclination angle θ2c (part (h) of FIG. 19) of the coupling member 180 decreases along the guide portion 55e of the coupling lever 55 while receiving the urging force of the coupling spring 185 (θ2c<θ2b). In addition, the coupling member 180 contacts three components, namely the coupling spring 185, the main assembly side driving member 100, and the phase regulating portion 36kb of the driving side development bearing 36, by which the inclination angle (θ2c) thereof is determined.

FIG. 20 shows a state in which the developing cartridge B1 is further inserted in the direction of the mounting/dismounting path X2a from the state shown in part (d) of FIG. 19, and the mounting of the developing cartridge B1 on the apparatus main assembly A1 is completed.

Here, the coupling member 180 is engaged with the main assembly side driving member 100 and assumes the reference attitude D0 (the inclination angle θ2 of the coupling member 180=0°). At this time, the phase regulating boss 180e of the coupling member 180 is disengaged from the second inclination restricting portion 36kb2 of the driving side development bearing 36, and is not in contact with any part of the phase regulating portion 36b of the driving side development bearing 36 part (c) of FIG. 20).

In addition, the guide portion 55e of the coupling lever 55 is held in a state sufficiently retracted front the guided portion 180f of the coupling member 180. That is, the coupling member 180 contacts the two components, that is, the coupling spring 185 and the main assembly side driving member 100, by which the inclination angle (θ2) thereof is determined.

Here, the coupling member 180 is engaged with the main assembly side driving member 100 and assumes the reference attitude D0 (the inclination angle θ2 of the coupling member 180=0°). At this time, the phase regulating boss 180e of the coupling member 180 is disengaged from the second inclination restricting portion 36kb2 of the driving side development bearing 36, and is not in contact with any part of the phase regulating portion 36b of the driving side development bearing 36 part (c) of FIG. 20).

In addition, the guide portion 55e of the coupling lever 55 is held in a state sufficiently retracted from the guided portion 180f of the coupling member 180. That is, the coupling member 180 contacts the two components, namely, the coupling spring 185 and the main assembly side driving member 100, by which the inclination angle (θ2) thereof is determined.

(Operation of the Coupling Member 180 in the Process of Taking Out the Developing Cartridge B1)

The operation of the coupling member 108 in the process of taking out the developing cartridge B1 from the apparatus main assembly A1 will be described. The operation at the time of taking out the developing cartridge B1 from the main assembly device A1 is an operation opposite to that at the time of mounting as described above.

First, the user swings the main assembly cover 94 of the apparatus main assembly A1 in the opening direction D1 (FIG. 15, FIG. 16) to expose the inside of the apparatus main assembly A. At this time, the developing cartridge B1 is held in a contact attitude in which the developing roller 13 and the photosensitive drum 10 are in contact with each other by a structure (not shown) together with the driving side swing guide 80 and the non-driving side swing guide 81. Then, the developing cartridge B1 is moved in the dismounting direction along the mounting/dismounting locus XH2 provided by the drive side swing guide 89 and the non-drive side swing guide 81.

As the developing cartridge B1 moves, the abutment portion 80y of the driving side swing guide 80, which is already in contact with the rotation restricting portion 55y of the coupling lever 55, moves (from the state shown in part (d) of FIG. 19 to the state shown in part (c) of FIG. 19. With this, the coupling lever 55 swings in the direction of the arrow X11 about the rotation axis L11. When the developing cartridge B1 is moved further, the coupling lever 55 swings in the direction of the arrow X11, and the guide portion 55e of the coupling lever 55 comes into contact with the guided portion 180d of the coupling member 180 (part (c) of FIG. 19).

The coupling member 180 receiving the urging force from the coupling lever 55 and the coupling spring 185 starts to move toward the second inclined attitude D2 as described above. Finally, the phase regulating boss 180e of the coupling member 180 is restricted by the guide portion 36kb2a, the guide portion 36kb2b, and the guide portion 36kb2c of the driving side development bearing 36, and is engaged with the second inclination regulating portion 36kb2. Further, the state of the coupling member 180 is maintained in the second inclined attitude D2.

Thereafter, the developing cartridge B1 is taken out to the outside of the main assembly device A1 by moving in the dismounting direction along the mounting/dismounting locus XH1 provided on the drive side guide member 92 and the non-drive side guide member 93.

As described above, in this embodiment, by providing the developing cartridge B1 with the coupling lever 55 and the coupling lever spring 56 that exerts the urging force on the coupling member 180, the coupling member 180 can be tilted to the second inclined attitude D2. The tilt direction in which the coupling member 180 is inclined by the coupling lever 55 is set to the direction of the mounting/dismounting path X2a of the developing cartridge B1, and furthermore, the swinging motion of the coupling lever 55 is structured to be interrelated with the user's operation of mounting/dismounting the developing cartridge B1.

(6) The Contact/Spacing Lever 70 as a Movable Member

Figure 1:
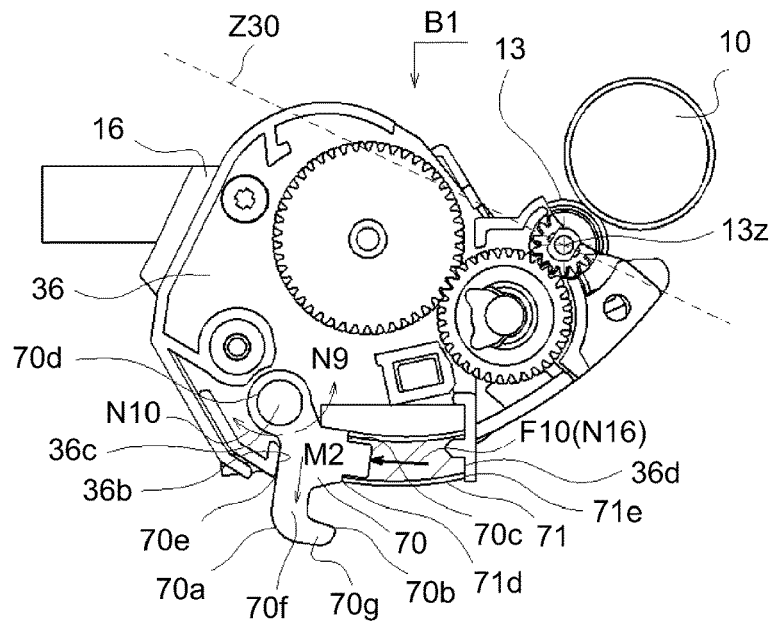
FIG. 1 is a side view of a developing cartridge according to an embodiment of the present invention.
Figure 1:
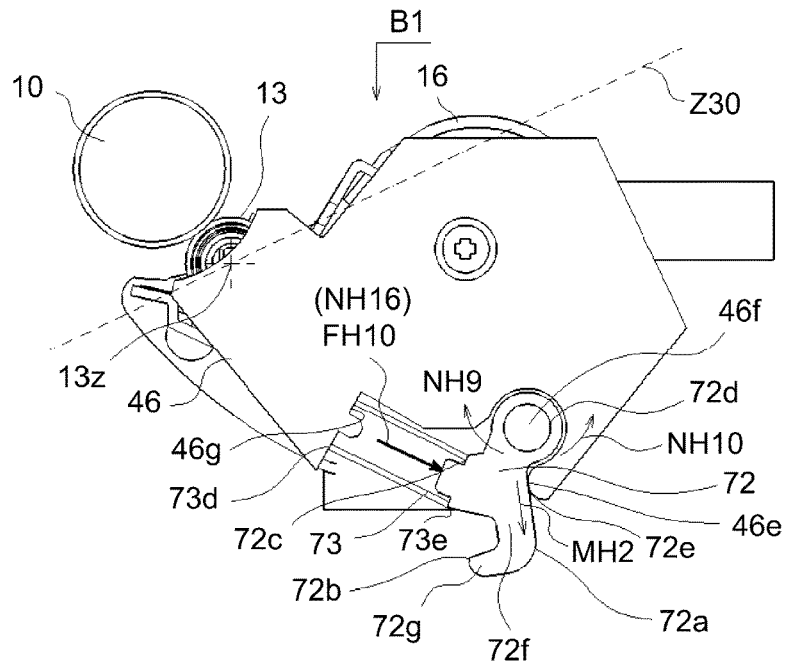

Referring to part (a) of FIG. 1, the drive side contact/spacing lever 70 as a drive side movable member will be described. Part (a) of FIG. 1 is an illustration of the driving side contacting/spacing lever 70 and the peripheral shape, and is a sectional view of the developing cartridge B1 as viewed from the drive side. As shown in part (a) of FIG. 1, the driving side contacting/spacing lever 70 includes a first contact surface 70a, a second contact surface 70b, a third contact surface 70c, a supported portion 70d serving as a rotation supporting point, a drive side regulating contact portion 70e, and a first projecting portion 70f.

A supported portion 70d of the drive side contact/spacing lever 70 is rotatably supported by the support portion 36c of the drive side development bearing 36. Specifically, by fitting the hole of the supported portion 70d of the drive side contacting/spacing lever 70 and the boss of the support portion 36c of the drive side development bearing 36, the drive side contact separation lever 70 is supported so as to be rotatable about the boss of the tooth 36c (in the direction of the arrow N9).

Further, in this embodiment, the supporting portion 36c of the driving side development bearing 36 is parallel to the rotation axis L0 of the developing roller 13. That is, the driving side development contacting/spacing lever 70 is capable of swinging on a plane perpendicular to the rotation axis L0 of the developing roller 13.

Further, the drive-side contact/spacing lever 70 is in contact with one end 71d of the drive side development pressure spring 71 as a first elastic portion which is a compression spring, at the third contact surface 70c. The other end 71e of the driving side developing pressure spring 71 is in contact with the abutting surface 36d of the driving side development bearing 36. By this, the driving side contacting/spacing lever 70 receives a force from the driving side development pressing spring 71 in the direction of the arrow N16, at the third contact surface 70c. The driving side development pressing spring 71 urges in such a direction (N16) that the first contact surface 70a of the driving side contacting/spacing lever 70 is away from the developing roller 13.

In the free state of the developing cartridge B1 alone, that is, in a state before the developing cartridge B1 is mounted on the apparatus main assembly A1, the driving side regulating abutment portion 70e is in contact with the regulating portion 36b provided in the driving side development bearing 36 (part (a) of FIG. 1).

Referring to part (b) of FIG. 1, the non-driving side contact/spacing lever 72 as a non-driving side movable member will be described. The non-driving side is similar in structure to the driving side. Part (b) of FIG. 1 is a side view of the developing cartridge B1 as viewed from the non-driving side. However, for the sake of better illustration of the structure of the non-driving side contact/spacing lever 72, some parts are omitted.

As shown in part (b) of FIG. 1, the non-driving side contact/spacing lever 72 includes a non-driving side first abutting surface 72a, a non-driving side second abutting surface 72b, a non-driving side third abutting surface 72c, a supported portion 72d, a non-driving side restricting abutment portion 72e, and a non-driving side first projecting portion 72f. The supported portion 2d of the non-driving side contact separating lever 72 is supported by the supporting portion 46f of the non-driving side development bearing 46. Specifically, by fitting the hole of the supported portion 72d of the non-driving side contact/spacing lever 72 and the boss of the supporting portion 46f of the non-driving side development bearing 46, the non-driving side contact/spacing lever 72, is supported so as to be rotatable about the boss of the support portion 46f (direction of the arrow NH9).

In addition, in this embodiment, the supporting portion 46f of the non-driving side development bearing 46 is parallel to the rotation axis L0 of the developing roller 13. That is, the non-driving side development contacting/spacing lever 72 is swingable on a plane perpendicular to the rotation axis L0 of the developing roller 13.

Further, the non-driving side contact/spacing lever 72 is in contact with one end 73e of the non-driving side developing pressure spring 73 as a second elastic portion which is a compression spring, at the non-driving side third abutting surface 72c. The other end 73d of the non-driving side developing pressure spring 73 is in contact with the abutting surface 46g of the non-driving side development bearing 46. By this, the non-drive side contact separation lever 72 receives the force FH10 from the non-drive side development pressure spring 73 in the direction of the arrow NH16, at the non-drive side third contact surface 72c. Then, the non-driving side developing pressure spring 73 urges the first contact surface 72a of the non-driving side contact separating lever 72 in a direction (arrow NH16) away from the developing roller 13.

In the free state of the developing cartridge B1 alone, that is, in a state before the developing cartridge B1 is mounted on the apparatus main assembly A1, the non-driving side restricting abutment portion 72e is in contact with the regulating portion 46e provided in the non-driving side development bearing 46 (FIG. (b)).

Here, the urging force F10 (part (a) of FIG. 1) of the driving side developing pressure spring 71 and the urging force FH10 (part (b) of FIG. 1) of the non-driving side developing pressure spring 73 are set to different levels. In addition, the driving side third abutting surface 70c and the non-driving side third abutting surface 72c are disposed at different angles. This may be appropriately selected in consideration of the peripheral structure so that the pressing force of the developing roller 13 against the photosensitive drum 10 as will be described hereinafter is appropriate. In this embodiment, in order to rotationally drive the developing roller 13, the following relationship is satisfied in consideration of the influence of the moment M6 (part (a) of FIG. 25) produced in the developing cartridge 13 at the time when receiving the drive transmission from the apparatus main assembly A1.

$$F20 < FH10$$

In FIG. 1, the driving side contact/spacing lever 70 is disposed in the side opposite to the photosensitive drum 10, with respect to a line 230 passing through a center 13z of the developing roller 13 and parallel to the mounting direction X2 (FIG. 15) of the developing cartridge B1 to the apparatus main assembly A1 (In the direction of gravity in this is embodiment). The first projecting portion 70f of the driving side contacting/spacing lever 70 protrudes beyond the outer shapes of the developing container 16, the driving side development bearing 36, and the development side cover 34 (FIG. 8) is viewed in the longitudinal direction.

In addition, the protruding direction (the direction of the arrow M2) of the first projecting portion 70f protrudes in the direction crossing with the moving direction (fire directions of the arrows N9 and N10) of the driving side contacting/spacing lever 70 and with the moving direction of the developing cartridge B1, that is, the direction of the arrow N6 (A) in (part (a) of FIG. 25).

The first projecting portion 70f is provided with the first contact surface 70a on the opposite side of the developing roller 13 as viewed from the supported portion 70d of the driving side contacting/spacing lever 70. When the developing roller 13 is pressed against the photosensitive drum 10, the second abutting surface 150b of the driving-side apparatus pressing member 150 and the first abutting surface 70an of the driving side contacting/spacing lever 70 come into contact with each other (part (a) of FIG. 25).

In addition, on the free end of the first projecting portion 70f, a separated portion 70g protruding toward the developing roller 13 in the direction crossing the projecting direction (direction of arrow M2) of the first projecting portion 70f is provided. The dismounted portion 70g is provided with the second contact surface 70b. Then, as shown in part (d) of FIG. 27, when separating the developing roller 13 away from the photosensitive drum 10, the first abutting surface 150a of the driving side device pressing member 150 and the second abutting surface 70b of the driving side contacting/spacing lever 70 contact with each other.

Next, referring to part (b) of FIG. 1, the shape of the non-driving side contact/spacing lever 72 will be described in detail. Similarly to the driving side described above, the non-driving side contacting/spacing lever 72 is disposed in the side opposite from the photosensitive drum 10 with respect to a line Z30 passing through the center 13z of the developing roller 13 and parallel to the mounting direction X2 of the developing cartridge B1 to the apparatus main assembly A1 (gravity direction in this embodiment).

The first projecting portion 72f of the non-driving side contact separating lever 72 protrudes beyond the outer shapes of the developing container 16 and the non-driving side development hearing 46 as viewed in the longitudinal direction. Further, the protruding direction of the first projecting portion 72f (the direction of the arrow MH2) protrudes in the direction crossing with the moving direction of the non-driving side contact/spacing lever 72 (the direction of the arrows NH9 and NH10) and the direction of the arrow M1 which is the moving direction of the developing cartridge B1 (part (a) of FIG. 27).

In addition, the first projecting portion 72f is provided with the first contact surface 72a on the side opposite to the developing roller 13 as viewed from the supported portion 72d of the non-driving side contact/spacing lever 72. When the developing roller 13 is pressed against the photosensitive drum 10, the second abutting surface 151b of the non-driving side device pressing member 151 and the first abutting surface 72a of the non-driving side contacting/spacing lever 72 come into contact with each other (part (b) of FIG. 25).

Further, in part (b) of FIG. 1, at the free end of the first projecting portion 72f, there is provided a separated portion 72g projecting toward the developing roller 13 side (direction of arrow MH2) in the direction crossing the projecting direction of the first projecting portion 72f from the developing container 16. The separated portion 72g has a second contact surface 72b. When separating the developing roller 13 from the photosensitive drum 10, a first abutting surface 151a of the non-driving side device pressing member 151 and the second abutting surface 72b of the non-driving side contacting/spacing lever 72 contact with each other (part (c) of FIG. 28).

Referring to FIG. 22, the disposition of the driving side contacting/spacing lever 70 and the non-driving side contacting/spacing lever 72 will be described in detail. FIG. 22 is a front view of the developing cartridge B1 as viewed from the developing roller 13 side. However, the neighborhood of the supporting portion 36a of the driving side development bearing 36 supporting the driving side supported portion 13a of the developing roller 13 and the neighborhood of the supporting portion 46f of the non-driving side development bearing 46 supporting the non-driving side supported portion 13c of the developing roller 13 are indicated in a cross-section.

As described above, the driving side contacting/spacing lever 70 is provided at the driving side end portion in the longitudinal direction of the developing cartridge B1. in addition, the non-driving side contacting/spacing lever 72 is provided at the non-driving side end portion in the longitudinal direction of the developing cartridge B1. The swinging motions of the driving side contacting/spacing lever 70 and the non-driving side contacting/spacing lever 72 (in the directions of the arrows NH9 and NH10 in part (a) of FIG. 1 and in the directions of the arrows NH9 and NH10 in part (b) of FIG. 1) are not interrelated with each other, but they are independent from each other.

Here, in the longitudinal direction, the driving side supported portion 13a of the developing roller 13 is disposed more outside (closer to the end) of the driving side end portion L13bk of the image forming range L13b than the supporting portion of the driving side development bearing 36. Further, the non-driving side supported portion 13c of the developing roller 13 is supported by the supporting portion 46f of the non-driving side development bearing 46 more outside (more end side) in the longitudinal direction than the non-driving side end portion L13bh of the image forming range L13b. The driving side contacting/spacing lever 70 and the non-driving side contacting/spacing lever 72 are disposed so as to overlap at least partially the range of the entire length L13a of the developing roller 13.

Further, it is disposed outside the image forming range L13b of the developing roller 13. That is, the driving-side contacting/spacing lever 70 and the driving side supported portion 13a of the developing roller 13 at least partially overlap the region sandwiched between the driving side end portion L13bk of the image forming area L13b and the driving side end portion L13ak of the total length L13a of the developing roller 13. Therefore, the driving-side contacting/spacing lever 70 and the driving side supported portion 13a of the developing roller 13 are disposed at positions close to each other in the longitudinal direction.

In addition, the non-driving side contact/spacing lever 72 and the driven side supported portion 13c of the developing roller 13 at least partly overlap the region L14h sandwiched between the non-driving side end portion L13bh of the image forming area L13b and the non-driving side end portion L13a of the total length L13a of the developing roller 13. Therefore, the non-driving side contact/spacing lever 72 and the driving side supported portion 13c of the developing roller 13 are disposed at positions close to each other in the longitudinal direction.

(Contacting and Spacing Structure)
(Contacting and Spacing Structure of the Apparatus Main Assembly and Development Spacing Structure)

Contacting and spacing structure of the apparatus main assembly and development spacing structure will be described. Part (a) of FIG. 23 is an exploded perspective view of the driving side plate 90 of the apparatus main assembly A1 as viewed from the non-driving side, and part (b) of FIG. 23 is a side view as seen from the non-driving side. Part (a) of FIG. 24 is an exploded perspective view of the non-driving side plate 91 of the apparatus main assembly A1 as viewed from the driving side, and part (b) of FIG. 24 is a side view as seen from the driving side.

As shown in FIG. 23, in the apparatus main assembly A1, a driving side guide member 92 and a driving side swing guide 80 for mounting and dismounting the developing cartridge B1 to and from the apparatus main assembly A1 are provided. The driving side guide member 92 and the driving side swing guide 80 guide the driving side guided portion 34d (FIG. 16) of the developing cartridge B1 when the developing cartridge B1 is mounted in the main assembly of the apparatus.

As shown in part (a) of FIG. 23, for the drive-side guide member 92, a boss-shaped portion-to-be-positioned 92d projecting from the drive-side guide member 92, and a rotation-restricted portion 92e are supported by the positioning portion 90a and the rotation restricting portion 90b in the form of holes provided on the drive-side side plate 90, respectively. The driving side guide member 92 is positioned and fixed to the driving-side side plate 90 by fixing means such as a screw (not shown). In addition, for the driving side swing guide 80, a cylindrical supported to-be-supported projection 80g as a third restricted portion is supported by a supporting portion 90c in the form of an elongated hole provided in the driving side plate 90 the as a third restricting portion as a swinging center.

In this embodiment, the hole-shaped support portion 90c of the driving side plate 90 has an elongated size which is substantially the same as, in one direction, and larger than, in the orthogonal direction, the diameter dimension of the cylindrical projected portion 80g of the driving side swing guide 80. Therefore, the driving side swing guide 80 can slide relative to the driving side plate 90 only in a predetermined direction (arrow N3 direction parallel to the long hole direction and arrow N4 direction) and is swingable in the direction of arrow N5 and arrow N6.

In the above description, the supporting portion 90e provided on the driving side plate 90 is in the form of an elongated hole (recess shape), whereas the supported projection 80g provided in the driving side swing guide 80 has a protruded shape, but the relationship is not limited to this example, and the relationship may be reversed.

Further, between the projection 80h of the driving side swing guide 80 and the projection 90d of the driving side plate 90, a driving side urging means 76 which is a tension spring is provided. The driving side swing guide 80 is urged in the arrow N6 direction so that the projection 80h of the driving side swing guide 80 and the projection 90d of the driving side plate 90 approach each other by the driving side urging means 76.

The apparatus main assembly A1 is provided with the drive-side apparatus pressing member 150 for bringing the surface of the photosensitive drum 10 into contact with and out of contact from the developing roller 13. The drive-side apparatus pressing member 150 is supported by a bottom plate (not shown) in a state movable in the arrow N7 direction and the arrow N8 direction.

On the other hand, as shown in FIG. 24, the apparatus main assembly A1 is provided with a non-driving side guide member 93 and a non-driving side swing guide 81 for mounting and dismounting the developing cartridge B1 to and from the apparatus main assembly A1. The non-driving side guide member 93 and the non-driving side swing guide 81 guide the non-driving side guided portion 46d (FIG. 15) of the developing cartridge B1 when the developing cartridge B1 is mounted in the main assembly of the apparatus.

As shown in part (a) of FIG. 24, for the non-driving side guide member 93, a boss-shaped portion-to-be-positioned 93d and a rotation restricting portion 93e projecting from the non-driving side guide member 93 are supported by positioning portion 91a and the rotation restricting portion 91b in the form of holes provided on the non-driving side plate 91, respectively. The non-drive side guide member 93 is positioned and fixed to the non-drive side plate 91 by fixing means such as a screw (not shown).

In addition, for the non-driving side swing guide 81, the cylindrical supported projection 81g is supported by the supporting portion 91c in the form of a hole provided in the non-driving-side side plate 91 as a fourth restricted portion. In this embodiment, the outer diameter of the cylindrical protruding supported portion 81g of the non-driving side swing guide 81 is formed in such a shape that a gap is provided relative to the inner diameter of the hole shaped supporting portion 91c of the non-driving side plate 91. Therefore, the non-driving side swing guide 81 is movable within the range of the gap between the supported projection 81g and the support portion 91c relative to the non-driving side plate 91, and is swingable in the arrow N5 direction and the arrow N6 direction.

Here, when the developing cartridge B1 is in the image forming position (first position), the gap is provided between the supported projecting portion 81g and the supporting portion 91c, as described above. And, when the developing cartridge B1 is in the spaced position (second position), the supported projecting portion 81g is in contact with at least one point of the supporting portion 91c.

In the above description, the supporting portion 91c provided in the non-driving side plate 91 has a hole shape (recess shape), whereas the supported projection 81g provided in the non-driving side swing guide 81 has a projection shape, but the present invention is not limited to this example, and the recess-projection relation may be reversed.

In addition, between the projection 81h of the non-drive side swing guide 81 and the projection 91d of a non-drive side plate 91, a non-drive side urging means 77 which is a tension spring is provided. The non-driving side swing guide 81 is urged in the direction of the arrow N6 so that the projecting portion 81h of the non-driving side swing guide 81 and the projecting portion 91d of the non-driving side guide member 91 approach each other by the non-driving side energizing means 77.

Similarly to the driving side, in the apparatus main assembly A1, a non-driving side apparatus pressing member 151 for bringing the surface of the photosensitive drum 10 into contact with the developing roller 13 and out of contact from each other is provided 24(b)). The non-driving side device pressing member 151 is supported by a bottom plate (not shown) so as to be movable in the arrow N7 direction and the arrow N8 direction.

(Pressing and Contacting Relative to the Photosensitive Drum)

Next, pressurization and separation of the developing roller 13 with respect to the photosensitive dram 10 will be described. The structure of the developing roller 13 will be described below. Part (a) of FIG. 25 is a side view illustrating a slate in which the developing roller 13 provided in the developing cartridge B1 supported by the driving side swing guide 80 is in contact with the photosensitive drum 10. Part (a) of FIG. 26 is a detailed view of the neighborhood of the driving side contacting/spacing lever 70 in part (a) of FIG. 25, and for the purpose of better illustration, the driving side swing guide 80 and the development side cover 34 are omitted.

In this embodiment, a so-called contact developing method is used, in which the developing roller 13 carrying the developer t on its surface is directly brought into contact with the photosensitive drum 10 to develop the electrostatic latent image on the photosensitive drum 10. As shown in part (a) of FIG. 25, the developing roller 13 comprises a shaft portion 13e and a rubber portion 13d. The shaft portion 13e is a conductive elongated cylindrical shape made of aluminum or the like, and the central portion thereof with respect to the longitudinal direction is covered with a robber portion 13d (FIG. 4).

Here, the rubber portion 13d is covered on the shaft portion 13e so that the outer shape is concentric with the shaft portion 13e. A magnet roller 12 is provided inside the cylinder of the shaft portion 13e. The rubber portion 13d carries the developer t on the peripheral surface thereof, and a bias voltage is applied to the shaft portion 13e. Then, by bringing the rubber portion 13d carrying the developer t into contact with the surface of the photosensitive drum 10, the electrostatic latent image on the photosensitive drum 10 is developed.

Next, the description will be made as to a mechanism for press-contacting the developing roller 13 to the photosensitive drum 10 with a predetermined contact pressure. As described above, the drive side swing guide 80 slidable with respect to the drive side plate 90 only in the arrow N3 direction parallel to the long hole direction and in the arrow N4 direction, and is swingable in the arrow N5 direction and the arrow N6 direction. In addition, as shown in part (b) of FIG. 25, the non-driving side swing guide 81 is movable relative to the non-driving side plate 91 within a range of a gap between the supported projecting portion 81g and the supporting portion 91c, and is swingable in the direction of arrow N5 and in the direction of arrow N6.

As described above, the developing cartridge B1 is positioned relative to the driving side swing guide 80 and the non-driving side swing guide 81. Therefore, the developing cartridge B1 is slidable only in the arrow N3 direction and the arrow N4 direction parallel to the longitudinal direction of the elongated hole on the driving side in the apparatus main assembly A1, and is swingable in the arrow N5 direction and the arrow N6 direction (part (a) of FIG. 25). In addition, the non-driving side is movable within the range of the gap between the supported projection 81g and the support part 91c and is swingable in the arrow N5 direction and the arrow N6 direction (part (b) of FIG. 25).

In this state, as shown in part (a) of FIG. 25 and part (a) of FIG. 26, the second abutting surface 150b of the driving side device pressing member 150 and the first abutting surface 70a of the driving side contacting/spacing lever 70 are in contact with each other. By this, the driving side contact/spacing lever 70 is rotated in the direction of the arrow N9 in part (a) of FIG. 26 against the urging force of the driving side development pressing spring 71. Then, the third contact surface 70c of the driving side contacting/spacing lever 70 compresses the driving side development pressing spring 71 and receives the urging force F10a (part (a) of FIG. 26) from the driving side development pressing spring 71. By this, a moment M10 in the direction of the arrow N10 is applied on the driving side contacting/spacing lever 70.

At this time, the second abutting surface 150b of the driving side device pressing member 150 and the first abutting surface 70a of the driving side contacting/spacing lever 70 are in contact with each other. Therefore, the first abutting surface 70a of the driving side contacting/separating lever 70 receives a force F11 from the second abutting surface 150b of the driving side device pressing member 150 so that the moment which is balanced with the moment M10 is applied on the driving side contact separating lever 70

From. Therefore, the external force of the force F11 is applied on the developing cartridge B1.

As described above in conjunction with part (a) of FIG. 25, a driving side energizing means 76 is provided between the projecting portion 80h of the driving side swing guide 80 and the projecting portion 90d of the driving-side side plate 90, and it is urged in the direction of the arrow N12. Therefore, an external force of a force F12 in the direction of the arrow N12 is applied on the developing cartridge B1 positioned to the driving side swing guide 80.

That is, by the force F11 by the driving side developing pressure spring 71, the force F12 by the driving side urging means 76, and the drive transmission by the apparatus main assembly A1, the developing cartridge B1 receives the moment M6 in the direction of approaching the developing roller 13 and the photosensitive drum 10 to each other (arrow N6 direction). By this, the elastic layer 13d of the developing roller 13 can be pressed against the photosensitive drum 10 with a predetermined pressure.

Next, a method of positioning the developing cartridge B1 relative to the drum cartridge C on the driving side will be described. As shown in part (a) of FIG. 25, the driving side drum bearing 30 of the drum cartridge C is provided with a first regulating portion K11 in the neighborhood of the photosensitive drum 10. In addition, the driving side development bearing 36 of the developing cartridge B1 is provided with a first regulated portion K10 in the neighborhood of the developing roller 13. Further, the first regulating portion K11 is provided on one end side, with respect to the rotation axis direction, on the upstream side of the straight line L20 connecting the center of the photosensitive drum 10 and the center of the developing roller 13 in the rotational direction arrow C5 of the photosensitive drum 10.

As described above, the developing cartridge B1 receives the external forces F11 and F12 and the moment M6 for pressing the developing roller 13 against the photosensitive drum 10. In a state where the developing roller 13 is pressed against the photosensitive drum 10, the reaction force F13 from the photosensitive drum 10 is received at the contact portion P30 between the developing roller 13 and the photosensitive drum 10. Here, the developing roller 13 rotates in the direction of the arrow X5, the photosensitive drum 10 rotates in the direction of the arrow C5, and the surface speed of the developing roller 13 is set to be higher than the surface speed of the photosensitive drum 10.

At this time, the reaction force F13 is directed in the direction of the arrow N13 from the center of the photosensitive drum 10 toward the center of the developing roller 13, the frictional force F14 at the contact point P30 is in the direction of an arrow N14 perpendicular to the reaction force F13, and it is in the direction (arrow C5) of the movement of the surface of the photosensitive drum 10 (from the downstream side to the upstream side). That is, the developing cartridge B1 tends to move in the direction of the arrow N14 while keeping the developing roller 13 in contact with the photosensitive drum 10. Further, due to the component force of the frictional force F14 to the arrow N3 which is the long hole direction of the support portion 90c, the supported projection 80g of the drive side swing guide 80 tends to move in the direction N3.

Therefore, in a state where the developing roller 13 integrated with the driving side swing guide 80 is in contact with the photosensitive drum 10, the first regulating portion K11 of the driving side drum bearing 30 and the first regulated portion K10 of the driving side development bearing 36 are in contact with each other. At this time, at point P31 of contact portion between the first regulated portion K10 and the first regulating portion K11, the first regulated portion K10 receives the reaction force F20 from the first regulating portion K11 in the direction of the arrow N20.

Therefore, as for the developing cartridge B1 integrated with the driving side swing guide 80, the supported portion 80g of the driving side swing guide 80 is supported by the supporting portion 90c of the driving-side side plate 90. Further, the position of the developing roller 13 is uniquely determined by the photosensitive drum 10 and the first regulated portion K10 contacting the first regulating portion K11 at the point P31 at the point P30.

Here, the rotational force in the direction of the arrow N40 is transmitted from the apparatus main assembly A1 by way of the coupling member 180 to the developing cartridge B1. At that time, the developing cartridge B1 receives the moment M40 in the direction of the arrow N40. Then, the developing cartridge B1 is swingable in the direction of the arrow N6, and the moment M40 received by the drive transmission from the apparatus main assembly A1 is a component of a moment M6 for swinging the developing cartridge B1 in the arrow N6 direction. However, the moment M40 changes in accordance with the torque for rotating the developing roller 13 of the developing cartridge B1.

Further, the torque for rotating the developing roller 13 varies depending on the use time of the developing cartridge B1, the use environment (temperature and humidity or the like), the accuracy of parts and the like, and is not uniform. That is, the pressure contact force of the developing roller 13 to the photosensitive drum 10 also changes depending on the use time of the developing cartridge B1, the use environment (temperature or humidity or the like), component precision, and the like.

However, with this structure of this embodiment, in a state where the developing roller 13 and the photosensitive drum 10 are in contact with each other, the first regulating portion K11 of the driving side drum bearing 30 and the first regulated portion K10 of the driving side development bearing 36 are in contact with each other. That is, the moment M6 in the direction in which the developing roller 13 presses against the photosensitive drum 10 is received not only at the contact point P30 between the developing roller 13 and the photosensitive drum 10, but also at the contact point P31 between the first regulating section K11 and the first regulated section K10. Therefore, it is possible to reduce the influence, of the moment M6 in the direction in which the developing roller 13 presses against the photosensitive drum 10, on the pressing force between the developing roller 13 and the photosensitive drum 10.

As a result, the change of the pressure contact force of the developing roller 13 with respect to the photosensitive drum 10 due to the use time of the developing cartridge B1, the use environment (greenhouse degree or the like), the component precision, and the like, can also be reduced, and therefore, the pressure of the developing roller 13 to the photosensitive drum can be stabilized.

Here, there may be an error in the relative positional relationship between the developing roller 13, the first regulated portion K10, and the supported portion 80g of the driving side swing guide 80 due to the tolerances or the like of the components constituting the developing cartridge B1. At this time, when the supported portion 80g of the driving side swing guide 80 is in a fitting relationship with the supporting portion 90b of the driving side plate 90, either one of the developing roller 13 and the first regulated portion K10 may be out of contact with the photosensitive drum 10, or the regulating section K11 in some cases.

However, with this structure of this embodiment, the supported portion 80g of the drive side swing guide 80 is supported by the support portion 90b of the drive side plate 90 slidably in the arrow N3 direction and the arrow N4 direction. Therefore, even when there is an error in the relative positional relationship due to component tolerance or the like at three positions (the developing roller 13, the first regulated portion K10, the supported portion 80g of the driving side swing guide 80), the supported portion 80g moves in the arrow N3 direction and the arrow N4 direction. By this, the developing roller 13 and the photosensitive drum 10, and the first regulating portion K11 and the first regulated portion K10 can be reliably brought into contact with each other, respectively.

Next, part (b) of FIG. 25 is a side view illustrating a state in which the developing roller 13 provided in the developing cartridge B1 supported by the non-driving side swing guide 81 is in contact with the photosensitive dram 10. Part (b) of FIG. 28 is a detailed view of the neighborhood of the driving side contacting/spacing lever 72 in part (a) of FIG. 28. For the sake of better illustration, the non-driving side swing guide 81 and a part of the non-driving side development bearing 46 are omitted.

As shown in part (b) of FIG. 25 and part (b) of FIG. 28, by the non-driving side developing pressure spring 73 and the non-driving side urging means 77, external forces FH11, FH12 are also applied to the developing cartridge B1 in the non-driving side.

A method of positioning the developing cartridge B1 relative to the drum cartridge C on the non-driving side will be described. Here, the contact portion between the photosensitive drum 10 and the developing roller 13 on the non-driving side is defined as a point PH30. The non-driving side drum bearing 31 of the drum cartridge C is provided with a second regulating portion KH11 in the neighborhood of the photosensitive drum 10. In addition, the non-driving side development bearing 46 of the developing cartridge B1 is provided with a second regulated portion (second regulated portion) KH10 in the neighborhood of the developing roller 13.

Further, the second regulating portion KH11 is provided in the downstream side of the straight line L20 connecting the center of the photosensitive drum 10 and the center of the developing roller 13, in the rotational direction C5 of the photosensitive drum 10. Furthermore, the second non-regulating portion KH10 is provided with an arc shape concentric with the developing roller 13. As described above, the developing cartridge B1 receives the external forces FH11 and FH12 (part (b) of FIG. 25) for pressing the developing roller 13 against the photosensitive drum 10.

Here, a straight line connecting the center of the developing roller 13 and the contact point PH31 between the second regulated portion KH10 and the second regulating portion KH11 is defined as a straight line L22. An angle θ32 is between the straight line L22 and the straight line L20. The external force FH11 acting on the non-driving side developing pressure spring 73 has an angle θ31 with respect to the straight line L20 connecting the center of the photosensitive drum 10 and the center of the developing roller 13, on the side where the second regulating section KH11 is provided. The external force FH12 applied by the non-driving side biasing unit 77 has an angle θ30 with respect to the straight line L20 connecting the center of the photosensitive drum 10 and the center of the developing roller 13 on the side where the second regulating unit KH11 is provided.

That is, the force F112 which is the resultant force of the external force F11 and the external force F12 acts in the direction of the angle θ33 with respect to the straight line L29 (here, the action point is the center of the developing roller 13). At this time, the relationship between the angle θ32 and the angle θ33 is set as follows:

$$0 < \theta 33 < \theta 32$$

Therefore, in a state in which the developing roller 13 is in contact with the photosensitive drum 10, the second regulating portion KH11 of the non-driving side drum bearing 31 and the second regulated portion KH10 of the non-driving side development bearing 46 are in contact with each other. Then, at a point PH31 of contact portion between the second regulated portion KH10 and the second regulating portion KH11, the second regulated portion KH10 receives the reaction force FH20 from the second regulating portion KH11 in the direction of the arrow NH20.

That is, the developing roller 13 and the photosensitive drum 10 (contact point PH30), the second regulated portion KH10 and the second regulating portion KH11 (contact point PH31) are brought into contact with each other by the external forces FH11 and FH12, so that the position of the roller 13 is uniquely determined.

At this time, as for the non-driving side swing guide 81, there is a gap between the supported projecting portion 81g and the supporting portion 91c with respect to the non-driving side plate 91. That is, as described above, although the center position of the developing roller 13 is fixed, there is nothing in the non-driving side that regulates the attitude of the developing cartridge B1 in the rotational direction (arrow NH25, direction of arrow NH26) about the center of the developing roller 13. The attitude of the developing cartridge B1 in the direction of the arrow NH25 and the direction of the arrow NH26 is regulated only in the driving side.

Here, the alignment of the straight line L20 connecting the rotation axis L0 of the developing roller 13, the center of the supported portion 80g of the driving side swing guide 80, and the center of the supported portion 81g of the non-driving side swing guide 81, may be offset due too the component tolerances. At this time, if there is no gap between the supported portion 81g of the non-driving side swing guide 81 and the supporting portion 91c of the non-driving-side side plate 91, the alignment of the straight line L20 has to be corrected to the rotation axis L0 of the developing roller 13. In order to correct the alignment of the straight line L20, it is necessary to deform the developing container 16 by the external forces FH11, FH12 applied on the developing cartridge B1 in the non-driving side.

For this reason, since the external forces FH11 and FH12 for pressing the developing roller 13 against the photosensitive drum 10 are lost in deforming the developing container 16, the developing roller 13 cannot be pressed against the photosensitive drum 10 with a predetermined pressure. That is, by the amount of misalignment of the alignment axis L0 connecting the rotation axis L0 of the developing roller 13, the center of the supported portion 80g of the driving side swing guide 80 and the center of the supported portion 81g of the non-driving side swing guide 81, the contact pressure of the developing roller 13 to the developing roller 13 varies.

Therefore, with this structure of this embodiment, the non-driving side swing guide 81 is such that the gap is provided between the supported projecting portion 81g and the supporting portion 91c with respect to the non-driving side plate 91, and therefore, the developing container 16 will not be deformed even if the alignment between the rotation axis L0 and the straight line L20 deviates. In other words, the gap is provided such that the support projection 81g does not contact the support portion 91c even when there is a misalignment between the rotation axis L0 (FIG. 4) and the straight line L20 (FIG. 25B) of the maximum developing roller 13 to a maximum extent in consideration of component tolerances and the like.

As a result, it is possible to pressure-contact the developing roller 13 to the photosensitive drum 10 with a stable pressure, in addition, the position of the developing roller 13 is determined, by the developing cartridge B1 abutting against the contact point PH30 and the contact point PH31 without a gap by the external force FH11 and FH12 shown in part (b) of FIG. 25. Therefore, alignment between the photosensitive drum 10 and the developing roller 13 can be determined with high accuracy.

The second regulated portion KH10 has an arc shape concentric with the developing roller 13. For this reason, even when the attitude of the developing cartridge B1 in the direction of the arrow NH25 and the direction of the arrow NH26, which is determined in the driving side, changes, the position of the point PH31 that is the contact portion between the second regulated portion KH10 and the second regulating portion KH11 does not change. Therefore, even when the attitude of the developing cartridge B1 in the direction of the arrow NH25 and the direction of the arrow NH26, which is determined on the driving side, changes, the position of the developing roller 13 with respect to the photosensitive drum 10 does not change, so that the position can be determined with high accuracy.

As described above, with the structure of this embodiment, the developing roller 13 is pressed against the photosensitive drum 10 with a stable pressure, and alignment between the photosensitive drum 10 and the developing roller 13 can be kept with high accuracy. By this, the developing roller 13 can be uniformly contacted to the photosensitive drum 10 in the direction of the rotation axis L0 (FIG. 4) of the developing roller 13.

Here, as shown in part (a) of FIG. 26, the third contact surface 70c of the drive side contacting/spacing lever 70 that abuts on one end of the drive side development pressing spring 71 is disposed, in the direction of the projecting direction M2, between the supported portion 70d of the contact/spacing lever 70 and the first contact surface 70a. That is, the relationship between the distance W10 from the supported portion 70d to the third contact surface 70c and the distance W11 from the supported portion 70d to the first contact surface 70a shown in part (b) of FIG. 26 satisfies the following:

$$W10 < W11$$

Therefore, the relationship of the movement amount W13 of the third contact surface 70c and the movement amount W12 of the first contact surface 70a is:

$$W13 < W12, \text{ where, } W13 = W12 \times (W10/W11).$$

Therefore, even when an error occurs in the positional accuracy of the driving side device pressing member 150, the change in the compression amount of the driving side developing pressure spring 71 is smaller than the error of the positional accuracy of the driving side device pressing member 150. By this, the accuracy of the pressing force for bringing the developing roller 13 into pressure contact with the photosensitive drum 10 can be improved. The non-driving side has the same structure, and therefore, the same effect can be provided.

As described above, in the longitudinal direction, the driving side contacting/spacing lever 70 and the non-driving side contact separating lever 72 are disposed so as to overlap at least in the range of the entire length L13a of the developing roller 13 (FIG. 22). The driving side separating lever 70 receives the external force F11 (part (a) of FIG. 25), and the non-driving side separating lever 72 receives the external force FH11 (part (b) of FIG. 25). Therefore, the longitudinal positional difference between the first abutting surfaces 70a, 72a of the non-driving side separating lever 72 and the driving side supported portion 13an of the developing roller 13 and the non-driving side supported portion 13c can be reduced.

By this, the moments applied on the drive side development bearing 36 and the non-drive side development bearing 46 can be suppressed. Therefore, the developing roller 13 can be pressed against the photosensitive drum 10 efficiently.

Further, as has been described hereinbefore, the swinging motions of the driving side contacting/spacing lever 70 and the non-driving side contacting/spacing lever 72 (arrows N9 and N10 in part (d) of FIG. 27 and the arrows NH9 and NH10 Direction) are independent from each other. Therefore, the arrows N7 and N8 directions (part (d) of FIG. 27) of the driving side device pressing member 150 and the arrows NH7 and N7 of the non NH8 direction (part (c) of FIG. 28) at the time when the developing roller 13 is pressed against the photosensitive drum 10 can be independently selected.

In addition, the rocking directions of the driving side contacting/spacing lever 70 and the non-driving side contact separating lever 72 (directions of arrows N9 and N10 in part (a) of FIG. 25 and directions of arrows NH9 and NH10 in part (c) of FIG. 28) are not necessary to be the same. By this, it is possible to optimize the respective magnitudes and respective directions of the pressing forces F11, FH11 shown in part (a) of FIG. 25 and part (b) of FIG. 25 for press-contacting the developing roller 13 to the photosensitive drum 10 in the driving side and the non-driving side. Furthermore, even if there is a relative error in the positions of the driving side device pressing member 150 and the non-driving side device pressing member 151, they do not mutually affect pressing forces F11 and FH11. By this, the accuracy of the contact pressure of the developing roller 13 to the photosensitive drum 10 can be increased.

(Spacing Mechanism)

Part (a) of FIG. 27 is an illustration of the state of the developing cartridge B1 in a transition state, the contact to the spacing between the developing roller 13 and the photosensitive drum 10. Part (c) of FIG. 27 is a detailed view of the neighborhood of the driving side contacting/spacing lever 70 in part (a) of FIG. 27, in which for better illustration, the driving side swing guide 80 and the development side cover 34 are omitted.

Part (b) of FIG. 27 is an illustration of a separated state of the developing cartridge B1 in which the developing roller 13 and the photosensitive drum 10 are spaced from each other. Part (d) of FIG. 27 is a detailed view of the neighborhood of the driving side contacting/spacing lever 70 in part (b) of FIG. 27, in which for better illustration, the driving side swing guide 80 and the development side cover 34 are omitted.

Here, in the case of the contact developing method as in this embodiment, when the developing roller 13 is kept in contact with the photosensitive drum 10 at all times as shown in part (a) of FIG. 25, the rubber portion of the developing roller 13 13b may be deformed. Therefore, at the time of non-development, it is preferable that the developing roller 13 is spaced from the photosensitive drum 10. That is, as shown in part (a) of FIG. 27, a state (contact position, facing position) where the developing roller 13 is in contact with the photosensitive drum 10 and a state where the developing roller 13 is spaced from the photosensitive drum 10 can be taken.

The drive side contact/spacing lever 70 is provided with a separation surface 70g (part (c) of FIG. 27) protruding toward the developing roller 13. The separation surface 70g is structured to be able to engage with a first contact surface 150a (part (c) of FIG. 27) provided in the drive side device pressing member 150 provided in the apparatus main assembly A1. The driving-side device pressing member 150 receives a driving force from a motor (not shown) and is structured to be movable in the directions of arrow N7 and arrow N8 (part (c) of FIG. 27).

An operation of shifting to a state in which the developing roller 13 and the photosensitive drum 10 are separated from each other will be described. In the contact state between the developing roller 13 and the photosensitive drum 10 shown in part (a) of FIG. 25, as shown in part (a) of FIG. 26, the second contact surface 150b and the first contact surface 70a are in contact with each other (the first abutting surface 150a and the separated surface 70g shown in part (c) of FIG. 3 are spaced apart from each other with a gap therebetween).

On the other hand, part (c) of FIG. 27 shows a state in which the drive-side device pressing member 150 has moved by the distance ä6 in the direction of the arrow N8, in which the first contact surface 70an of the drive side contact separation lever 70 and the second abutting surface 150b of the drive side device pressing member 150 are spaced from each other. That is, the first abutting surface 70a of the driving side contacting/spacing lever 70 receives the urging force F10 of the driving side developing pressure spring 71 to rotate in the direction of the arrow N10 (part (c) of FIG. 27) about the supported portion 70d.

Then, the regulating contact portion 70c (part (c) of FIG. 27) of the drive side contacting/spacing lever 70 and the regulation portion 36b (part (c) of FIG. 27) of the drive side bearing member 36 come into contact. By this, the attitude of the driving side contacting/spacing lever 70 is uniquely determined.

Part (d) of FIG. 27 shows a state in which the driving-side device pressing member 150 has moved by a distance δ7 in the direction of the arrow N8. As the driving side device pressing member 150 moves in the direction of the arrow N8, the separated surface 70g of the driving side contact/spacing lever 70 and the first contact surface 150an of the driving side device pressing member 150 come into contact to each other. Since the restricting contact portion 70e of the driving side contact/spacing lever 70 and the regulating portion 36b of the drive side bearing member 36 are in contact with each other at this time, the developing cartridge B1 is moved in the direction of the arrow N8.

As described above, the developing cartridge B1 is positioned to the driving side swing guide 80 which is slidable in the arrow N3 direction and the arrow N4 direction relative to the driving side plate 90 and is swingable in the directions of the arrow N5 and the arrow N6. Therefore, as the driving side device pressing member 150 moves in the direction of the arrow N8, the developing cartridge B1 swings in the direction of the arrow N5. At this time, the developing roller 13 and the photosensitive drum 10 are spaced from each other by a distance 58 (part (b) of FIG. 27) with a gap therebetween.

Here, the non-driving side also has the same structure as the driving side. In a state where the non-driving side contact/spacing lever 72 and the non-driving side device pressing member 151 are in contact with each other, the non-driving side device pressing member 151 moves by the distance δ h7 (part (c) of FIG. 28) in the direction of the arrow N7. By this, the developing cartridge B1 swings in the arrow N5 direction (part (a) of FIG. 28) about the supported projection 81g of the swing guide 81, and the developing roller 13 and the photosensitive drum 10 are spaced from each other by the distance 58.

In this manner, depending on the positions of the driving side device pressing member 150 and the non-driving side device pressing member 151 provided in the apparatus main assembly A1, the contact state or the spaced state between the photosensitive drum 10 and the developing roller 13 is selectively changed.

Further, when the state is shifted from the contact state shown in part (a) of FIG. 27 in which the developing roller 10 and the photosensitive drum 13 are in contact with each other to the spaced state shown in part (b) of FIG. 27 in which the developing roller 10 and the photosensitive drum 13 are spaced from each other, the driving side swing guide 80 and the developing cartridge B1 swing integrally. Therefore, the guide portion 55e of the coupling lever 55 is kept retracted from the guided portion 180d of the coupling member 180 (part (b) of FIG. 27).

Further, when the developing roller 13 and the photosensitive drum 10 are spaced from each other as shown in part (b) of FIG. 27, the guided portion 180d of the coupling member 180 and the guide portion 185d of the coupling spring 185 are in contact with each other. By this, the coupling member 180 receives the force F1 and takes the attitude of the above-described first inclined attitude D1.

As described above, the driving side contacting/spacing lever 70 and the non-driving side contacting/spacing lever 72 are provided with the pressed surfaces (the first contact surfaces 70an and 72a) and the separated surfaces (the second contact surfaces 70g, 72g). The pressing surface (the second abutting surfaces 150b, 151b) and the separating surfaces (150a, 151a) act on the driving side device pressing member 150 and the non-driving side device pressing member 151, respectively. By this, the contact state or spaced state between the photosensitive drum 10 and the developing roller 13 can be selected as required by a single component of each of the driving side contact/spacing lever 70 and the non-driving side contact separation lever 72.

By this, the structure of the developing cartridge B1 can be simplified. Further, since the contact state or the spaced state can be controlled with a single part, the timing at the time of transition from the contact state to the spaced state can also be made highly accurate.

As shown in FIG. 22, the driving side contacting/spacing lever 70 and the non-driving side contacting/spacing lever 72 are independently provided at both longitudinal end portions of the developing cartridge B1, respectively. Therefore, there is no need to provide a contacting/spacing lever over the longitudinal direction, and it is possible to miniaturize the developing cartridge B1 (area Y1 in FIG. 22). Accordingly, since the area Y1 can be used as a space with the components of the apparatus main assembly A1, it is also possible to downsize the apparatus main assembly A1.

(Modifications)

Although the preferred embodiments of the present invention have been described above, the present invention is not limited to these embodiments, and various modifications and changes are possible within the scope of the gist thereof. The structures and positions in the above-described embodiment may be appropriately selected and combined.

(Modification 1)

In the above-described embodiment, the contact developing method in which the developing roller is contacted with the photosensitive drum at the time of image formation has been described. However, the present invention is not limited thereto, and is applicable to the non-contact type development, in which the developing roller is close to the photosensitive drum of the time of image formation.

(Modification 2)

In the above-described embodiment, the structure of the cartridge B is a developing cartridge including the developing roller 13, but it is not limited thereto. A process cartridge in which a drum unit for supporting the photosensitive drum 10 and a developing unit 50 for supporting the developing roller 13 are integrated into a cartridge and is dismountable from the apparatus main assembly A may be used.

In the above-described embodiment, as the drum cartridge C, the photosensitive drum 10 is structured to be mountable to and dismountable from the apparatus main assembly A, but it is not limited thereto. For example, the photosensitive drum 10 (including the cleaning blade 20 and the charging roller 11) may be installed in the apparatus main assembly A.

(Modification 3)

Further, in the above-described embodiment, the cartridge B is for forming a monochrome image, but the present invention is not limited thereto. The present invention can also be applied to cartridges including a plurality of developing means to form an image of plural colors (for example, two color image, three color image or full color etc.).

In the embodiment described above, the cartridge B is mounted to and dismounted from the apparatus main assembly A in a direction substantially perpendicular to the rotation axis L1 of the developing roller 13, but the present invention is not limited thereto. For example, the cartridge B may be mounted to and dismounted from the apparatus main assembly A in a direction substantially parallel to the rotation axis L1 of the developing roller 13.

In the above-described embodiment, the spacer roller 17 and the spacer roller 18 are brought into contact with the outer circumferential surface of the photosensitive drum 10 to press the developing roller 13 against the photosensitive drum 10, but the present invention is not limited thereto. For example, the outer peripheral surface of the developing roller 13 may be directly pressed against the outer peripheral surface of the photosensitive drum 10 without the spacer roller 17 and the spacer roller 18.

According to the present invention, there is provided an image forming apparatus in which regardless of the position of the swinging center of the developing cartridge with respect to the disposition of the image bearing member and the developer carrying member, the developer carrying member can be accurately positioned with a stable contact pressure with respect to the image bearing member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-031028 filed on Feb. 22, 2017, which is hereby incorporated by reference herein in its entirety.

What is claimed is:

1. An image forming apparatus comprising:
a main assembly;
a rotatable image bearing member;
a cartridge detachably mountable to said main assembly, said cartridge including a rotatable developer carrying member;
a first bearing provided in said cartridge and supporting said developer carrying member at one axial end of said developer carrying member, said first bearing being provided with a first regulated portion;
a second bearing provided in said cartridge and supporting said developer carrying member at the other axial end of said developer carrying member, said second bearing being provided with a second regulated portion;
a third bearing supporting said image bearing member at one axial end of said image bearing member, said third bearing being provided with a first regulating portion;
a fourth bearing supporting said image bearing member at the other axial end of said image bearing member, said fourth bearing being provided with a second regulating portion;
a first swingable member provided in said main assembly and engaged with one end of said cartridge in an axial direction of said developer carrying member when said cartridge is mounted in said main assembly, said first swingable member being swingable integrally with said cartridge; and
a second swingable member provided in said main assembly and engaged with the other end of said cartridge in the axial direction of said developer carrying member when said cartridge is mounted in said main assembly, said second swingable member being swingable integrally with said cartridge;
wherein said cartridge is swingable integrally with said first swingable member and said second swingable member to move between a first position in which said developer carrying member is contacted with or close to said image bearing member and a second position in which said developer carrying member is spaced from said image bearing member,
wherein said first swingable member is provided with a third regulated portion, and said second swingable member is provided with a fourth regulated portion,
wherein said main assembly is provided with a third regulating portion corresponding to said third regulated portion and a fourth regulating portion corresponding to said fourth regulated portion,
wherein when said cartridge is in the first position, said first regulated portion contacts said first regulating portion, said second regulated portion contacts said second regulating portion, said third regulated portion contacts said third regulating portion, and said fourth regulated portion is spaced from said fourth regulating portion.

2. An apparatus according to claim 1, wherein a swing center of said cartridge is slidable in a predetermined direction when said first regulated portion contacts said first regulating portion, and said second regulated portion contacts said second regulating portion.

3. An apparatus according to claim 1, wherein said image bearing member, said third bearing and said fourth bearing is provided in a second cartridge.

4. An apparatus according to claim 1, wherein a swing center of said cartridge is slidable in a predetermined direction when said first regulated portion contacts said first regulating portion, and said second regulated portion contacts said second regulating portion, and said one end of said developer bearing member and said one end of said cartridge are in a driving side, and said other end of said developer bearing member and said other end of said cartridge are in a non-driving side, wherein said main assembly of the image forming apparatus includes:

a first side plate provided with said third regulating portion and swingably holding said first swingable member, a second side plate provided with said fourth regulating portion and swingably holding said second swingable member, and wherein when said cartridge is in the first position, at least one point of said third regulated portion contacts said third regulating portion.

5. An apparatus according to claim 4, wherein when said cartridge is in the second position, said fourth regulated portion contacts with at least one point of said fourth regulating portion.

6. An apparatus according to claim 1, wherein said second regulated portion has an arcuate configuration concentric with said developer carrying member.

7. An apparatus according to claim 1, further comprising a contacting/spacing lever provided on said first bearing and provided with a supported portion functioning as a pivot, a first urging member urging said contacting/spacing lever in a direction of spacing said developer carrying member from said image bearing member, and a second urging member capable of being pressed to operate said contacting/spacing lever to move said cartridge to the first position against an urging force of said first urging member, wherein said contacting/spacing lever contacts said first urging member at a position closer to said supported portion than a position where said contacting/spacing lever contacts said second urging member.

8. An image forming apparatus according to claim 1, comprising:

a main assembly;

a rotatable image bearing member;

a cartridge detachably mountable to said main assembly, said cartridge including a rotatable developer carrying member;

a first bearing provided in said cartridge and supporting said developer carrying member at one axial end of said developer carrying member, said first bearing being provided with a first regulated portion;

a second bearing provided in said cartridge and supporting said developer carrying member at the other axial end of said developer carrying member, said second bearing being provided with a second regulated portion;

a third bearing supporting said image bearing member at one axial end of said image bearing member, said third bearing being provided with a first regulating portion;

a fourth bearing supporting said image bearing member at the other axial end of said image bearing member, said fourth bearing being provided with a second regulating portion;

a first swingable member provided in said main assembly and engaged with one end of said cartridge in an axial direction of said developer carrying member when said cartridge is mounted in said main assembly, said first swingable member being swingable integrally with said cartridge; and a second swingable member provided in said main assembly and engaged with the other end of said cartridge in the axial direction of said developer carrying member when said cartridge is mounted in said main assembly, said second swingable member being swingable integrally with said cartridge;

wherein said cartridge is swingable integrally with said first swingable member and said second swingable member to move between a first position in which said developer carrying member is contacted with or close to said image bearing member and a second position in which said developer carrying member is spaced from said image bearing member, wherein when said cartridge is in the first position, said first regulated portion contacts said first regulating portion, and said second regulated portion contacts said second regulating portion, wherein said first regulated portion and said first regulating portion are provided in a driving side, wherein when said cartridge is in the first position, said first regulated portion and said first regulating portion are in an upstream side of a position where said developer carrying member is opposed to said image bearing member and in an downstream side of a charging member that charges the image from the image bearing member, with respect to a rotational moving direction of said image bearing member, and wherein said second regulated portion and said second regulating portion are provided in a non-driving side, wherein when said cartridge is in the first position, said second regulated portion and said second regulating portion are in a downstream side of the position where said developer carrying member is opposed to said image bearing member and in an upstream side of a transfer member that transfers the image from the image bearing member, with respect to the rotational moving direction of said image bearing member.

* * * * *